US011970852B2

(12) United States Patent
Gangitano et al.

(10) Patent No.: US 11,970,852 B2
(45) Date of Patent: *Apr. 30, 2024

(54) OPTIMIZED INFLATABLE BARRIERS

(71) Applicants: Keith Gangitano, San Jose, CA (US); Anthony Joseph Gangitano, San Jose, CA (US); Cole James Maston, Sunnyvale, CA (US)

(72) Inventors: Keith Gangitano, San Jose, CA (US); Anthony Joseph Gangitano, San Jose, CA (US); Cole James Maston, Sunnyvale, CA (US)

( * ) Notice: Subject to any disclaimer, the term of this patent is extended or adjusted under 35 U.S.C. 154(b) by 879 days.

This patent is subject to a terminal disclaimer.

(21) Appl. No.: 17/019,252

(22) Filed: Sep. 12, 2020

(65) Prior Publication Data

US 2020/0407974 A1 Dec. 31, 2020

Related U.S. Application Data

(63) Continuation-in-part of application No. 16/106,055, filed on Aug. 21, 2018, now Pat. No. 10,809,001.

(60) Provisional application No. 63/003,612, filed on Apr. 1, 2020, provisional application No. 62/964,826, filed on Jan. 23, 2020, provisional application No. 62/900,599, filed on Sep. 15, 2019, provisional application No. 62/654,226, filed on Apr. 6, 2018.

(51) Int. Cl.

| | |
|---|---|
| ***E04B 1/70*** | (2006.01) |
| ***E04B 2/74*** | (2006.01) |
| ***E06B 9/06*** | (2006.01) |

(52) U.S. Cl.
CPC .................. *E04B 1/70* (2013.01); *E04B 2/74* (2013.01); *E06B 9/06* (2013.01)

(58) Field of Classification Search
CPC ...... F24F 1/0041; F24F 1/0038; F24F 1/0014; F24F 1/0018; F24F 1/0033; F24F 1/005; F24F 1/0071; F24F 1/0087; F24F 2003/008; F24F 3/14; F24F 3/16; F24F 3/1603; F24F 2003/1614
See application file for complete search history.

(56) References Cited

U.S. PATENT DOCUMENTS 4,515,070 A * 5/1985 Bobjer .................... F24F 7/065 454/200
5,044,259 A * 9/1991 Catan ...................... F24F 7/065 454/305

(Continued)

*Primary Examiner* — Christopher R Harmon
(74) *Attorney, Agent, or Firm* — André Grouwstra

(57) ABSTRACT

An inflatable barrier allows separating air in a first space from air in a second space to provide containment.
The inflatable barrier may include an inflatable bag with edge seals in the form of parallel tubes. The bag receives air from an air mover through a first opening. It has a carrier for a vent that releases air while the bag stays inflated. A tension rod prevents the bag from bulging out of shape. The bag may be hung from an expandable rod. An internal channel may route air through the whole bag.
The inflatable barrier may comprise an outer sleeve and two or more inflatable inner chambers. The circumference of a main sleeve matches the circumference of a combination of the inner chambers. The inner chambers include an air inlet/outlet. The outer sleeve may have connector halves to couple the barrier with another barrier, or to couple the main sleeve with a top, a bottom, or an extension.

20 Claims, 43 Drawing Sheets

(56) References Cited

U.S. PATENT DOCUMENTS

| | | | | | |
|---|---|---|---|---|---|
| 5,090,972 | A * | 2/1992 | Eller | B08B 15/026 | 454/238 |
| 5,314,377 | A * | 5/1994 | Pelosi, III | F24F 3/167 | 135/93 |
| 6,048,264 | A * | 4/2000 | Campbell | G01M 17/007 | 34/104 |
| 6,402,613 | B1 * | 6/2002 | Teagle | F24F 1/0071 | 454/341 |
| 7,707,840 | B1 * | 5/2010 | Flores | F24F 1/0007 | 62/109 |
| 2004/0253919 | A1 * | 12/2004 | Dube | A01K 1/0064 | 454/274 |
| 2006/0186225 | A1 * | 8/2006 | Bartholmey | F24F 13/0218 | 239/548 |
| 2006/0252365 | A1 * | 11/2006 | Gebke | F24F 13/0209 | 454/306 |
| 2007/0012346 | A1 * | 1/2007 | Choi | F16B 7/105 | 135/120.3 |
| 2011/0312263 | A1 * | 12/2011 | Grandmaison | F24F 13/14 | 454/283 |
| 2014/0196880 | A1 * | 7/2014 | Pinchuk | F24F 11/0001 | 165/48.1 |
| 2014/0202540 | A1 * | 7/2014 | Gebke | F16L 11/02 | 138/40 |

* cited by examiner

FIG. 25
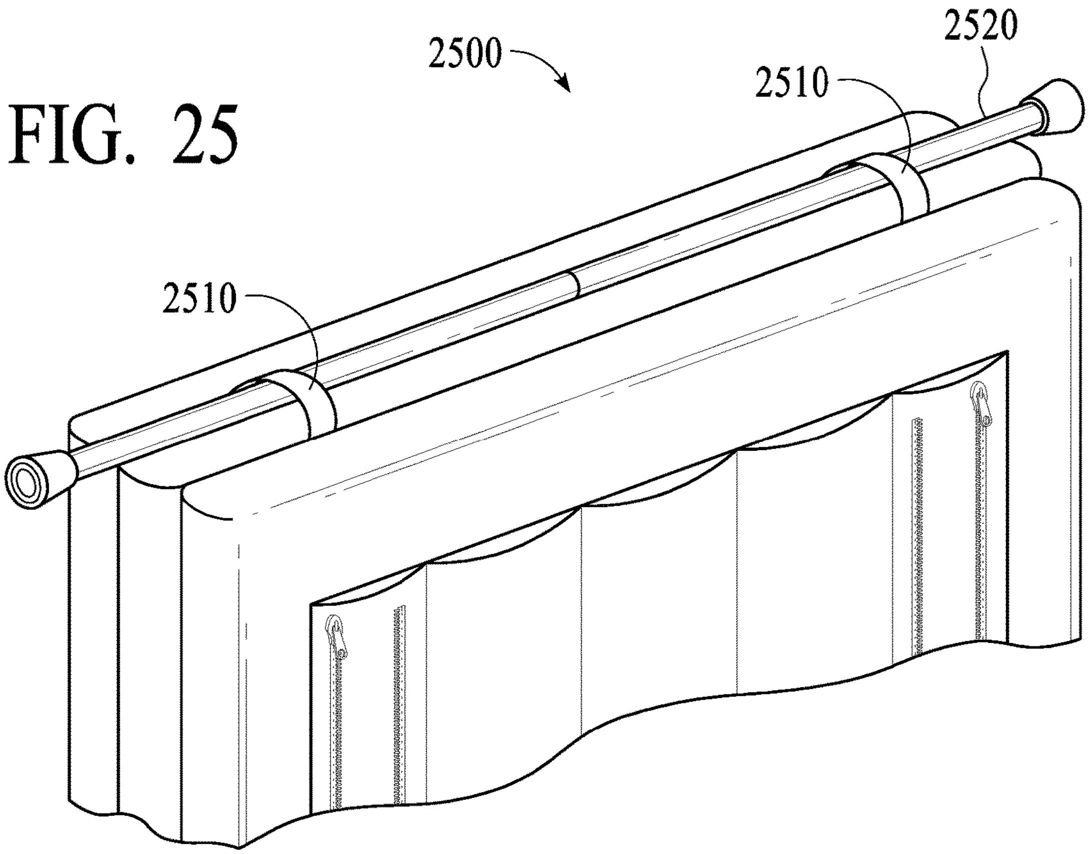
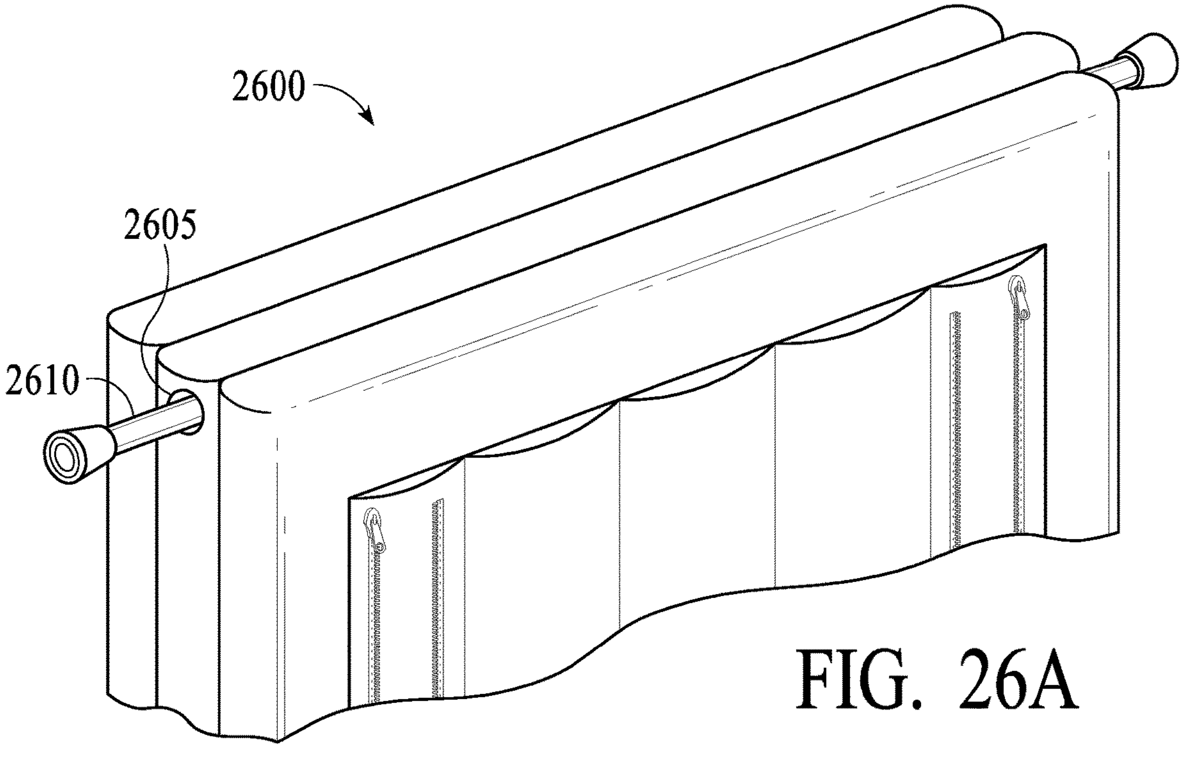
FIG. 26A

FIG. 26B
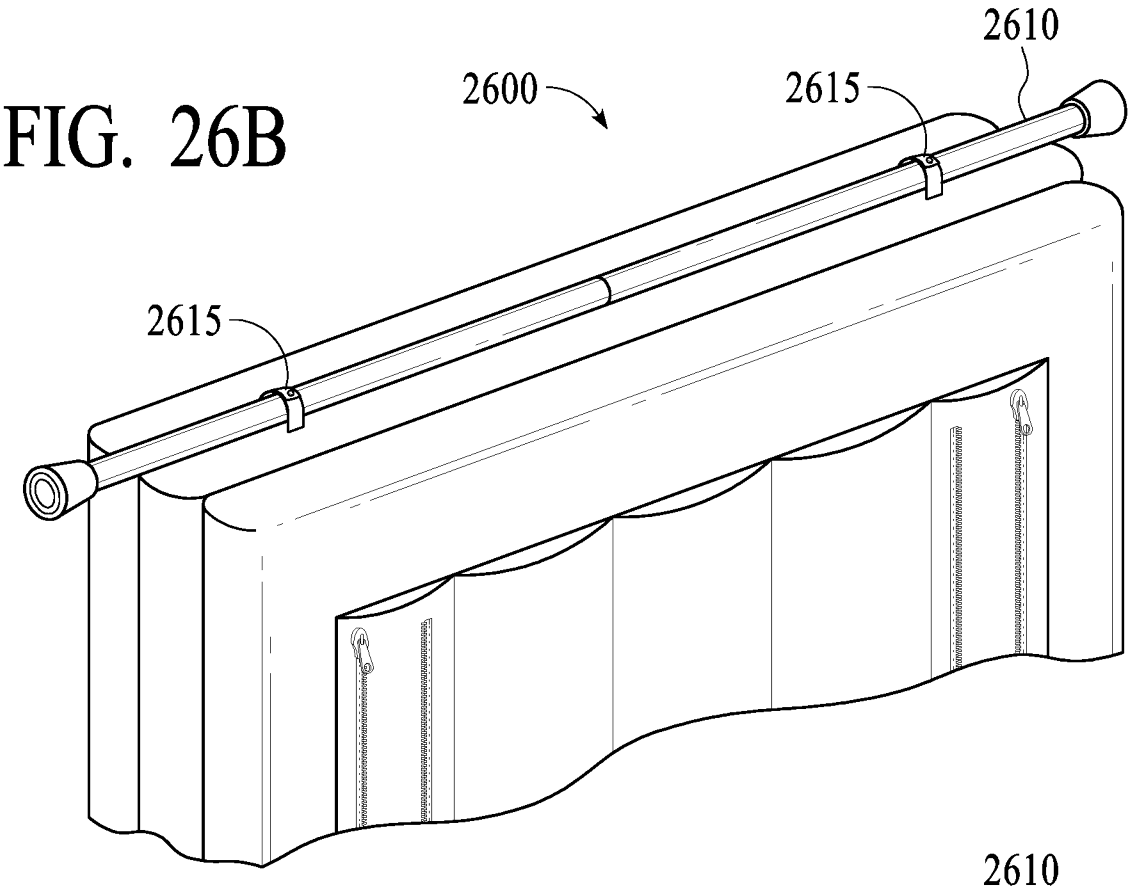
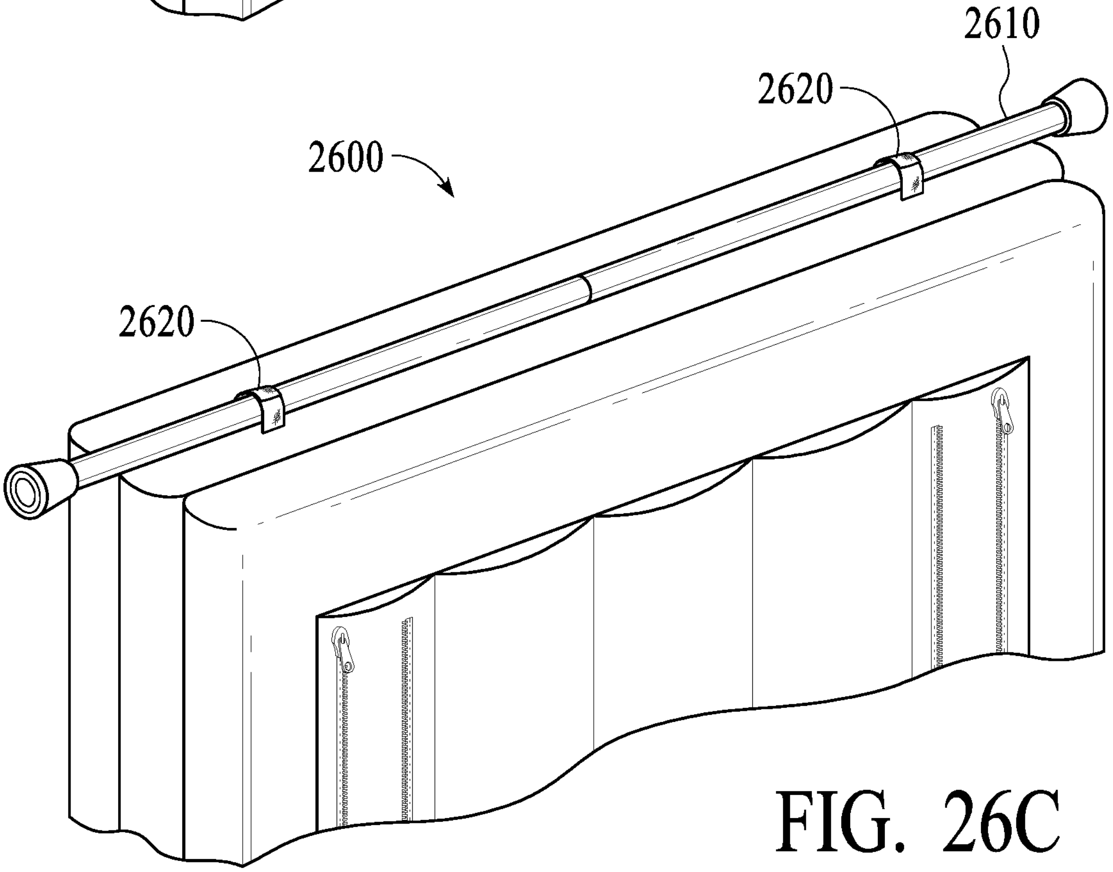
FIG. 26C

FIG. 26D
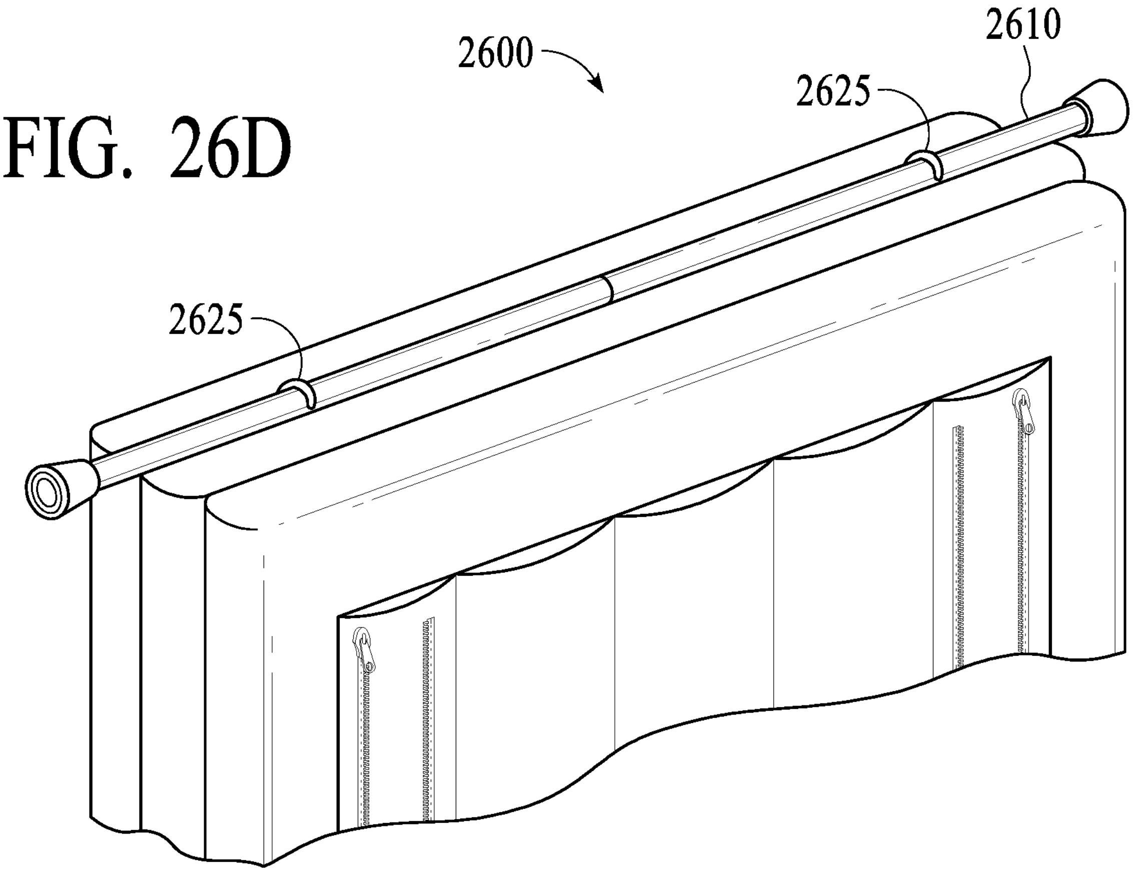
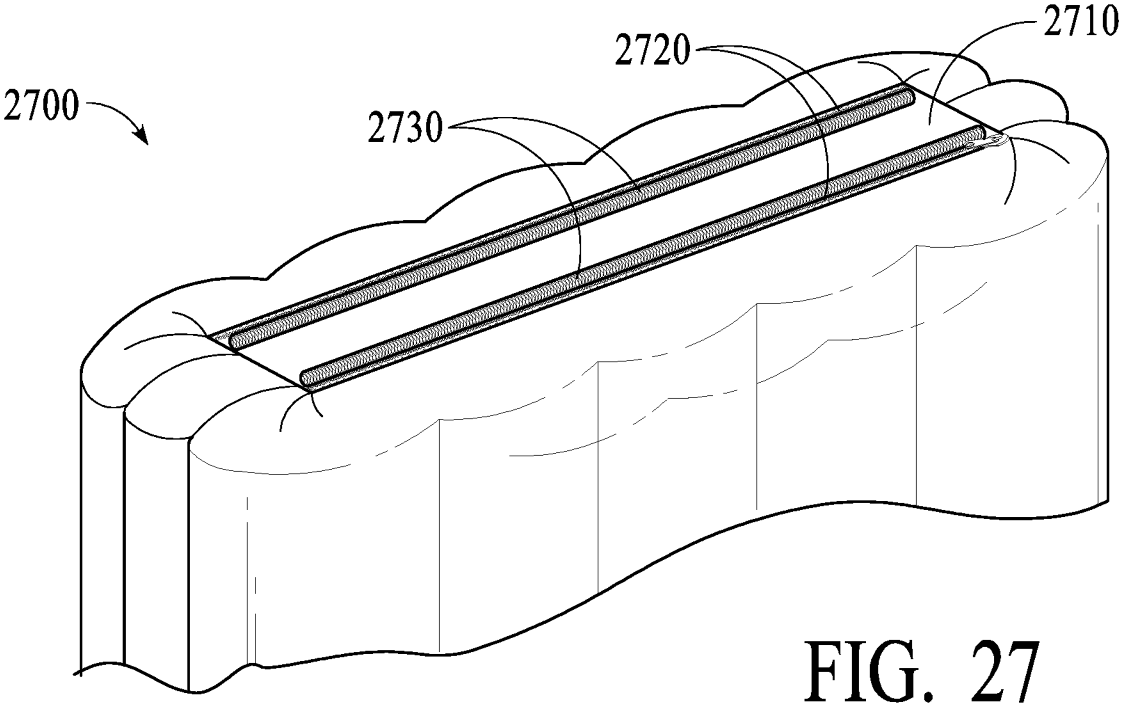
FIG. 27

OPTIMIZED INFLATABLE BARRIERS

CROSS REFERENCES TO RELATED APPLICATIONS

This application is a continuation-in-part from U.S. patent application Ser. No. 16/106,055, entitled "Blow-Dry Enclosure" filed on Aug. 21, 2018, which is hereby incorporated by reference as if set forth in full in this application for all purposes.

This application further claims priority from the following U.S. provisional patent applications, all entitled "Optimized Blow-Dry Enclosures": Ser. No. 62/900,599 filed on Sep. 15, 2019; Ser. No. 62/964,826, filed on Jan. 23, 2020, and Ser. No. 63/003,612, filed on Apr. 1, 2020, which are hereby incorporated by reference as if set forth in full in this application for all purposes.

TECHNICAL FIELD

The disclosed embodiments relate generally to tools and methods used in the water restoration industry, and in particular to those for controlling temperature, relative humidity, and air flow in an affected space, as well as controlling contamination and noise pollution of adjoining spaces. Embodiments further relate to tools and methods used in the healthcare and personal care industries, in particular to those for keeping rooms hygienic and for controlling microbes and infective agents.

BACKGROUND

Unless otherwise indicated herein, elements described in this section are not prior art to the claims and are not admitted being prior art by inclusion in this section.

It is very common for a water leak, large or small, in a structure built on a raised foundation, to find its way into a crawlspace. The crawlspace is a confined space that exists between the ground floor of a building and the earth that it rests upon, when the building is constructed with a raised foundation and not a slab of concrete foundation. This space can be very shallow, with sometimes only 10-12" between the structure and the earth. Usually it is in the order of 18-24", which is still very confined and difficult for maneuvering workers, supplies and equipment. In the common event that a crawlspace or another space or structure is affected by a water leak, it is critical to restore a dry and hygienic environment, which means removing the water from the structure and, often, the earth.

Drying crawl spaces can be difficult and time-consuming, hence costly. This is due to many factors including cold ambient temperatures, high relative humidity, the nature of the construction materials used in these spaces, hazards like electrical wires, plumbing, screws and nails sticking out of the structure, toxic gases, animals dead or alive, and possibly venomous, insects both dangerous and pestilent, and just the nature of the extremely confined space. Professionals in the water restoration industry struggle with all these issues while performing their duties.

The process of drying a structure, for example a crawl space below a house after water damage has occurred, currently requires workers to make use of high-powered fans (air movers); portable dehumidifiers (dehu's) or desiccants, as well as in some cases improvised containment, or cordoning off of a space and/or the introduction of additional heat. The process attempts to get moisture out of the building materials and into the air where the dehu or desiccants can remove it from the structure as quickly and efficiently as possible, thus restoring the building to a safe and hygienic dry standard.

The current procedures typically require that the equipment treat the volume of space included in all of, most of, or a large part of the affected structure, instead of limiting that space to the actual affected areas. Even when this space is "contained" or made smaller, professionals extensively use disposable plastic sheeting, such as sold by Visqueen. The contained space is often much larger than it has to be, and the process of building containment is time-consuming; it generates additional waste that must be disposed of and that may be polluting the environment; and the disposables increase the cost. Existing methods waste time, energy, and money. They are also noisy and contaminating.

The recent worldwide pandemic has further shown a need in hospitals, clinics, and care homes to keep rooms taken by or inhabited by sick people isolated from rooms and corridors where healthy people must be protected. Further, there is a need in care homes to maintain rooms or sections of a building as safe spots for personnel. Embodiments of the invention provide methods and tools to achieve this by containing the relevant sections and providing over-pressure or under-pressure in the protected or contained sections.

Climate change has also lengthened and intensified fire seasons in many parts of the world and the communities that surround the actual burn zones are endangered by the resulting air pollution. In cases with comorbidities such as asthma, COPD and emphysema, the high levels of smoke and ash in the atmosphere put people at much greater risk for complications. This can be mitigated by evacuation (at great expense) or hospitalization (at even greater expense). Embodiments of the invention provide methods and tools to control for this using positive air pressure, without the need for relocation.

SUMMARY

Water leaks in buildings create damage and unhealthy conditions. Professionals in the water restoration industry mitigate these by drying out affected structures. For various reasons, current methods are time and energy consuming, and costly. They are also noisy and polluting the environment. Embodiments of the invention address these problems.

The healthcare and personal care industries have a need to contain infectious diseases, for example by creating safe spaces for workers, patients, and/or customers. Such a need may be temporary, creating a situation much like that in the restoration industry, even though there may be no need to remove moisture. A cost-effective means of containment must be installed temporarily, and a contaminated space may be kept at a negative air pressure (i.e., a pressure that is lower than in adjacent safe spaces), or a safe space may be kept at a positive air pressure, i.e., an air pressure that is higher than in adjacent unsafe spaces.

In a first aspect, an embodiment of the invention comprises an inflatable bag that is in a shape that allows separating air in a first section of space in a building from air in a second section of space, and that allows providing containment of air in the first section. The inflatable bag is configured to keep the air in the first section at a different pressure than the air in the second section. The first section and the second section are outside the inflatable barrier. The shape has a front, a back, two sides, a top, and a bottom. Along the two sides, and in some embodiments along the top and/or bottom, the inflatable bag has edge seals in the form of two or more parallel tubes that may be inflatable. On the back, the inflatable bag has a first opening, which is configured to receive air inflow from an air mover. On the front and/or on the back, the inflatable bag has a first vent carrier, configured to hold and connect to a removable and replaceable vent. The vent is configured to release air from inside the inflatable bag into the first section of space (in case of restoration work) or the second section of space when there is a need for pressurized (positive or negative) containment, while the inflatable bag stays inflated. The inflatable bag may feature a ground piece at its bottom that is made of a more rugged material than the inflatable bag's front and back.

Some embodiments may include a sleeve (at the front or the back) that can hold a tension rod to prevent the inflatable bag from bulging out of shape. The inflatable bag may have means for pending it from an expandable rod, for example such as shown in FIGS. 25-26. An embodiment may have an air inflow tube coupled with the first opening on one end, and coupled with the air mover on the other end. The first opening may be reinforced with webbing, and the air inflow tube may be restricted from bulging in one or more directions.

Embodiments may have means for restricting their width and/or height, for example zippers, straps, and/or flaps with hooks and/or grommets. Embodiments may also have means for connecting to adjacent units, for example using connectors such as zippers for horizontal or vertical chaining.

An embodiment may include an internal channel for routing air through the whole inflatable bag from the first opening to the first vent carrier.

The inflatable bag may include a warning at the front, and the warning may be in the shape of a letter X. An embodiment may have a clear window on the front to hold and display information. An embodiment may further include a pocket at the front.

The embodiment may further include edge hooks to minimize airgaps around the edges when air pressure is lost, and/or a ballast container to minimize an airgap at the bottom when air pressure is lost.

An embodiment may include an air gate comprising a tunnel between the front and the back. The tunnel has a flexible circumference, allowing it to at least partially collapse when an object is passed through, and to fully collapse when no object passes through the tunnel. In some cases, a tunnel is configured to hold one or more air filters.

An embodiment may further include an internal light to provide light to a part of the first and/or a part of the second section. The light may be a LED strip. An embodiment may further comprise a foot switch, or a pressure sensitive mat, that allows a user to temporarily reduce pressure inside the bag to make it possible to create a side opening to pass through.

In a second aspect, an embodiment comprises an inflatable bag that is in a shape that allows separating air in a first section of space in a building from air in a second section of space, and that allows providing containment of air in the first section. The inflatable bag is configured to keep the air in the first section at a different pressure than the air in the second section. The first section and the second section are outside the inflatable barrier. The shape has a front, a back, two sides, a top, and a bottom. Along the two sides, the inflatable bag has edge seals in the form of two or more parallel inflatable tubes. The inflatable bag includes a transparent window that allows visual contact from one side of the inflatable bag to the other side, and the inflatable bag includes an air gate, the air gate comprising a tunnel with a flexible circumference that allows the tunnel to fully collapse when no object is passed through and to partially collapse when an object is passed through, while hugging the object to stop airflow through the tunnel.

An inflatable barrier comprises two or more concatenated inflatable inner chambers, wherein at least two of the two or more concatenated inflatable inner chambers include an air inlet/outlet, and wherein the two or more concatenated inflatable inner chambers are generally in a shape that allows separating air in a first section of space in a building from air in a second section of space in the building and that allows providing containment of the air in the first section, wherein the first section and the second section are outside the inflatable barrier and wherein the inflatable bag is configured to keep the air in the first section at a different pressure than the air in the second section; and an outer sleeve comprising a main body with a circumference matching a circumference of the two or more concatenated inflatable inner chambers, vertical connector halves on sides of a front and sides of a back of the main body, and horizontal connector halves at a top and at a bottom of the main body, the horizontal connector halves configured to connect the main body with two of a top, a bottom, and an extension, and the vertical connector halves configured to connect the inflatable barrier to another inflatable barrier.

In the inflatable barrier, the outer sleeve further may comprise holes in the main body for the at least two air inlet/outlets.

The outer sleeve further may comprise horizontally paired sets of D-rings on both a front and a back, wherein the D-rings are configured to receive straps that allow shortening and/or curving the width of the inflatable barrier.

The outer sleeve may further comprise horizontally paired straps on a front and a back, wherein the straps allow shortening and/or curving a width of the inflatable barrier.

The outer sleeve may comprise edge seals. In some embodiments, the edge seals may comprise two parallel tubes filled with foam. The edge seals may be detachable, and may be attached to and detached from the vertical connector halves.

The inflatable inner chambers may be taller than the outer sleeve. The top may comprise edge seals. The extension may comprise edge seals. The connector halves may be or may include zipper halves.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 25 illustrates details at the top of an inflatable barrier according to an embodiment of the invention;

FIGS. 26A-D illustrate alternative details at the top of an inflatable barrier according to embodiments of the invention;

FIG. 27 illustrates details on the bottom of an inflatable barrier according to an embodiment of the invention;

In the figures, like reference numbers may indicate functionally similar elements. The systems and methods illustrated in the figures, and described in the Detailed Description below, may be arranged and designed in a wide variety of different embodiments. Neither the figures, nor the Detailed Description, are intended to limit the scope as claimed. Instead, they merely represent examples of different embodiments of the invention.

DETAILED DESCRIPTION

Water leaks in buildings create damage and unhealthy conditions. Professionals in the water restoration industry mitigate these by drying out affected structures. For various reasons, current methods are time and energy consuming, and costly. They are also noisy and polluting the environment. Embodiments of the invention address these problems.

Figure 1:
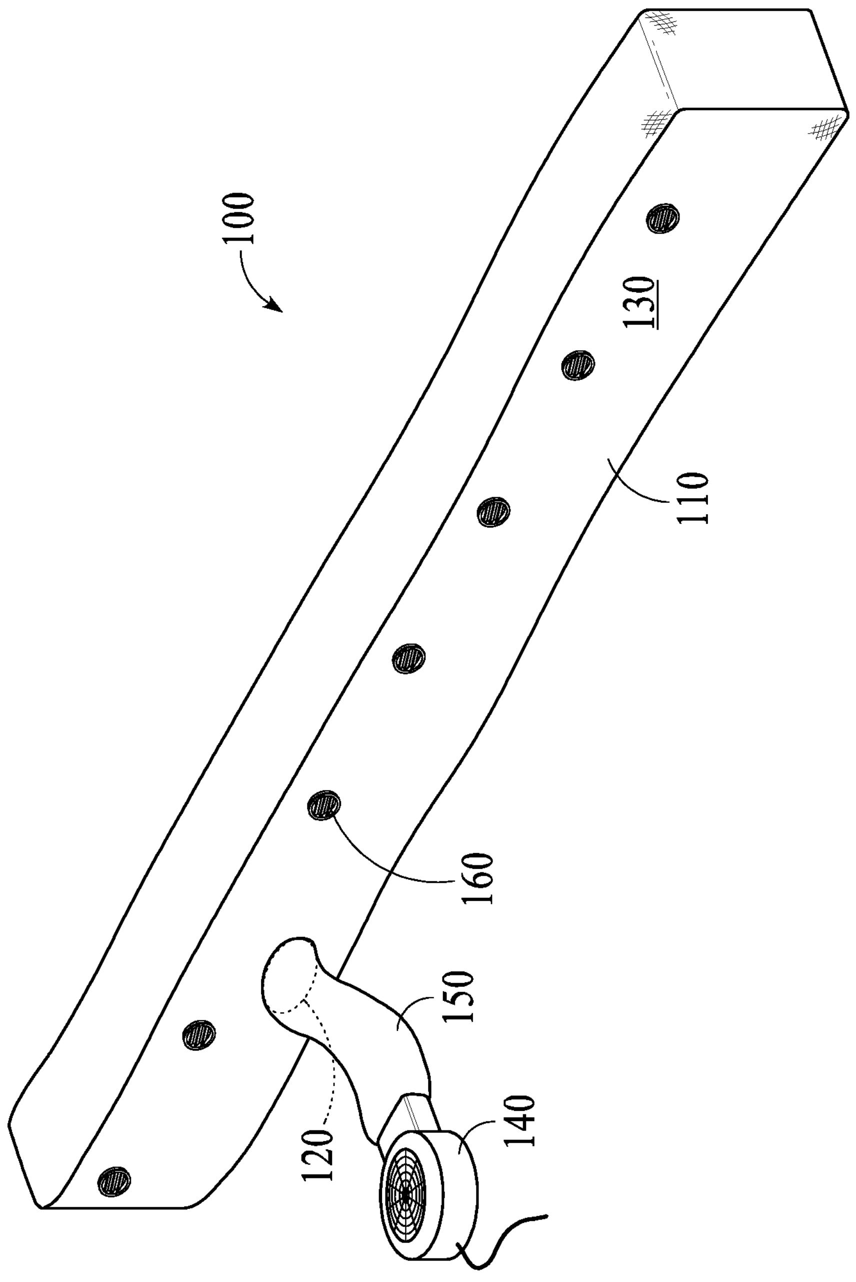
FIG. 1 illustrates an inflatable barrier according to an embodiment of the invention.

FIG. 1 illustrates an inflatable barrier 100 according to an embodiment of the invention. Inflatable barrier 100 comprises an inflatable bag 110 with a first opening 120 located on a first side 130. Inflatable bag 110 may generally be in the shape of a block, or any other shape that is suited for separating parts of a space between a ceiling and a ground. Inflatable bag 110 is made of a rugged material that withstands puncturing. In some embodiments, the material is fire-rated. In further embodiments, the material is coated on the inside with an impermeable layer to reduce air leakage. In yet further embodiments, the material is lightweight and machine washable.

First opening 120 is configured to receive air inflow from a first air mover 140. In some embodiments, first air mover 140 is connected to first opening 120 via a hose 150.

Inflatable bag 110 further comprises one or more vents 160 on first side 130. In some embodiments, a vent may be removable and replaceable.

Figure 2:
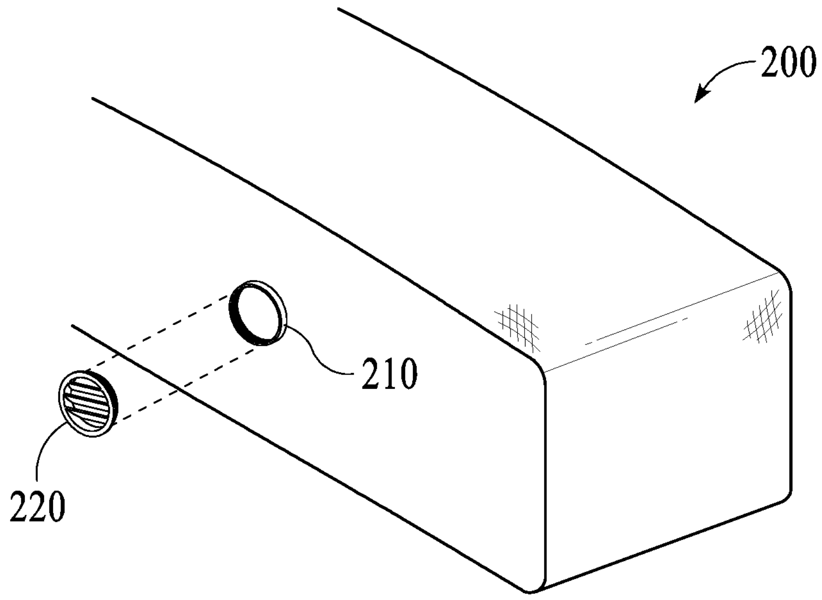
FIG. 2 illustrates a vent and a vent carrier according to an embodiment of the invention.

FIG. 2 illustrates a vent 220 and a vent carrier 210 according to an embodiment of the invention. In this embodiment, inflatable barrier 200 comprises vent 220 that is removable and replaceable. Vents may be configured to let out air in a preferred direction, for example in an angle of 15, 30, or 45 degrees. Vents may be color coded (or otherwise coded) to indicate the air angle. For instance, vents could have a number of vanes that indicate the angle, for example 5 vanes for 15 degrees, 4 vanes for 30 degrees, and 3 vanes for 45 degrees. A user may remove vent 220 from vent carrier 210, and if required, replace it with a different vent, for example to change the angle of air flow.

Figure 3:
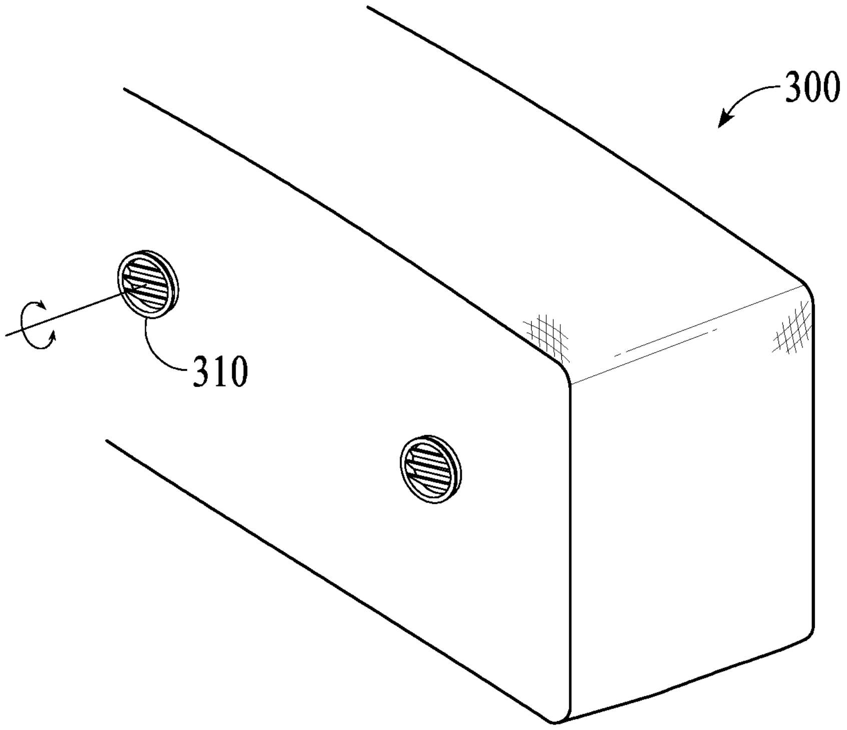
FIG. 3 illustrates an inflatable barrier with a vent that can be rotated, according to an embodiment of the invention.

FIG. 3. illustrates an inflatable barrier 300 with a vent 310 that can be rotated, according to an embodiment of the invention. Vent 310 is mounted in a vent carrier (not visible) that allows vent 310 to be rotated. By rotating vent 310, a user can adjust the air direction. If the air already comes out in an angle, it can be adjusted to blow up, down, sideways, or in any other required angle.

Figure 4:
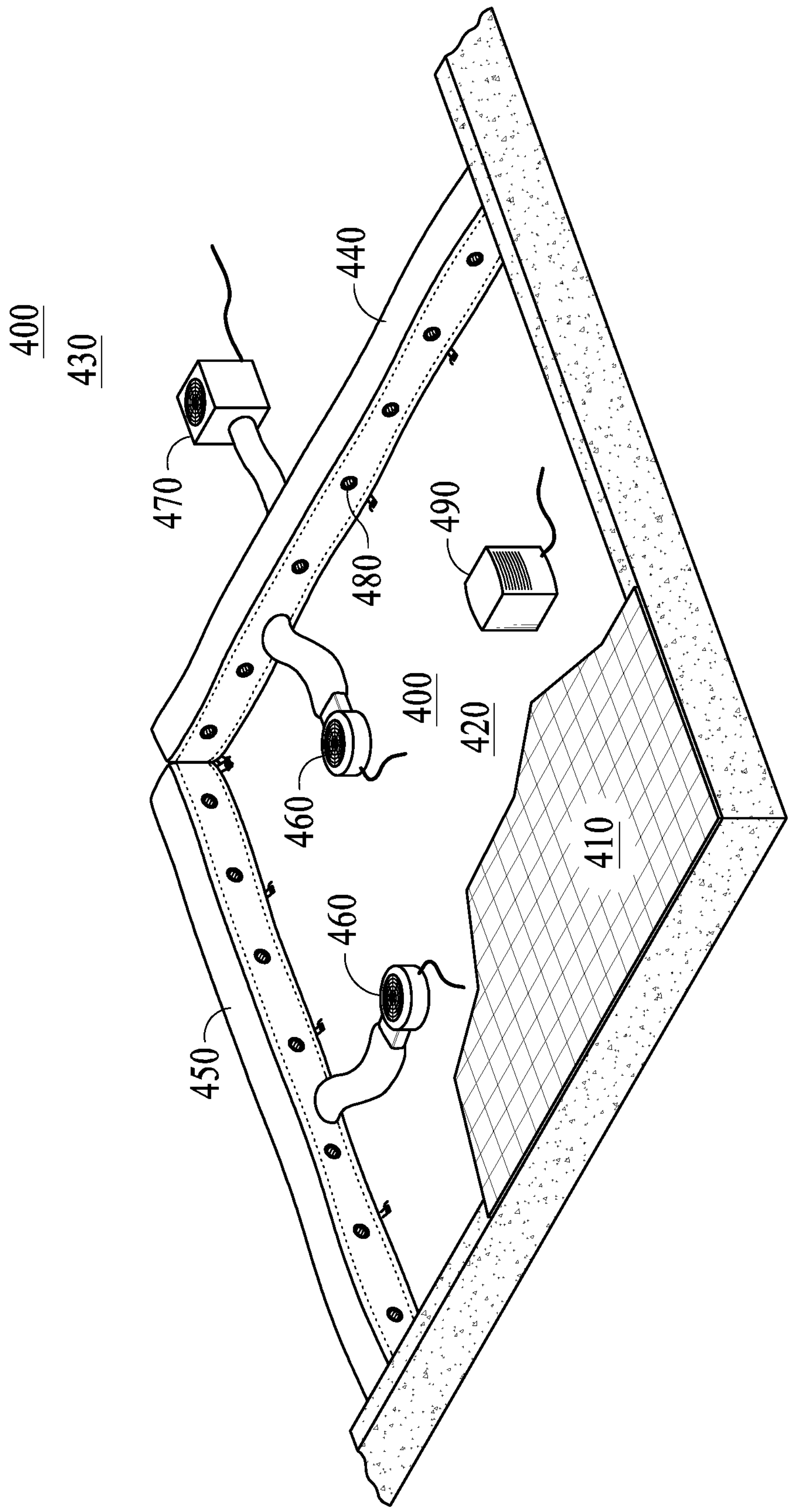
FIG. 4 illustrates an example of using embodiments of the invention in a crawlspace.

FIG. 4 illustrates an example of using embodiments of the invention in a crawl space 400. Crawl space 400 is located below a floor 410 and is partitioned in first section 420 which needs to be dried, and second section 430 which does not need to be dried. Crawl space 400 has one or more dehumidifiers 490 (dehu's), located in first section 420. A first inflatable barrier 440 and a second inflatable barrier 450 separate first section 420 from second section 430. Each first inflatable barrier 440 and second inflatable barrier 450 are connected with an air mover 460, and first inflatable barrier 440 is additionally connected with a heat injector 470.

Heat injector 470 takes in air from second section 430 and heats the air before injecting it into first inflatable barrier 440. The hot air inflates first inflatable barrier 440, so that it becomes a wall in crawl space 400 from its bottom to the underside of floor 410. The hot air also escapes first inflatable barrier 440 via vents 480, blowing into first section 420, which it dries out as a result of its temperature, humidity, and speed. The air mover 460 connected with first inflatable barrier 440 recycles air from first section 420 into first inflatable barrier 440, so that it stays sufficiently inflated. As is apparent from FIG. 4, second inflatable barrier 450 may function well without a heat injector. Air injected from first section 420 by its air mover 460 keeps second inflatable barrier 450 sufficiently inflated. The one or more dehumidifiers 490 may further heat and remove moisture from the recycling air.

Figure 5:
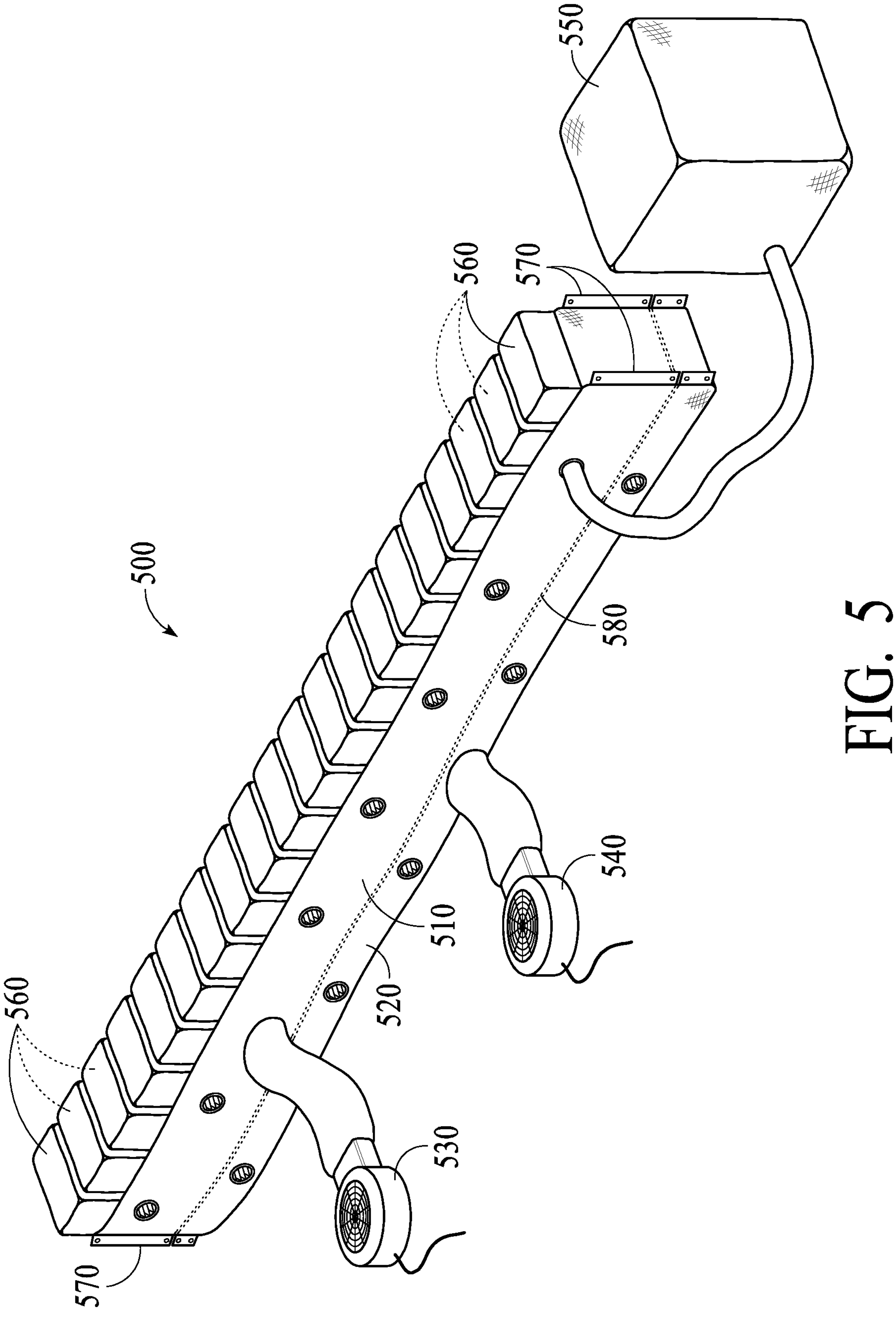
FIG. 5 illustrates a combination of two embodiments of the invention.

FIG. 5 illustrates a combination 500 of two embodiments of the invention. Combination 500 includes first inflatable barrier 510 mounted on top of second inflatable barrier 520. First inflatable barrier 510 is connected with first air mover 530, and second inflatable barrier 520 is connected with second air mover 540. First inflatable barrier 510 is additionally connected, via one of its vents, with air block 550. First inflatable barrier 510 further features towers 560 at its top, and connector flaps 570 at its corners.

First inflatable barrier 510 and second inflatable barrier 520 are vertically connected via connectors 580, which provide the capability to do so without creating a horizontal air gap. By stacking two or more inflatable barriers, potentially of different standard heights, it is possible to build a combined inflatable barrier of any height that may be required. As was shown in FIG. 4, it may also be required to combine two or more inflatable barriers horizontally. Connector flaps 570 provide the capability to do so without creating a vertical air gap. Embodiments may provide connectors in any direction, including vertical and horizontal connectors in an x/y/z coordinate system, as well as in any other angles to such coordinate systems. Connectors may or may not include a flap. In some embodiments, connectors may further include a snap, a hook-and-loop fastener (for example, such as provided by Velcro), a zipper, a tie, a hook, a loop or ring, or any other connection mechanism known in the art.

Figure 6:
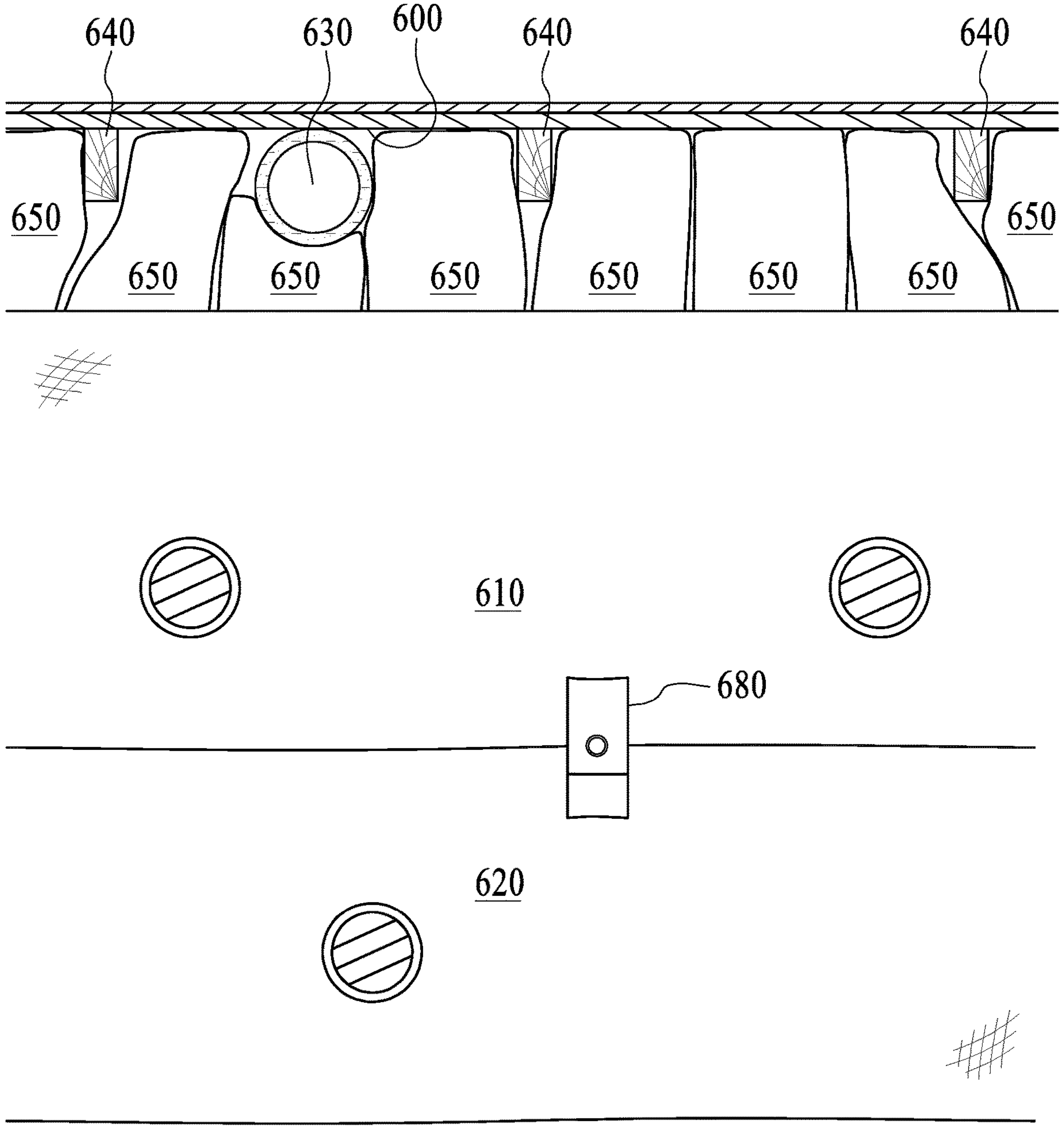
FIG. 6 illustrates how towers, according to an embodiment of the invention, can minimize air gaps right below a ceiling.

The towers 560 at the top of first inflatable barrier 510 allow filling up the height of a crawl space while leaving minimal gaps due to features at the bottom of the crawl space ceiling, as will be shown with respect to FIG. 6. Although FIG. 5 shows towers 560 for clarity drawn at a little distance from each other, in embodiments towers 560 may be directly adjacent to each other.

The air block 550 provides an optional extension to first inflatable barrier 510 and/or second inflatable barrier 520. A user may use a vent for connecting a hose to inflate air block 550. Air leaving first inflatable barrier 510 enters and inflates air block 550 to fill up gaps and/or irregularities of a crawlspace.

FIG. 6 illustrates how towers 650, according to an embodiment of the invention, can minimize air gaps right below a ceiling 600. A first inflatable barrier 610 is mounted on top of a second inflatable barrier 620 using connector 680. Ceiling 600 has features such as sewer pipe 630 and support beams 640. By providing extra surface area, towers 650 can more accurately follow the profile at the bottom of ceiling 600, thereby minimizing air gaps around those ceiling features.

Embodiments may provide towers in a variety of shapes, including single blocks lined up along the length of an inflatable barrier as shown in the figures, or as extensions with other shapes such as cylinders, puckers, balls, multiple blocks, and any other shapes that provide additional surface area.

Figure 7:
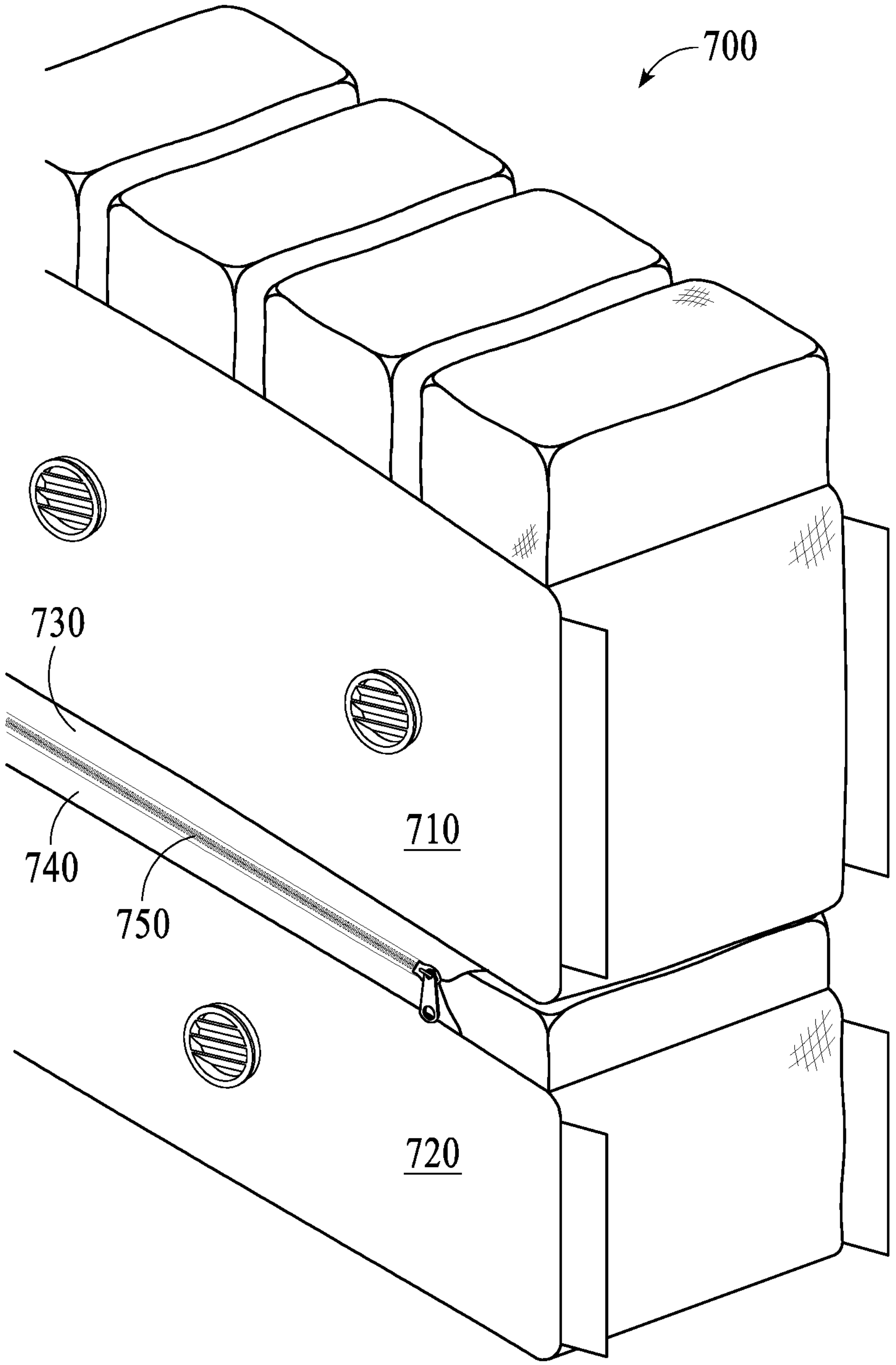
FIG. 7 illustrates a combination of two inflatable barriers with zipper connectors according to an embodiment of the invention.

FIG. 7 illustrates a combination 700 of two inflatable barriers with zipper connectors according to an embodiment of the invention. Combination 700 includes first inflatable barrier 710 and second inflatable barrier 720. First inflatable barrier 710 has a first connector flap 730, and second inflatable barrier 720 has a second connector flap 740. First connector flap 730 and second connector flap 740 each include part of zipper 750. Zipper 750 provides a fast and convenient way to connect first connector flap 730 and second connector flap 740, and thereby to connect first inflatable barrier 710 and second inflatable barrier 720.

Figure 8:
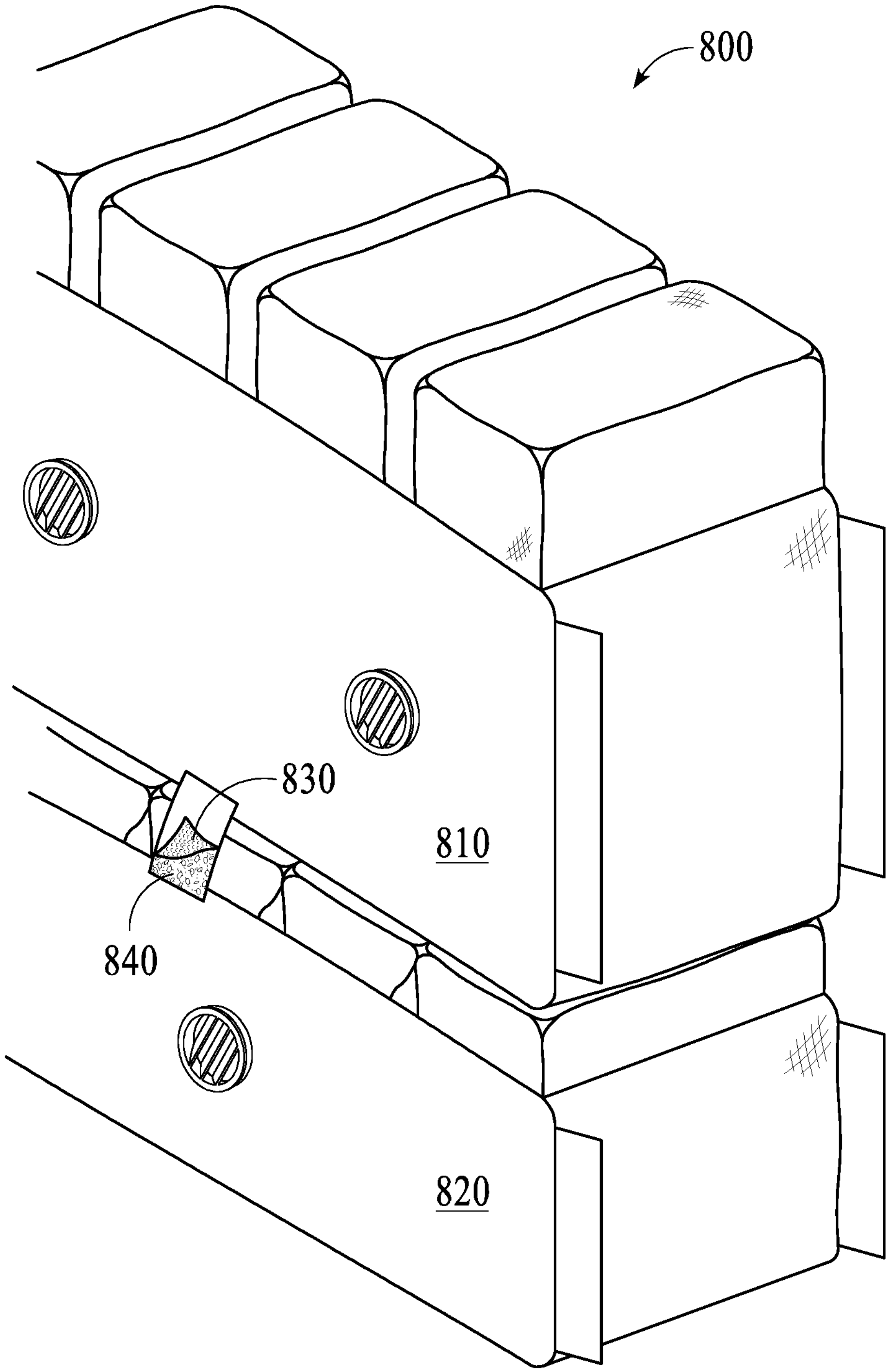
FIG. 8 illustrates a combination of two inflatable barriers with hook-and-loop fastener connectors according to an embodiment of the invention.

FIG. 8 illustrates a combination 800 of two inflatable barriers with hook-and-loop fastener connectors according to an embodiment of the invention. Combination 800 includes first inflatable barrier 810 and second inflatable barrier 820. First inflatable barrier 810 has a first connector flap 830 and second inflatable barrier 820 has a second connector flap 840. First connector flap 830 and second connector flap 840 each include part of a hook-and-loop fastener, such that first inflatable barrier 810 and second inflatable barrier 820 can be connected to each other fast and conveniently.

Figure 9:
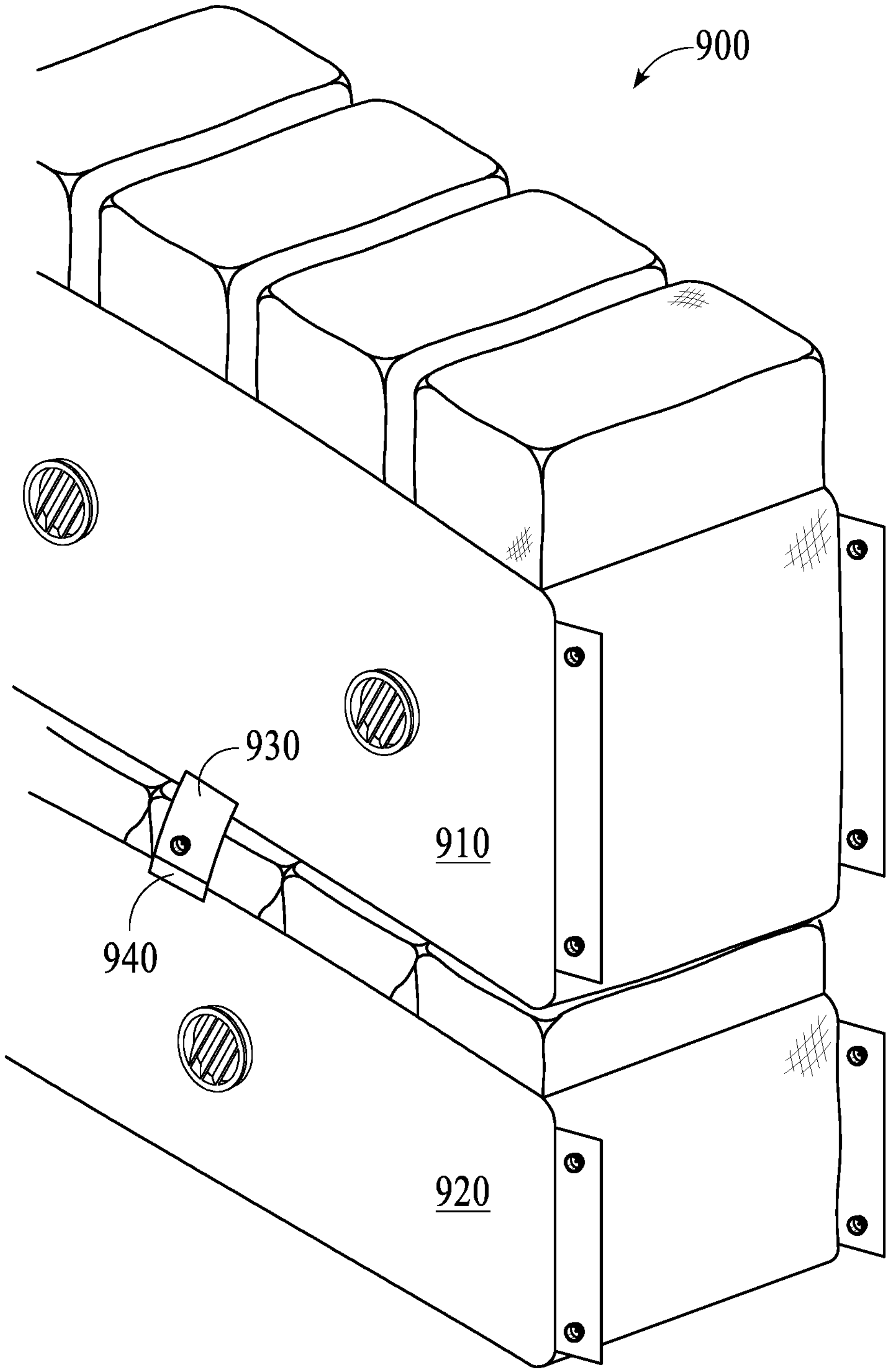
FIG. 9 illustrates a combination of two inflatable barriers with snap connectors according to an embodiment of the invention.

FIG. 9 illustrates a combination 900 of two inflatable barriers with snap connectors according to an embodiment of the invention. Combination 900 includes first inflatable barrier 910 and second inflatable barrier 920. First inflatable barrier 910 has a first connector flap 930 and second inflatable barrier 920 has a second connector flap 940. First connector flap 930 and second connector flap 940 each include part of a complementary pair of snaps, such that first inflatable barrier 910 and second inflatable barrier 920 can be connected to each other fast and conveniently.

Figure 10:
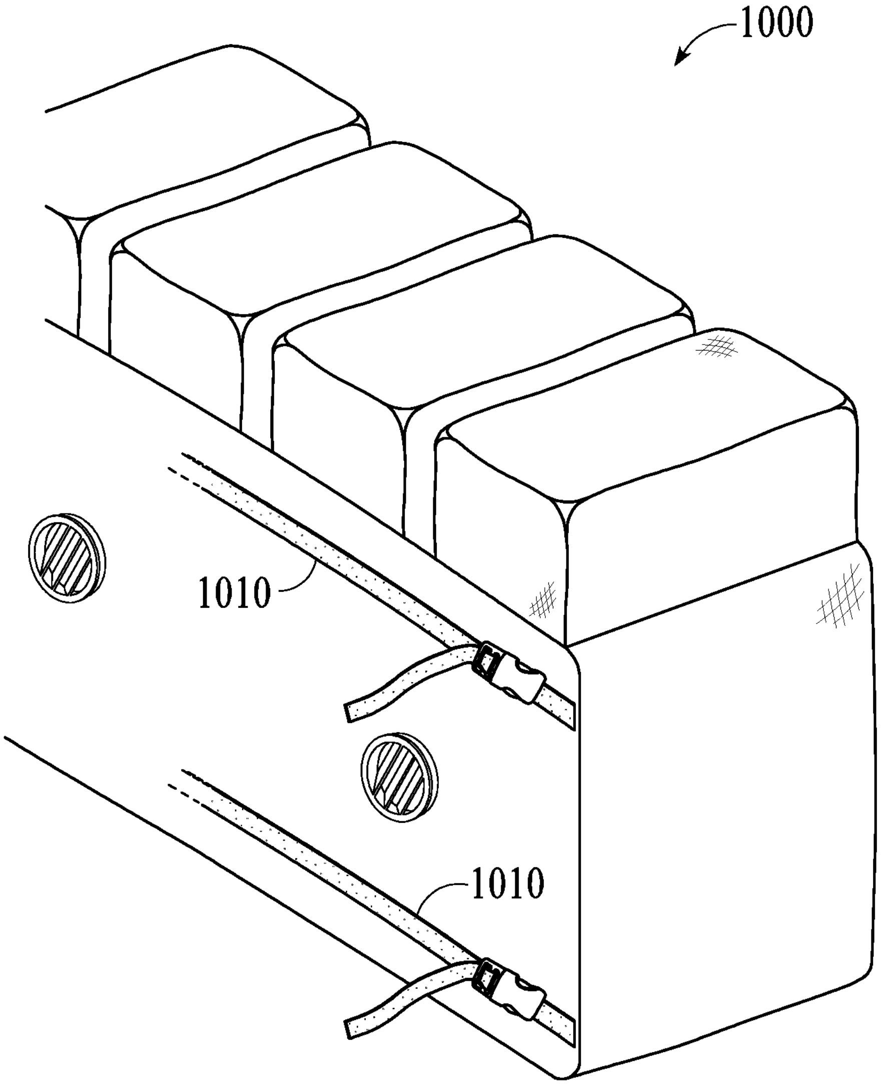
FIG. 10 illustrates an inflatable barrier with straps according to an embodiment of the invention.

FIG. 10 illustrates an inflatable barrier 1000 with straps 1010 according to an embodiment of the invention. Straps 1010 may be positioned at the front or back, or both, of inflatable barrier 1000. The lengths of straps 1010 are adjustable, which allows for curving and/or shortening inflatable barrier 1000. Straps 1010 on the front of inflatable barrier 1000 allow for curving forward, and straps (not shown) on the back of inflatable barrier 1000 allow for curving backward. In some embodiments, straps 1010 are removable. An embodiment with straps 1010 both on the front and the back allows for shortening inflatable barrier 1000.

Figure 11:
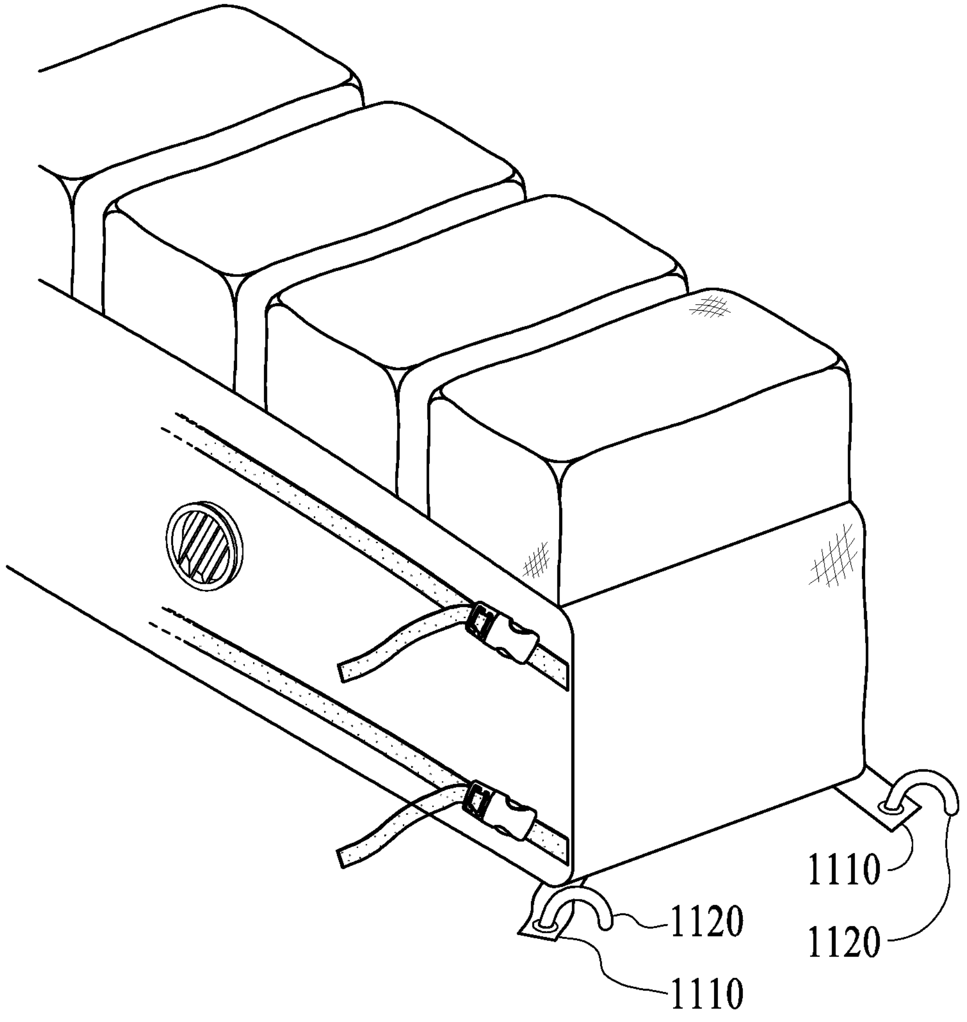
FIG. 11 illustrates an inflatable barrier with anchor tabs according to an embodiment of the invention.

FIG. 11 illustrates an inflatable barrier 1100 with anchor tabs 1110 according to an embodiment of the invention. The embodiment may provide anchor tabs 1110 at one or more corners. An anchor tab may include a grommet through which a user can insert an anchor 1120 to fasten inflatable barrier 1100 to a crawl space ground, or generally, an anchor tab may include any provisions known in the art that allow fastening inflatable barrier 1100 to the crawl space ground.

Figure 12:
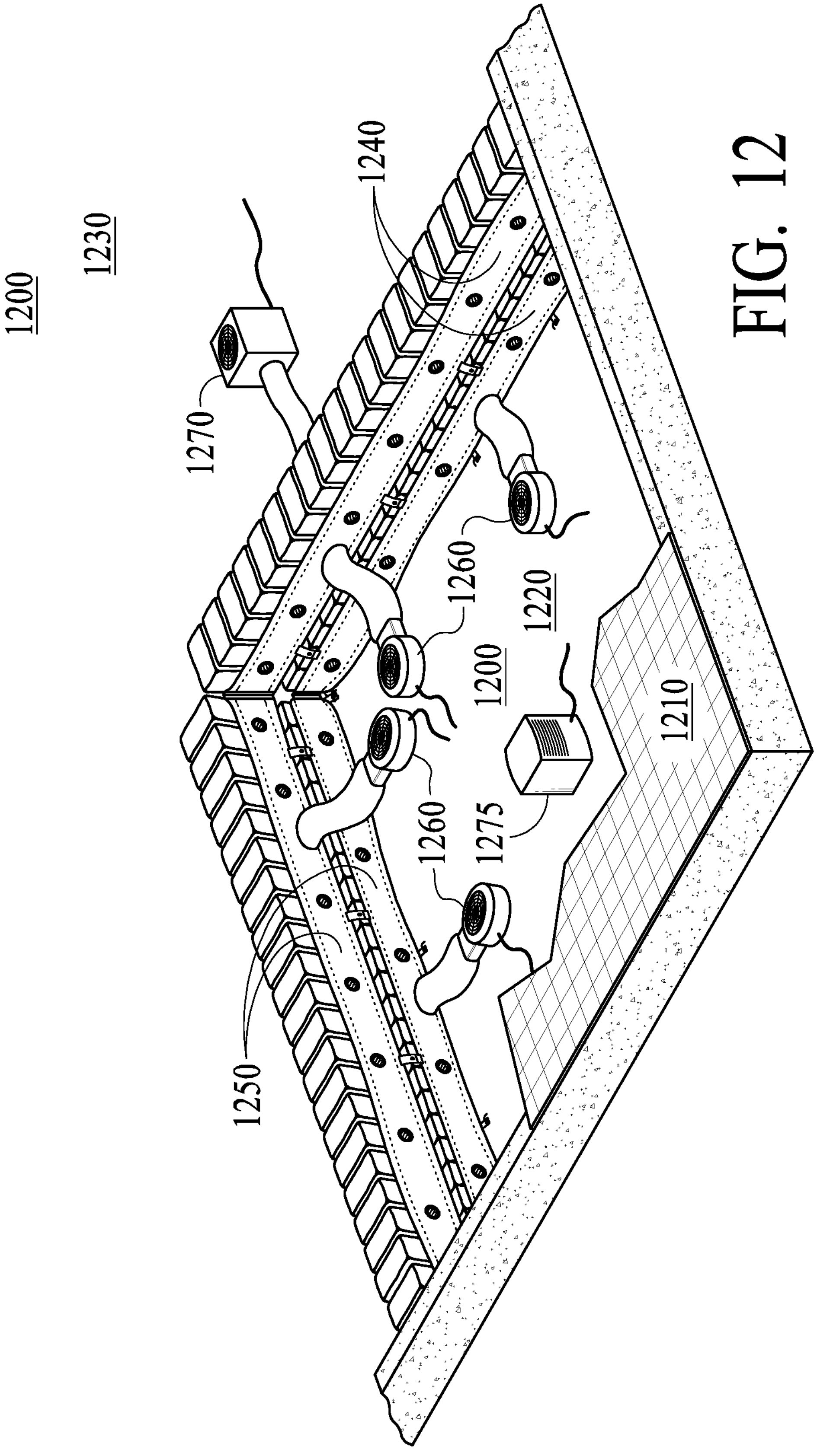
FIG. 12 illustrates an example of using several inflatable barriers to dry a section of a crawl space according to an embodiment of the invention.

FIG. 12 illustrates an example of using several inflatable barriers to dry a section of a crawl space 1200 according to an embodiment of the invention. Crawl space 1200 is located below a floor 1210 and is partitioned in first section 1220 which needs to be dried, and second section 1230 which does not need to be dried. Crawl space 1200 has one or more dehumidifiers (dehu 1275), that are located in first section 1220. A first combination 1240 of inflatable barriers and a second combination 1250 of inflatable barriers separate first section 1220 from second section 1230. Each of the individual inflatable barriers in first combination 1240 and second combination 1250 is connected with at least one air mover 1260, and one or more of the individual inflatable barriers may also be connected with a heat injector 1270. By stacking sufficient inflatable barriers, the height of crawl space 1200 is fully blocked. By side-connecting sufficient inflatable barriers, a sufficient part of the circumference of first section 1220 is blocked off.

Heat injector 1270 takes in air from second section 1230, heats it, and injects it into one of the inflatable barriers. The one or more dehu 1275's dry out and also heat the air, and with dry warm air moving around first section 1220, moisture is removed efficiently.

Figure 13:
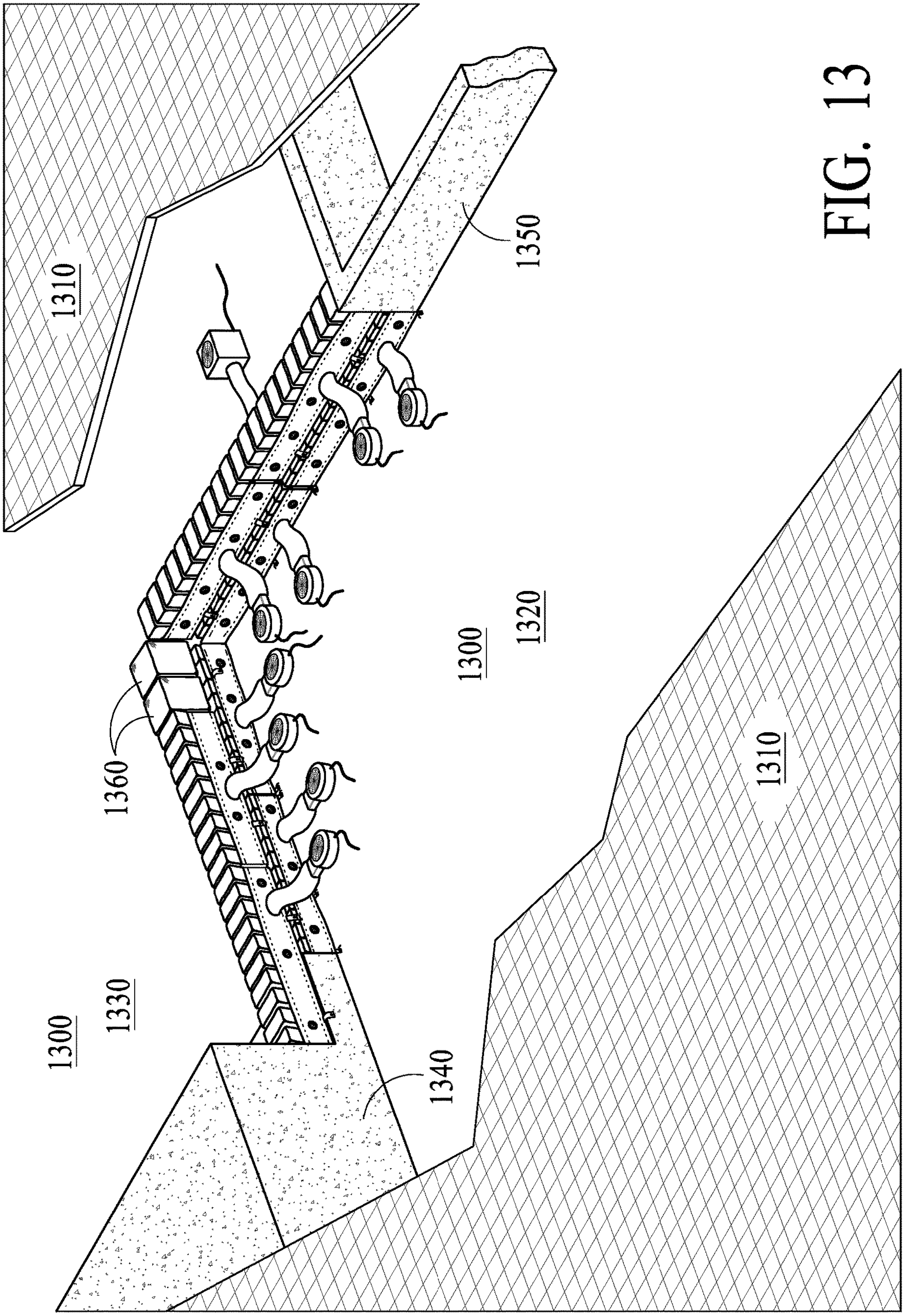
FIG. 13 illustrates another example of using several inflatable barriers to dry a section of a crawl space according to an embodiment of the invention.

FIG. 13 illustrates another example of using several inflatable barriers to dry a section of a crawl space 1300 according to an embodiment of the invention. Crawl space 1300 is located below a floor 1310 and is partitioned in first section 1320 which needs to be dried, and second section 1330 which does not need to be dried. Crawl space 1300 includes first wall 1340 and second wall 1350, which may have features such as corners and partial extensions that don't fill up the full height of crawl space 1300. Convenient placement of air blocks 1360 allows full separation of first section 1320 from second section 1330.

Figure 14A:
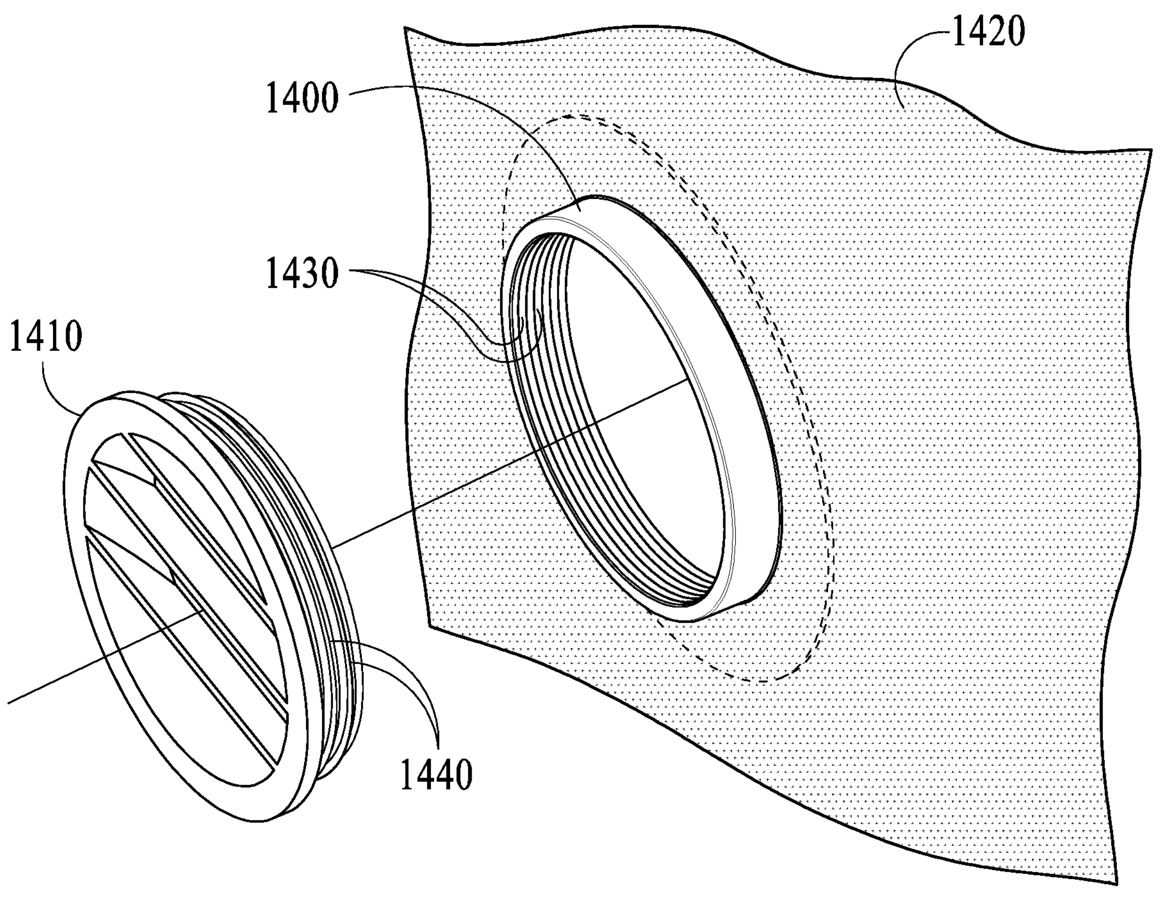
FIGS. 14A-C illustrate a vent carrier and a vent according to an embodiment of the invention.
Figure 14B:
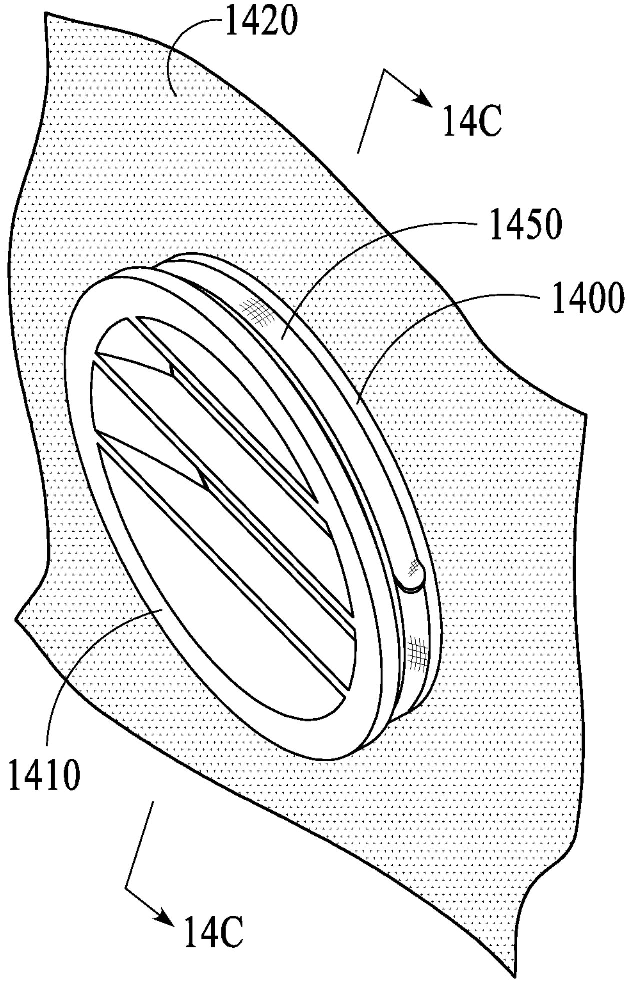
Figure 14C:
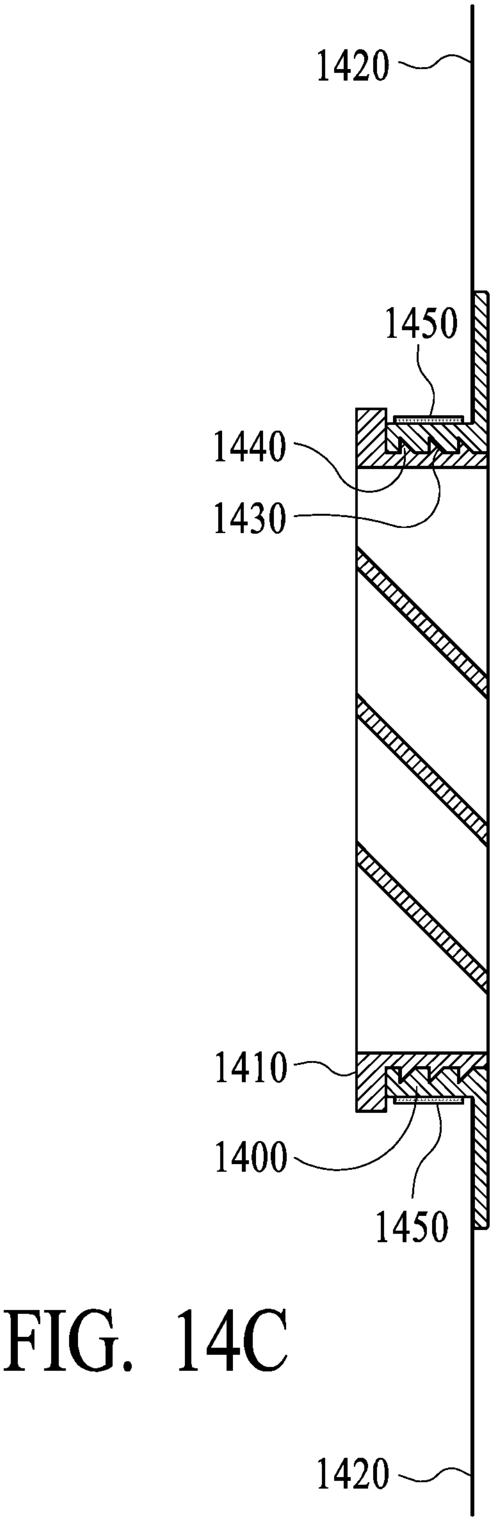

FIGS. 14A-C illustrate a vent carrier 1400 and a vent 1410 according to an embodiment of the invention. The function of vent carrier 1400 is to allow a user to connect and disconnect vent 1410 to and from inflatable barrier 1420 (a small part of whose fabric is shown), as well as rotate it in any desired direction. FIG. 14A shows vent 1410 and vent carrier 1400 separately. FIG. 14B shows a perspective view of vent carrier 1400 with vent 1410 inserted. FIG. 14C shows a cross-cut of FIG. 14B. With regular use, inflatable barrier 1420 will get dirty, and users may want to wash it, for example in a washing machine. However, in a washing machine, hard parts are undesirable, so in an embodiment, vent carrier 1400 may be made from a soft material, for example polyurethane, which may be sewn or glued to the fabric, whereas vent 1410 may be made, for example, from a hard plastic. Vent carrier 1400 fits around vent 1410, and when vent 1410 has been inserted into vent carrier 1400, it can rotate as desired. A user may firmly attach vent 1410 to vent carrier 1400 by tying a strap 1450 around vent carrier 1400, as shown in FIGS. 14B-C. Strap 1450 may be a simple rope, a tie wrap, a zip tie, or a strap with hook and loop fastener areas, such as made by Velcro, or any other strap that firmly ties vent carrier 1400 to vent 1410.

In an embodiment, vent carrier 1400 may have inside facing barbs 1430, and vent 1410 may have matching outside facing barbs 1440. The barbs will further strengthen a connection between vent carrier 1400 and vent 1410 when strap 1450 is tied around vent carrier 1400. However, the barbs leave it sufficiently easy to disconnect vent 1410 from vent carrier 1400 when no strap is tied around vent carrier 1400.

Figure 15:
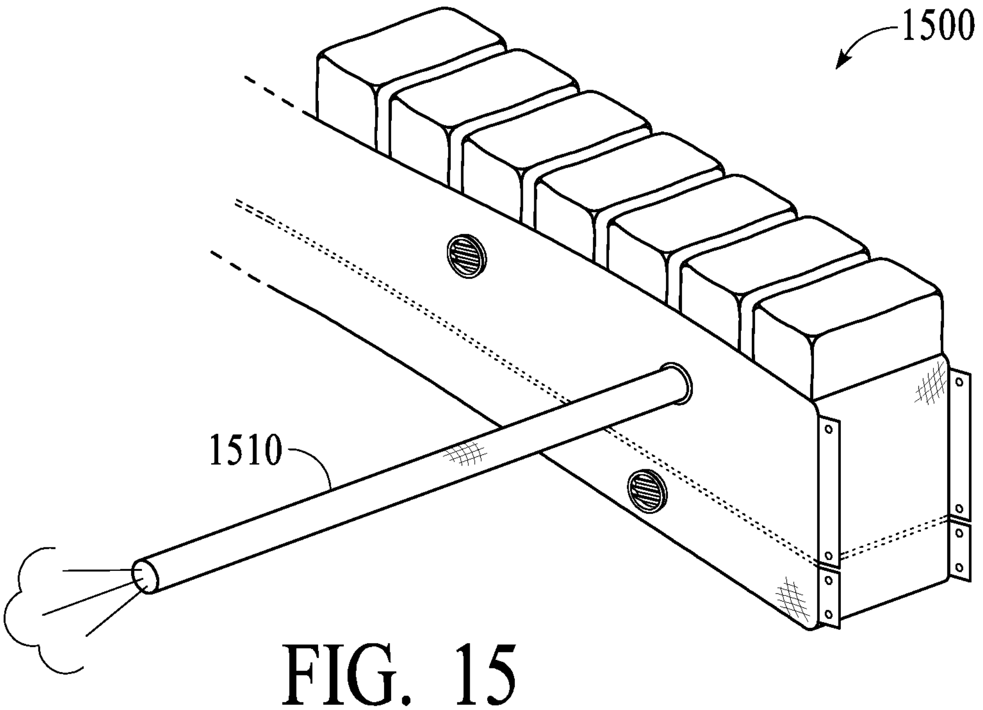
FIG. 15 illustrates an air focus hose according to an embodiment of the invention.

FIG. 15 illustrates an air focus hose 1510 according to an embodiment of the invention. An air focus hose allows a user to direct air flow at specific objects or locations that are wetter than their surroundings and that need additional air flow to dry fast enough. Air focus hose 1510 is connected to inflatable barrier 1500 at a vent carrier. Air focus hose 1510 may be made of a low-cost flexible plastic, such as low-density polyethylene (LDPE). In this way, a user may reuse air focus hose 1510 as needed, and recycle it when done. In other embodiments, air focus hose 1510 may be made of the same material as inflatable barrier 1500. In further embodiments, air focus hose 1510 may be internally reinforced with a metal or plastic spiral or other reinforcement. One manner of connecting air focus hose 1510 to inflatable barrier 1500 is to insert a vent into a vent carrier (both not shown), then insert the vent carrier into air focus hose 1510, and subsequently tie a strap around air focus hose 1510, the vent carrier, and the vent. During operation, inflatable barrier 1500 is inflated, and air escapes through the vent into air focus hose 1510. Air focus hose 1510 transports the air from its entrance at inflatable barrier 1500 to its exit at the other end. Since the material is flexible, a user can place the exit wherever needed, and use any convenient method to keep it in place. One basic method is to place a stone or other weight in the exit or elsewhere inside to prevent it from moving. Another method is to stick it to some surface, for example using duct tape, an adhesive, a nail, a screw, a staple, or a zip tie.

Figure 16:
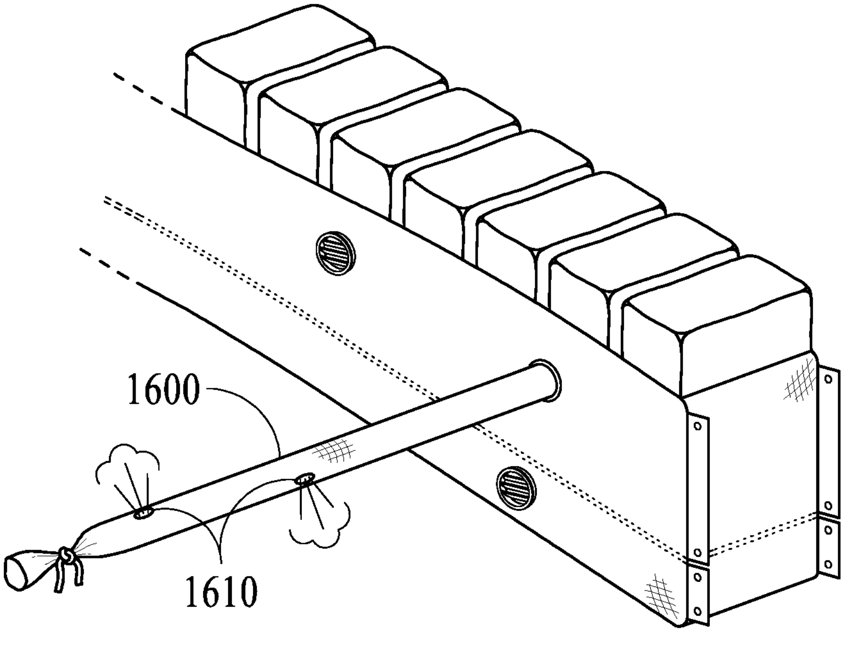
FIG. 16 illustrates usage of the air focus hose with sideway outlets according to an embodiment of the invention.

FIG. 16 illustrates usage of the air focus hose 1600 with sideway outlets 1610 according to an embodiment of the invention. Sideway outlets 1610 provide a user extra flexibility to direct the air as needed. The user ties up the end of air focus hose 1600 if no air flow is needed there, and cuts one or a few holes to form sideway outlets 1610 as needed. Again, the user can place air focus hose 1600 in any desired path by using one or more stones or other weights to weigh it down, and/or by sticking it to any convenient surface.

Figure 17:
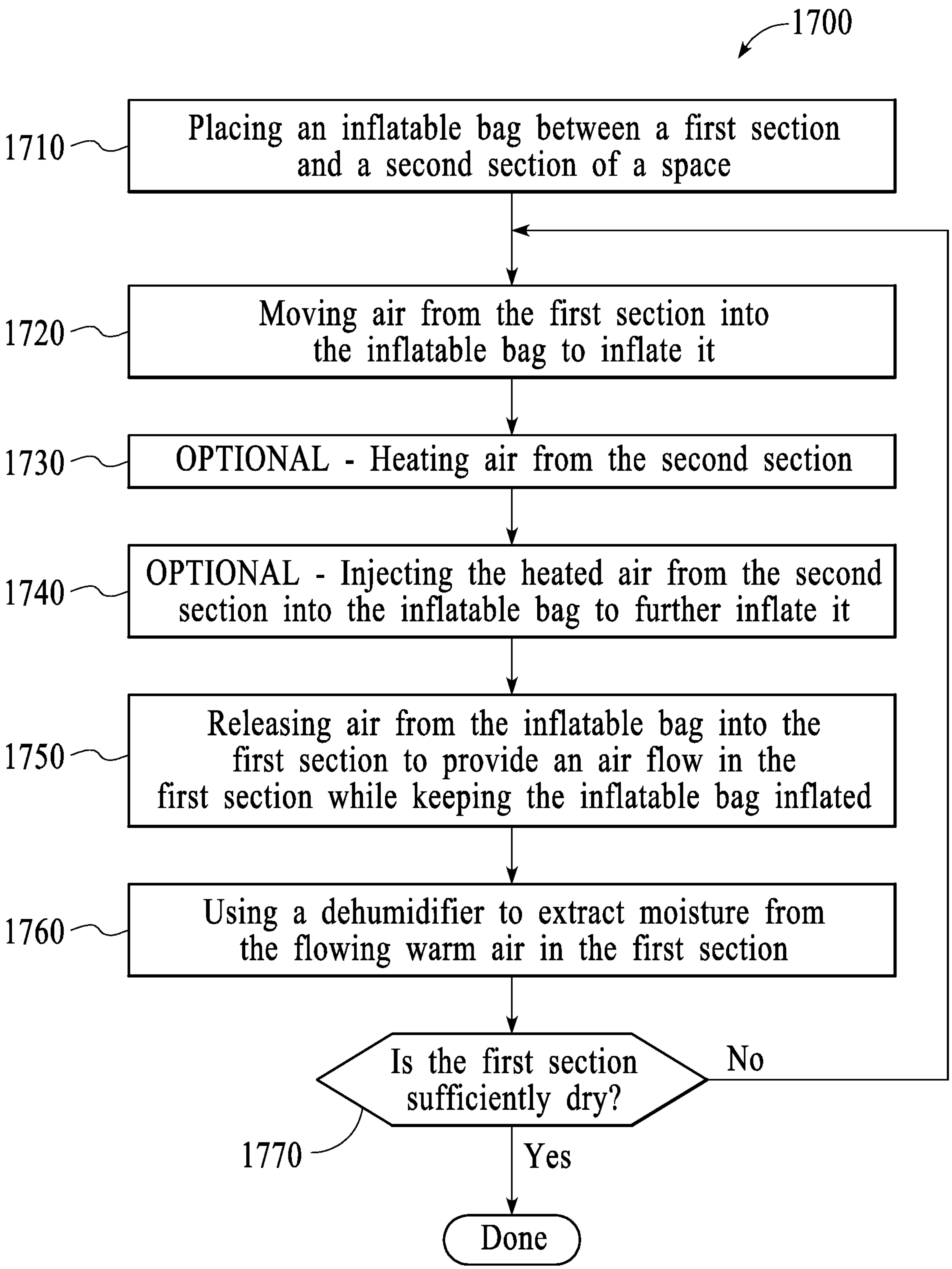
FIG. 17 illustrates a method of drying a first section of a space according to an embodiment of the invention.

FIG. 17 illustrates a method 1700 of drying a first section of a space according to an embodiment of the invention. Method 1700 comprises the following steps.

Step (a) 1710—Placing an inflatable bag between the first section and a second section of the space. The bag is placed such that, when inflated, it cordons off the first section from the second section. The first section needs to be dried. The second section may not need to be dried.

Step (b) 1720—Moving air from the first section into the inflatable bag to inflate it.

Step (c) 1730—OPTIONAL—Heating air from the second section.

Step (d) 1740—OPTIONAL—Injecting the heated air from the second section into the inflatable bag to further inflate it.

Step (e) 1750—Releasing air from the inflatable bag into the first section to provide an air flow in the first section while keeping the inflatable bag inflated. The flowing warm or hot air will absorb moisture from structures, floors, and/or ceilings in the first section.

Step (f) 1760—Using a dehumidifier or desiccant to extract moisture from the flowing warm air in the first section.

Step (g) 1770—Repeating steps (b)-(f) until the first section has reached a dry standard. The dry standard may be an industry dry standard.

Figure 18:
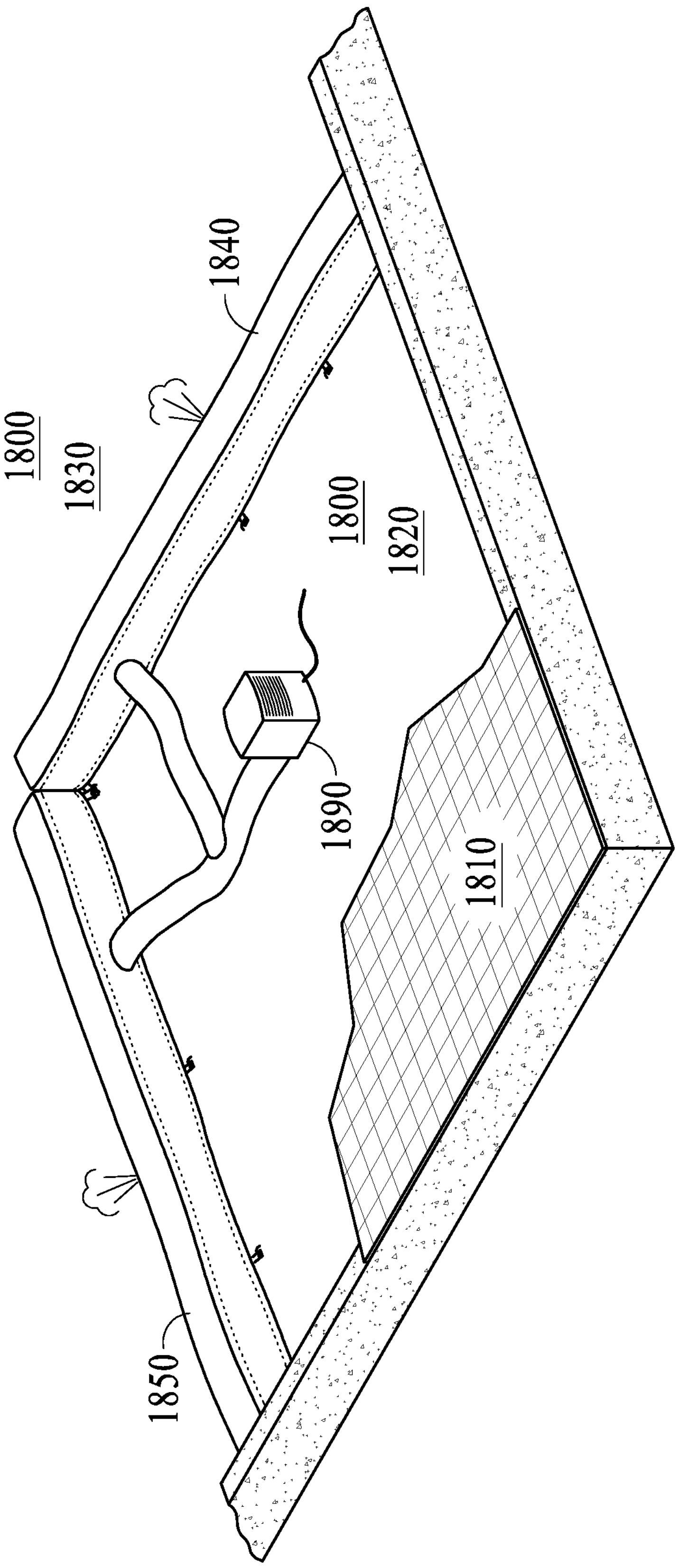
FIG. 18 illustrates an example of using inflatable barriers to contain mold in a section of a crawl space according to an embodiment of the invention.

FIG. 18 illustrates an example of using inflatable barriers to contain mold, lead, asbestos, or other contaminants in a section of a crawlspace 1800 according to an embodiment of the invention. Crawlspace 1800 is located below floor 1810 and is partitioned in a first section 1820 which needs to be made hygienic, and second section 1830 which does not need to be treated. First section 1820 is separated from second section 1830 by (in this example) first inflatable barrier 1840 and second inflatable barrier 1850. Both are connected with filtering air mover 1890, which may include a high-efficiency particulate air (HEPA) filter, or any other filter capable of effectively removing non-hygienic particles from the air. Filtering air mover 1890 is located inside first section 1820, and filters and moves air from first section 1820 into first inflatable barrier 1840 and second inflatable barrier 1850. These inflate, and hence cordon first section 1820 off from second section 1830. Clean air may be released into second section 1830 or anywhere else. As a result of the air being taken out of first section 1820, it will have a lower air pressure than second section 1830. Clean air may seep back into first section 1820 through gaps and replace air that has been removed.

Figure 19:
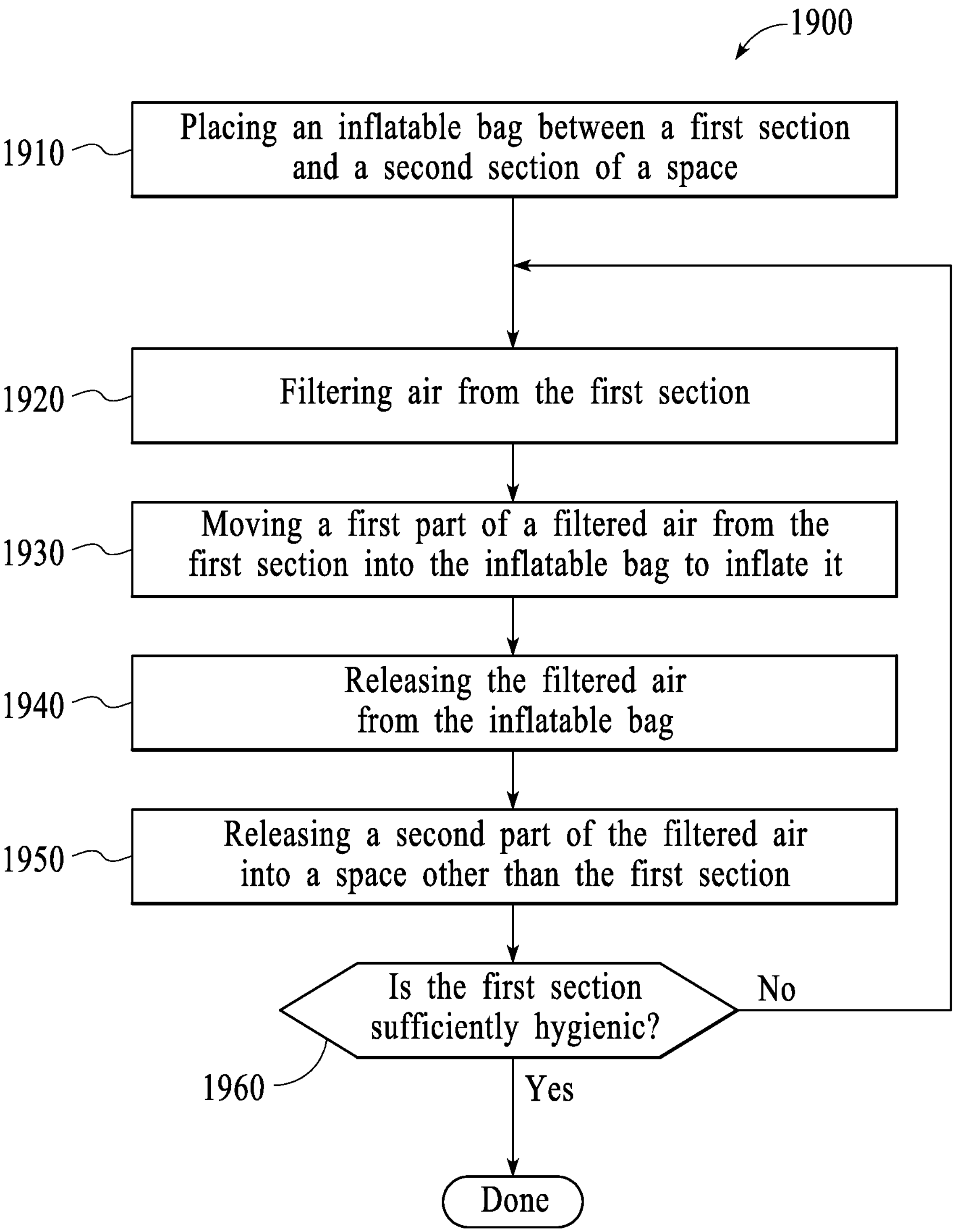
FIG. 19 illustrates a method of containing contaminants in a first section of a space according to an embodiment of the invention.

FIG. 19 illustrates a method 1900 of containing contaminants in a first section of a space according to an embodiment of the invention. A contaminant may be, for example, mold, lead, asbestos, an airborne infective agent, a poisonous or disease-causing gas or dust, etc. The method comprises the following steps.

Step 1910—Placing an inflatable bag between a first section and a second section of a space. Embodiments place the inflatable bag such that (once inflated) it separates the first section from the second section.

Step 1920—Filtering and/or cleaning air from the first section, for example using a HEPA filter. A HEPA filter reduces the number of particles in the air, thereby making the air more hygienic. In another example, an embodiment cleans the air by exposing it to UV light. Yet another embodiment removes gaseous pollutants using adsorption or chemisorption. Embodiments may use any type of filter that effectively removes the contaminants from the air.

Step 1930—Moving a first part of the filtered air into the inflatable bag to inflate it. This results in the physical separation of the first and second sections.

Step 1940—Releasing the filtered air from the inflatable bag. An embodiment releases the filtered air through one or more relatively small openings, to keep the pressure in the inflatable bag high enough to keep it inflated.

Step 1950—Releasing a second part of the filtered air into a space other than the first section. By moving part of the filtered air out of the first section to a location outside of the (building that includes the) first section, the embodiment can keep the first section at a lower air pressure ("negative air pressure") than the second section, preventing leakage of contaminants, infective agents, poisonous or disease-causing gases, etc. from the first section into the second section.

Step 1960—Determining if the first section is sufficiently hygienic by determining if the presence of contaminants in the first section is sufficiently low. Upon determining that the first section is not sufficiently hygienic, repeating steps 1920 through 1960. Upon determining that the first section is sufficiently hygienic, the method may end. In an embodiment, mold may be measured with a mold test kit such as those that are readily available in the industry. For other contaminants, embodiments use commensurate measuring equipment.

While a user may often place an inflatable bag horizontally on the floor, in some circumstances the user may decide to place the inflatable bag vertically, i.e. on one of its sides, for example to close off a door opening.

In case there is a need to provide a safe space, for example a room where people with COPD can protect themselves from polluted air (smog or another regional air pollution event), the method may be reversed in the sense that the second space is the safe space (a room with overpressure), and the surroundings are the first space (atmospheric pressure). Protected people would stay in the room with overpressure, while the air mover with HEPA and/or other filters would be outside (the first space).

Figure 20:
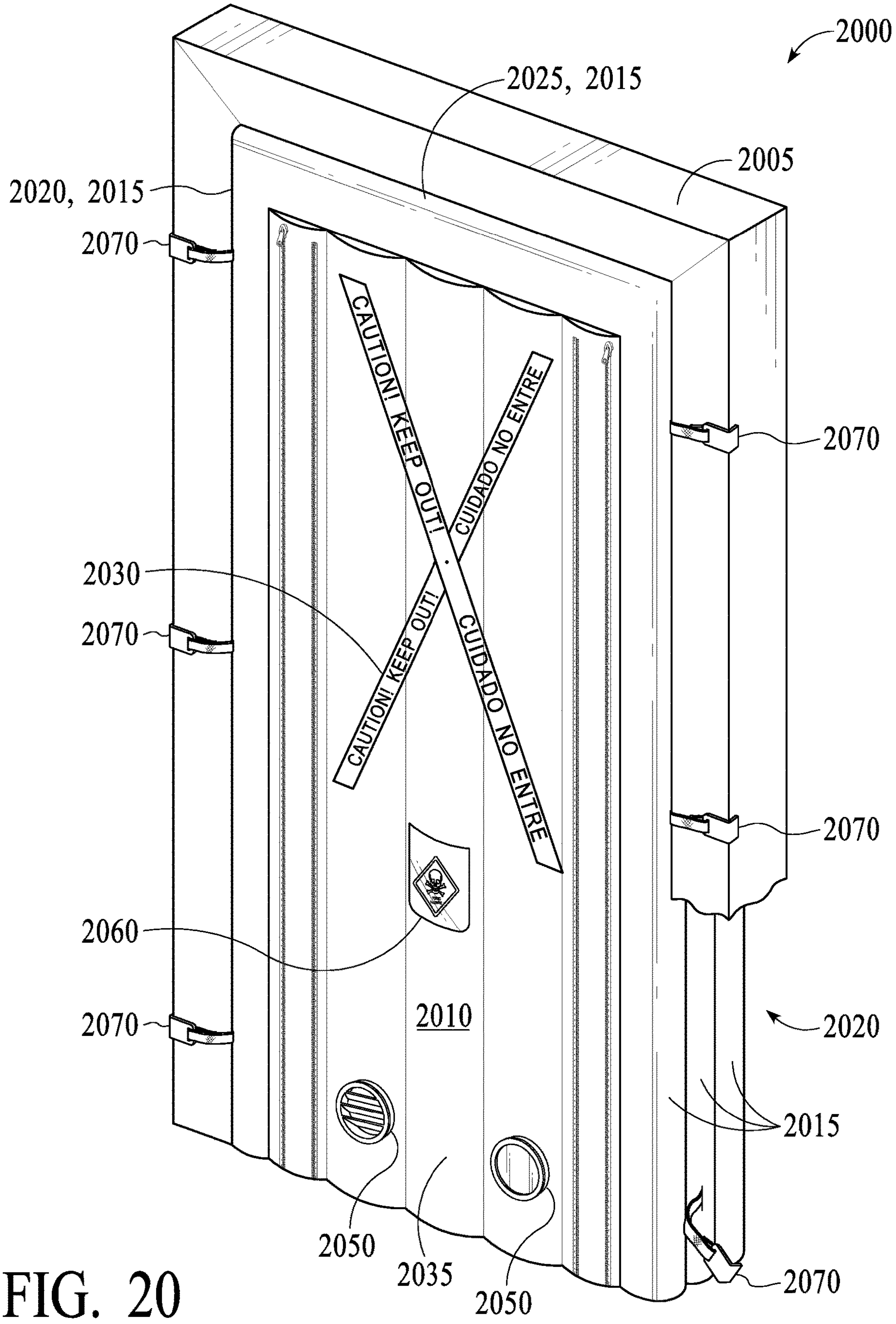
FIG. 20 illustrates an inflatable barrier optimized for use in a doorway according to an embodiment of the invention.

FIG. 20 illustrates an inflatable barrier 2000 optimized for use in a doorway 2005 according to an embodiment of the invention. Inflatable barrier 2000 includes inflatable bag 2010 with edge seals 2015 on the sides 2020 and top 2025. At the front, inflatable barrier 2000 features warnings 2030 in one or more languages. The warnings 2030 may be in the shape of a letter X, enforcing a message to stay out. At the bottom 2035 are two vent carriers 2050, which may hold vents or closed lids. Inflatable barrier 2000 further features a clear window 2060 behind which information may be inserted, and edge hooks 2070, which may be used to clamp inflatable barrier 2000 to the edges of a doorway, such that in case of a malfunction or a loss of power, containment is minimally compromised. Edge hooks 2070 may be adjustable to fit a range of door frame sizes. FIG. 20 shows inflatable barrier 2000 from the side of a clean and/or dry area, where people may be moving around.

The inflatable bag 2010 is generally in a shape (for example a block shape) that allows separating air in a first section of space in a building from air in a second section of space in the building. The first section may be in the front of and the second section may be behind the inflatable barrier 2000. Generally, a user will just temporarily place inflatable barrier 2000 in between the first section and the second section, and separate them temporarily.

Figure 21A:
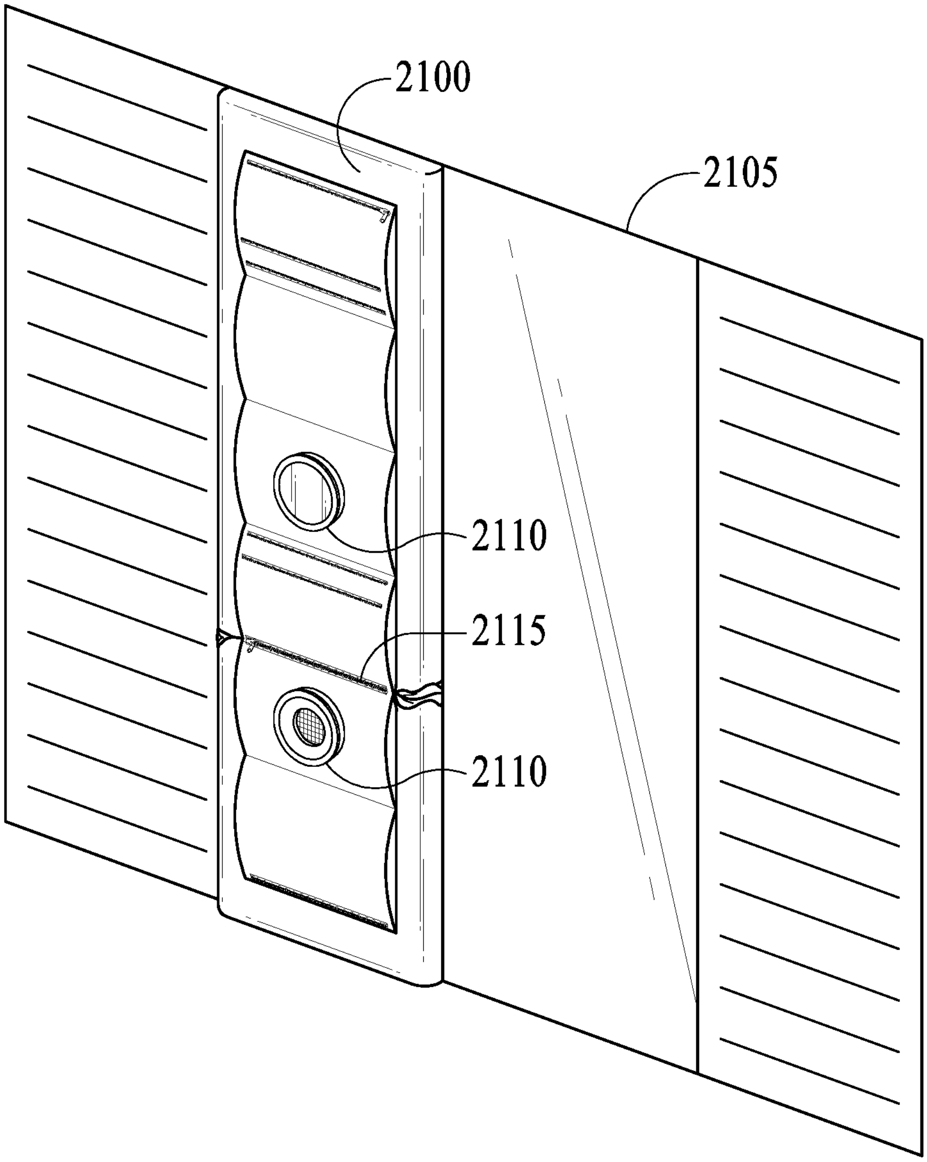
FIGS. 21A-B illustrate an inflatable barrier optimized for use in a window according to an embodiment of the invention.
Figure 21B:
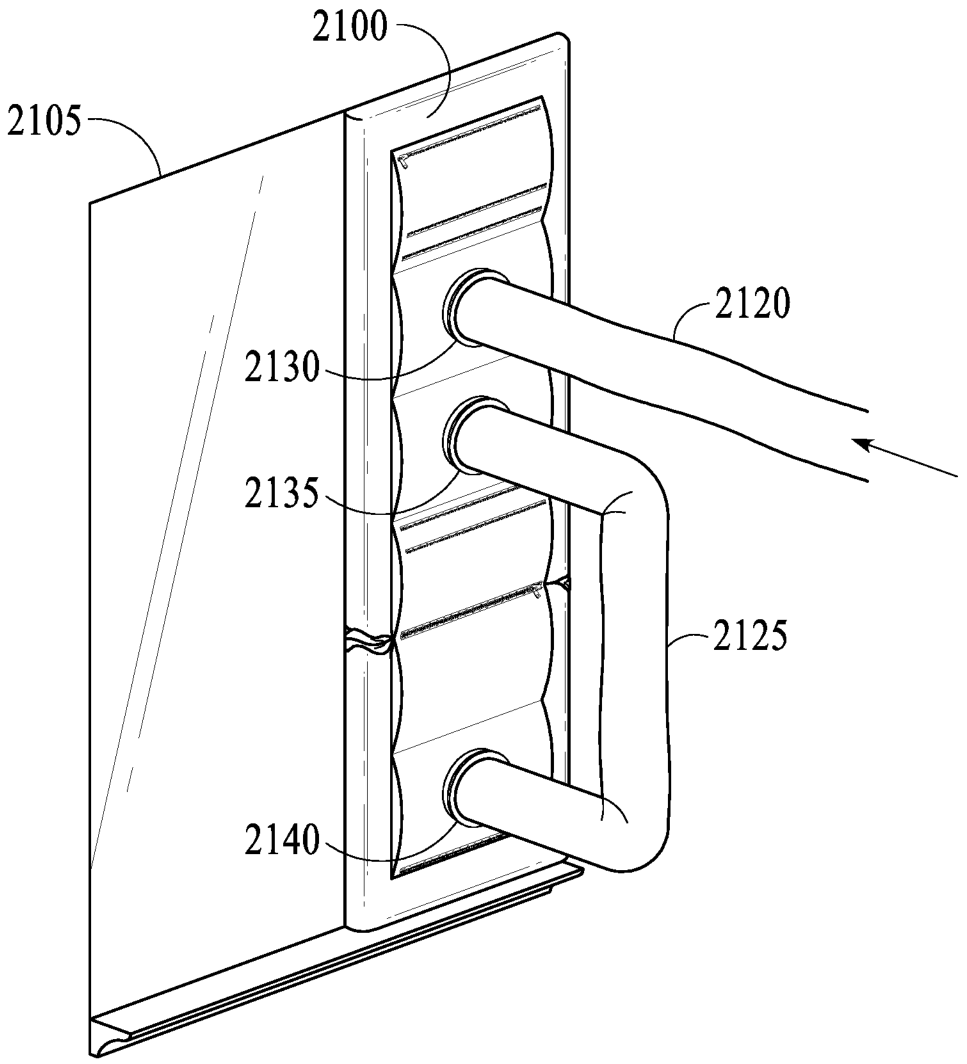

FIGS. 21A-B illustrate inflatable barriers 2100 optimized for use in a window 2105 according to an embodiment of the invention. FIG. 21A depicts inflatable barriers 2100 from the outside, for example from outside a building. Half of window 2105 is closed, the other half is open and has two inflatable barriers stacked into it. The lower inflatable barrier has two sections, the upper has four sections. The inflatable barriers 2100 are chained with connectors 2115, which may include zippers as drawn, or flaps with snaps, hooks and loops, or any other connection method known in the art. While FIG. 21A shows embodiments with four and two sections respectively, an embodiment may have any number of sections. Each embodiment includes a vent carrier and/or a vent 2110, and vent 2110 may include a screen to keep insects and other creatures out of the inflatable bag. Vent 2110 is placed on a chamber or air tube inside the inflatable bag at least partially separated from other chambers or air tubes inside the inflatable bag. This separation may be achieved by one or more septa sewn into the main body of the inflatable bag (for example, one septum on either side of the chamber), or similar means.

FIG. 21B depicts inflatable barriers 2100 from the inside, for example from inside the building. Air enters the upper inflatable barrier via air inflow tube 2120, which may be a polystyrene hose temporarily coupled with vent carrier 2130, or it may be an air inflow tube permanently coupled with the inflatable bag. The air leaves the upper inflatable barrier via vent carrier 2135 and air tube 2125, which is temporarily coupled with the lower inflatable barrier at vent carrier 2140.

Whereas FIGS. 21A-B show the use of two inflatable barriers in a window, a user may decide to use only one, or stack more than two, dependent on the size of a window and on sizes of available inflatable barriers. Even though FIGS. 21A-B show that a user has stacked a larger inflatable barrier on top of a smaller one, he or she may stack inflatable barriers in any order. And although FIG. 21B shows how air may be looped from a first inflatable barrier to a second one, a user may equally well provide separate inflatable barriers each with their own air flow.

Figure 22:
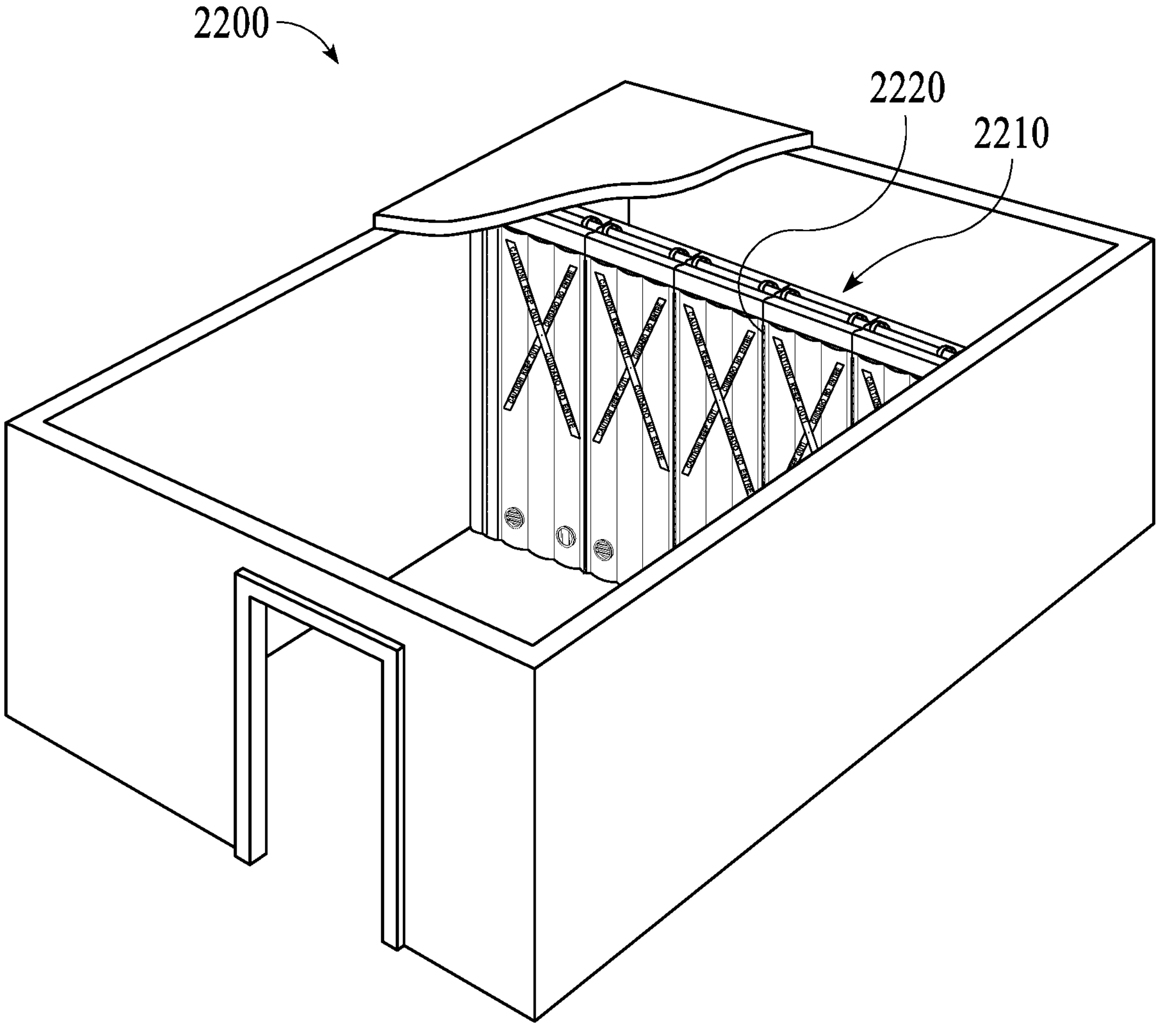
FIG. 22 illustrates a room with two or more inflatable barriers chained on their sides according to an embodiment of the invention.

FIG. 22 illustrates a room 2200 with two or more inflatable barriers 2210 chained on their sides according to an embodiment of the invention. Each of the inflatable barriers 2210 includes a connector 2220 on at least one of its sides. Connector 2220 may be or may include a zipper connector, such that two or more adjacent inflatable barriers 2210 may be connected to form a wall that can separate two sections of space from each other. Each of the inflatable barriers 2210 touches both the floor and the ceiling of room 2200, so that air may not flow below or over the wall. The connector 2220 is configured to stop the air, too, so that no air flows between the two sections of space via a gap between adjacent inflatable barriers 2210. The only flow of air, if any, is through the inflatable barriers 2210. A user may place inflatable barriers 2210 in a straight line, as shown, or in accordion formation, or any combination of those two.

Figure 23:
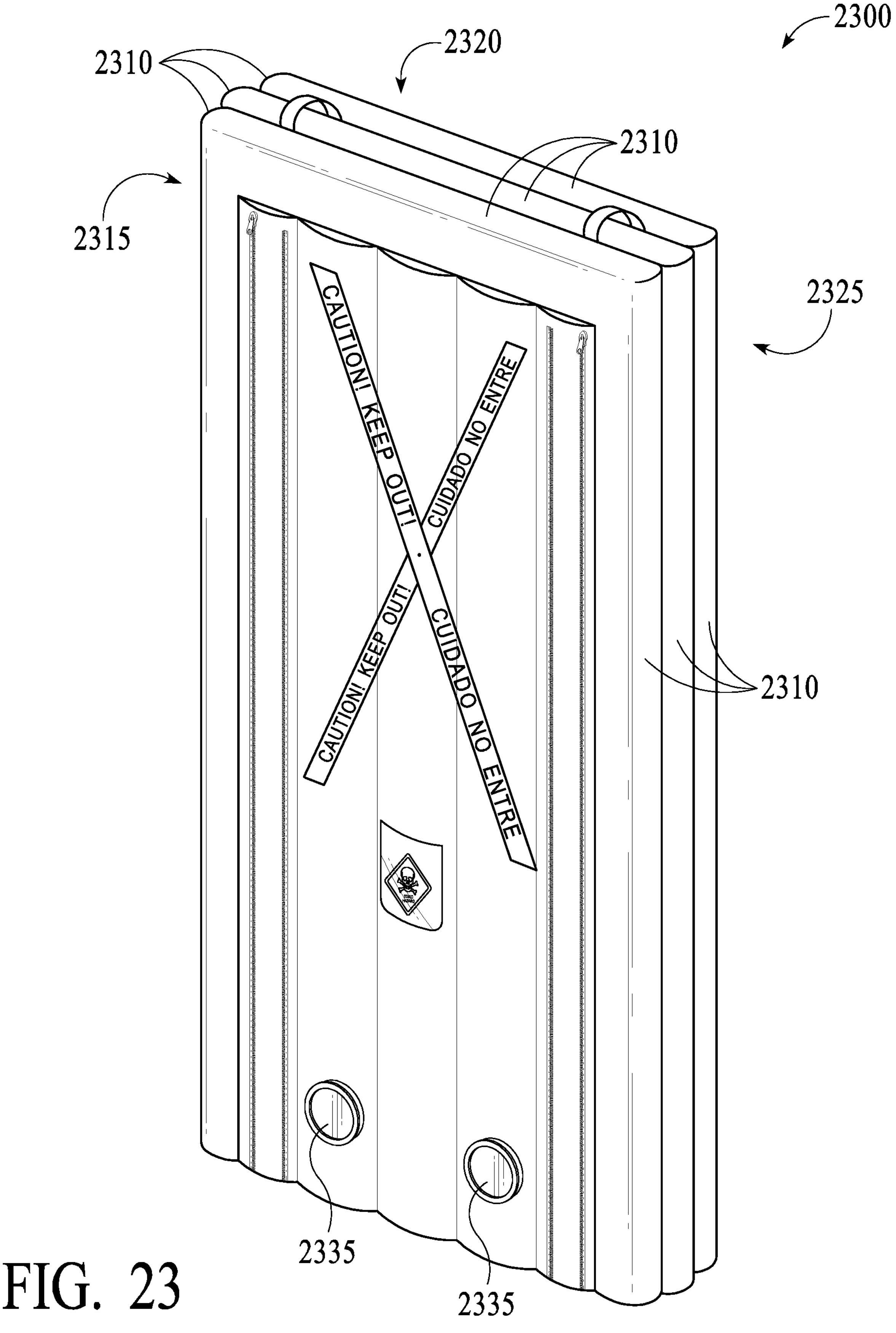
FIG. 23 illustrates an inflatable barrier with edge seals optimized for use in a doorway according to an embodiment of the invention.

FIG. 23 illustrates an inflatable barrier 2300 with edge seals 2310 optimized for use in a doorway according to an embodiment of the invention. Along a first side 2315, a top 2320, and a second side 2325, inflatable barrier 2300 features two or more edge seals 2310, wherein each of the edge seals 2310 is or includes an inflatable tube that runs in parallel with first side 2315, top 2320, and/or second side 2325. FIG. 23 shows three parallel edge seals 2310, a number that has experimentally proven to be effective for closing gaps along a doorway. However, an embodiment may include any number of edge seals. The example embodiment in FIG. 23 further shows vent carriers 2335, which may hold vents, rings, or closed lids. A ring may provide rigidity or structure to a flexible vent carrier without restricting air flow.

Figure 24:
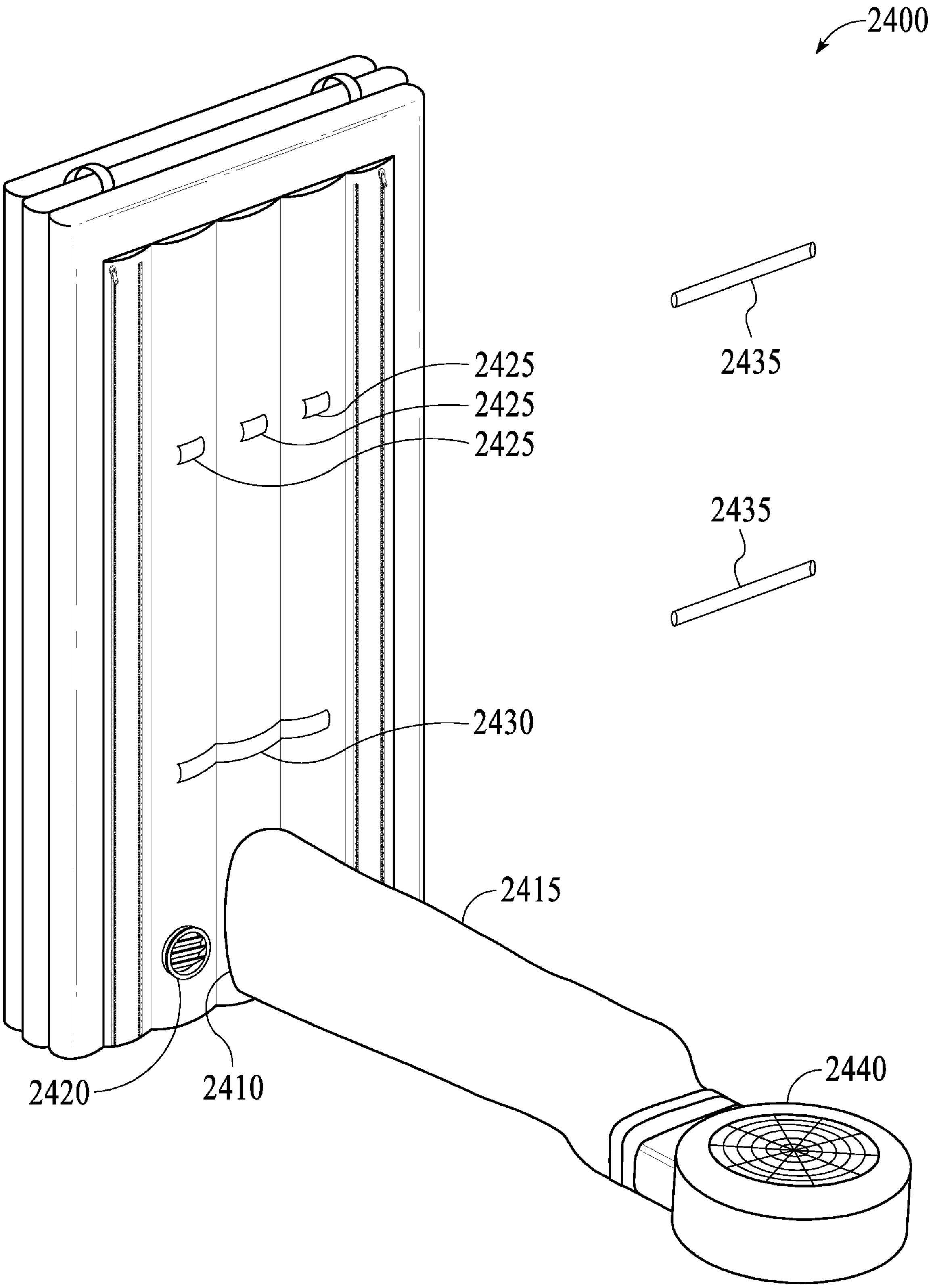
FIG. 24 illustrates details at the back of an inflatable barrier according to an embodiment of the invention.

FIG. 24 illustrates details at the back of an inflatable barrier 2400 according to an embodiment of the invention. Whereas FIG. 20 showed a perspective from the side of a clean and/or dry area, FIG. 24 shows a perspective from inside a room that needs to be dried and/or decontaminated. On this side of inflatable barrier 2400 there may be no people, so some embodiments show no warnings on this side and provide no information window. However, this side does have a first opening 2410 that may permanently or detachably connect to an air inflow tube 2415. Also, the embodiment features vent carriers 2420, which may hold vents, rings, or closed lids. Air inflow tube 2415 is configured to be connected to an air mover 2440, which may take moist or purified air from this side of inflatable barrier 2400, and force it into inflatable barrier 2400. Some embodiments may include a HEPA or other filter in air inflow tube 2415 or in their inflatable bag, whereas other embodiments may rely on a HEPA or other filter integrated into or attached to air mover 2440. Yet other embodiments may attach air inflow tube 2415 directly to an external HEPA or other filter.

Inflatable barrier 2400 further shows one or more sets of sleeves 2425 or sleeves 2430 that may hold a tension rod 2435. When inserted, tension rod 2435 prevents inflatable barrier 2400 from bulging out of shape when inflated, which may happen when inflatable barrier 2400 is placed in an opening that is smaller than its size, thus exerting side load.

FIG. 25 illustrates details at the top of an inflatable barrier 2500 according to an embodiment of the invention. When installing an inflatable barrier in a doorway or window, it is convenient to place the inflatable barrier in the correct position prior to inflating it. Inflatable barrier 2500 includes loops 2510 through which expandable rod 2520 may be placed. Similar to a rod for a shower curtain, expandable rod 2520 allows a user to hang inflatable barrier 2500 in place at the top of a doorway or window. Expandable rod 2520 is drawn wider than inflatable barrier 2500. However, in a practical situation, a doorway is slightly narrower than the width covered by inflatable barrier 2500 and its edge seals, so that the edge seals when inflated seal off any gaps. Therefore, when inflatable barrier 2500 is installed in a doorway and hanging from expandable rod 2520, expandable rod 2520 is configured narrower than drawn here. Loops 2510 may be kept short, so that when inflatable barrier 2500 becomes deflated, no unnecessary gaps open up.

FIGS. 26A-D illustrate alternative details at the top of an inflatable barrier 2600 according to embodiments of the invention. In FIG. 26A, instead of loops, as in FIG. 25, inflatable barrier 2600 features a channel 2605 through the inflatable bag near its top, in which expandable rod 2610 may be placed. Again, expandable rod 2610 allows a user to hang inflatable barrier 2600 in place at the top of a doorway or window prior to inflating it.

In FIG. 26B, the embodiment includes partial loops with snaps 2615. One partial loop may have a male and the other may have a female snap, such that they can snap together and form closed loops as drawn, to hold expandable rod 2610.

In FIG. 26C, the embodiment includes partial loops with loops and hooks fasteners 2620. One partial loop may have a loop fastener and the other may have a hook fastener, such that they can stick together and form a closed loop as drawn, to hold expandable rod 2610.

In FIG. 26D, the embodiment includes hooks 2625. Hooks 2625 are rigid, such that they can be hung onto expandable rod 2610, as drawn. Hooks 2625 may be tight, as drawn, to prevent or minimize an airgap between inflatable barrier 2600 and a door frame or other feature above it.

The embodiments in FIGS. 26A-D show some alternative means with which inflatable barrier 2600 can be suspended from expandable rod 2610. However, embodiments may use any other method known in the art to suspend objects from a rod.

FIG. 27 illustrates details on the bottom of inflatable barrier 2700 according to an embodiment of the invention. This embodiment includes ground piece 2710, which may be made of a stronger material than the remainder of the inflatable bag. Ground piece 2710 may be made of vinyl, coated vinyl, synthetic fiber, or any other material that is resistant to abrasion and puncture. Ground piece 2710 may cover just the bottom of inflatable barrier 2700, as drawn, or it may extend over and also cover the bottom of the edge seals and other parts of the inflatable bag that may touch the ground or other potentially rough surfaces and risk being damaged by debris, nails, and other sharp objects.

Figure 37A:
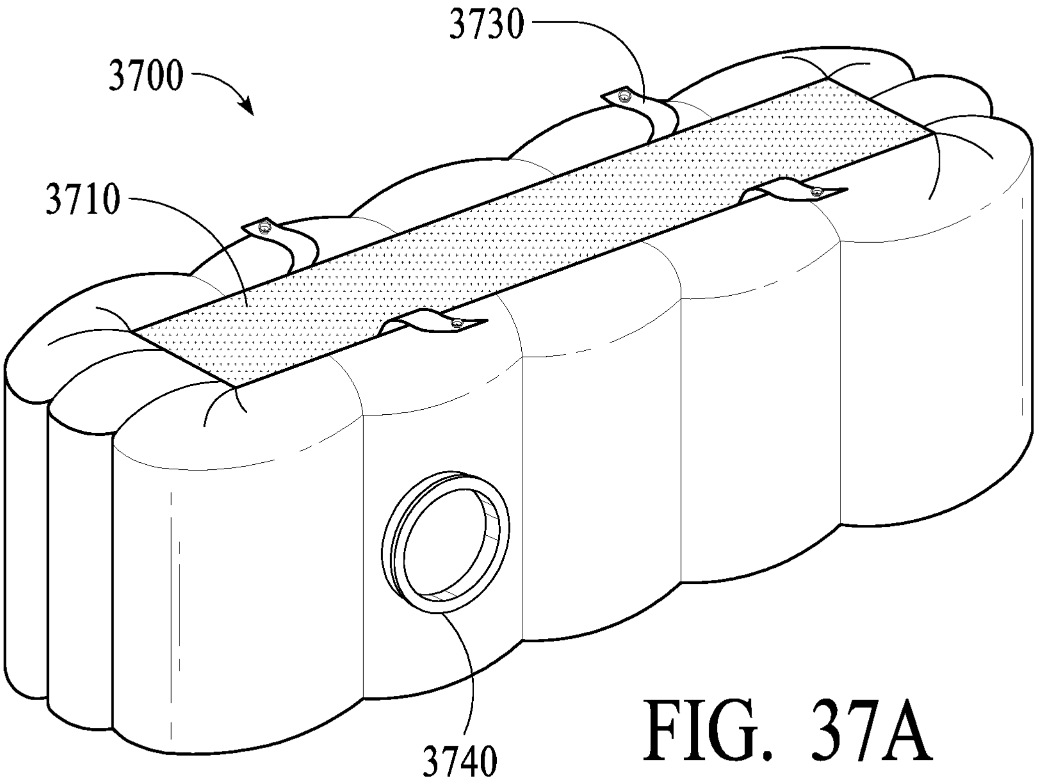
FIGS. 37A-B illustrate views of a stackable inflatable barrier according to an embodiment of the invention.
Figure 37B:
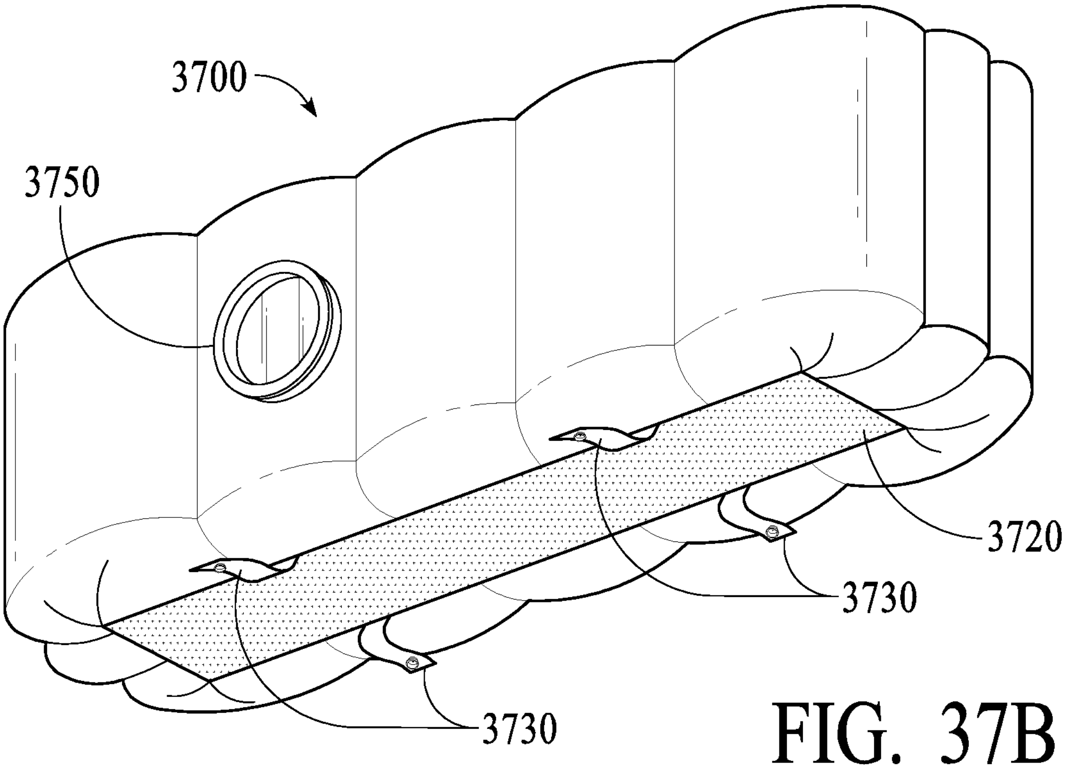

The embodiment may further have connectors 2720 at its bottom, allowing inflatable barrier 2700 to be stacked onto an extension block as further detailed with respect to FIGS. 37A-B. Connectors 2720 may include zippers, as drawn, snaps, or any other means of connecting known in the art. Snaps may be male, female, or bi-gender.

In case some malfunction or loss of power causes an embodiment to deflate, containment might be lost if not for edge hooks (such as edge hooks 2070 in FIG. 20) and one or more ballast containers 2730. Ballast containers 2730 may be attachable (here drawn as fabric cylinders that may be filled with ballast, such as metal balls, sand, etc., zipped to ground piece 2710) using connectors 2720, or may be permanently attached to the ground piece 2710. By weighing down inflatable barrier 2700, ballast containers 2730 minimize any air gaps below inflatable barrier 2700. They also provide tension between the top and the bottom of the inflatable bag, thus keeping the sides taut and preventing gaps along the edges too.

Figure 28A:
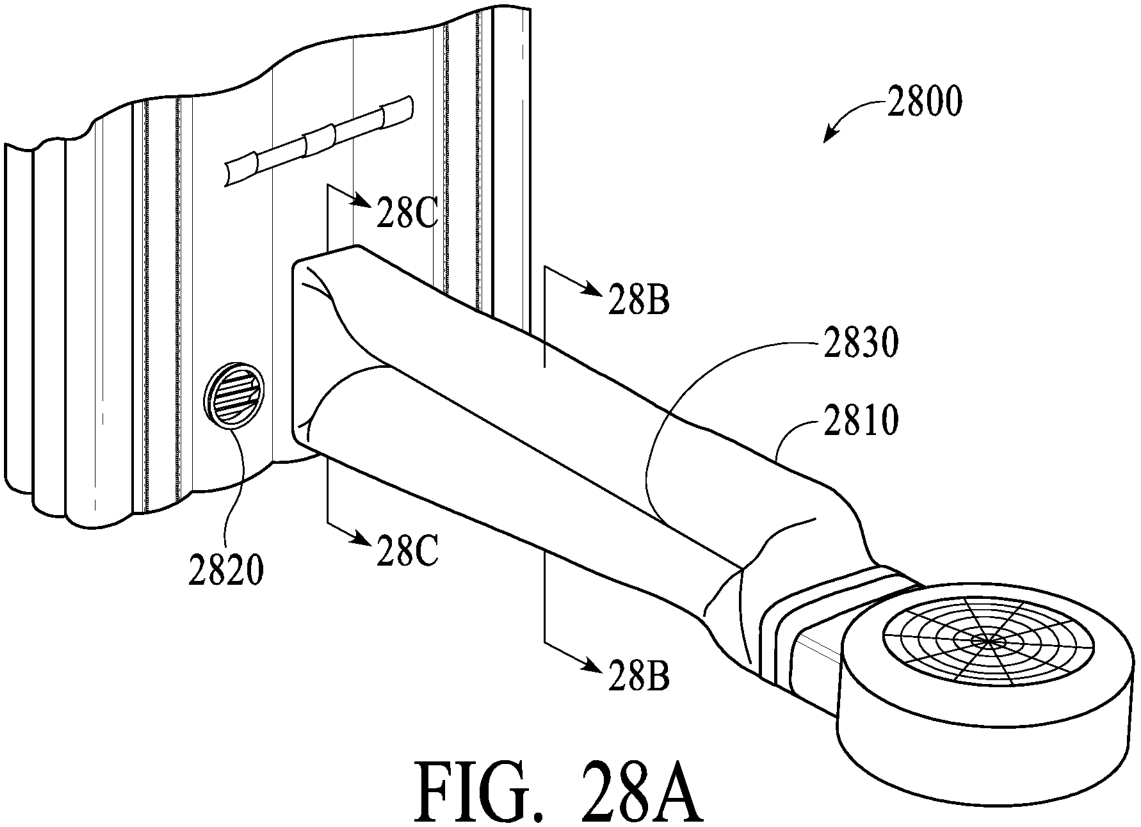
FIGS. 28A-C illustrate details of an inflatable barrier with a horizontally restricted air inflow tube according to an embodiment of the invention.
Figure 28B:
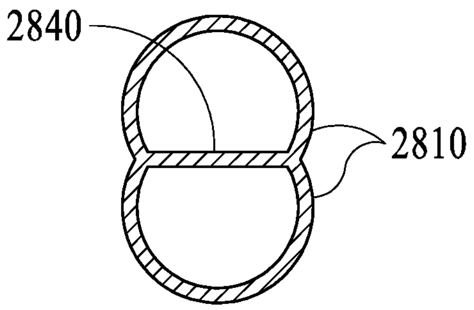
Figure 28C:
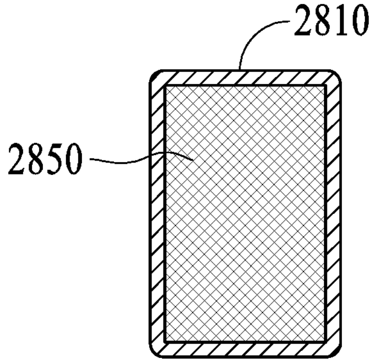

FIGS. 28A-B illustrate details of an inflatable barrier 2800 with a horizontally restricted air inflow tube 2810 according to an embodiment of the invention. The embodiment has air vents 2820 placed on both sides of air inflow tube 2810, which in this example are located near the ground. The arrangement allows for convenient placement of air inflow tube 2810 and an air mover, and for a low flow of air from air vents 2820 along a moist or contaminated floor. However, if air inflow tube 2810 is allowed to bulge wide, it may hinder the flow of air from air vents 2820. Therefore, in this embodiment, air inflow tube 2810 is horizontally restricted. For example, it may have a horizontal seam 2830 that effectively separates air inflow tube 2810 in two vertically stacked tubes (FIG. 28A). FIG. 28A also shows crosscuts 28B and 28C for features shown in FIGS. 28B and 28C. As an alternative for horizontal seam 2830, air inflow tube 2810 may include a horizontal septum 2840 that divides its internal channel into two separate cavities while restricting the overall width (FIG. 28B). Further embodiments may include a mesh fabric 2850 sewn or otherwise attached in the hole in the in the inflatable bag that lets in air flowing from air inflow tube 2810. Mesh fabric 2850 protects the shape of the hole, and therefore the general shapes of both the inflatable bag and air inflow tube 2810 at their point of connection.

Figure 29:
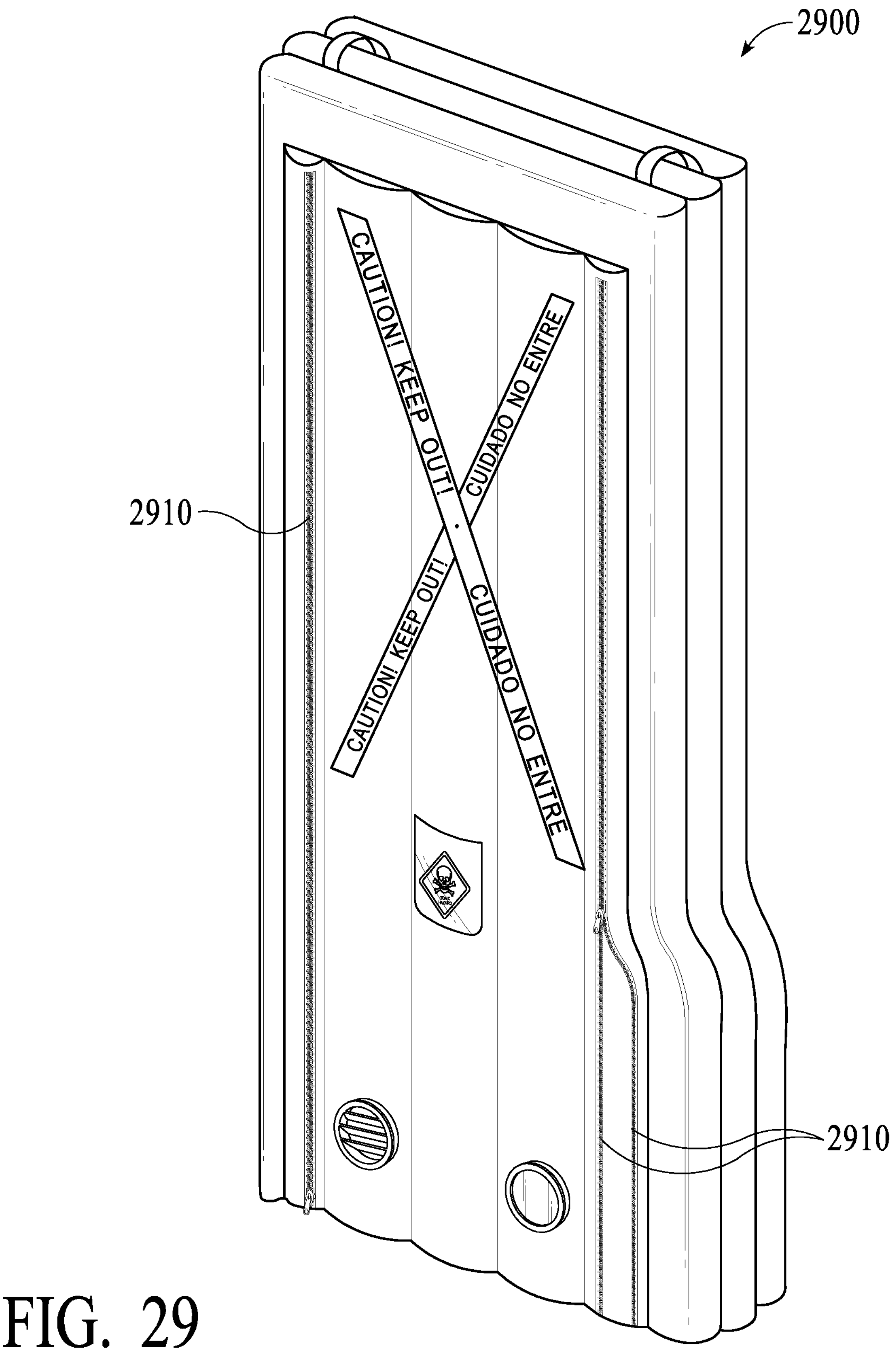
FIG. 29 illustrates an inflatable barrier with vertical zippers to restrict its width according to an embodiment of the invention.

FIG. 29 illustrates an inflatable barrier 2900 with vertical zippers 2910 to restrict its width according to an embodiment of the invention. Vertical zippers 2910 are placed in pairs along the front and back of inflatable barrier 2900, so that its width may be restricted by closing a pair of vertical zippers 2910 on each the front and back, or its width can be increased by opening a pair of vertical zippers 2910 on each the front and back. FIG. 29 shows only the pairs of vertical zippers 2910 on the front of inflatable barrier 2900. Their matching pairs of vertical zippers 2910 on the back are not shown. Inflatable barrier 2900 may include multiple pairs on each the front and the back to provide for multiple options to restrict its width.

An alternative embodiment may restrict its width in different ways than with zippers. For example, it could use horizontal straps, or flaps with hooks and/or grommets, or any other means known in the art.

Figure 32:
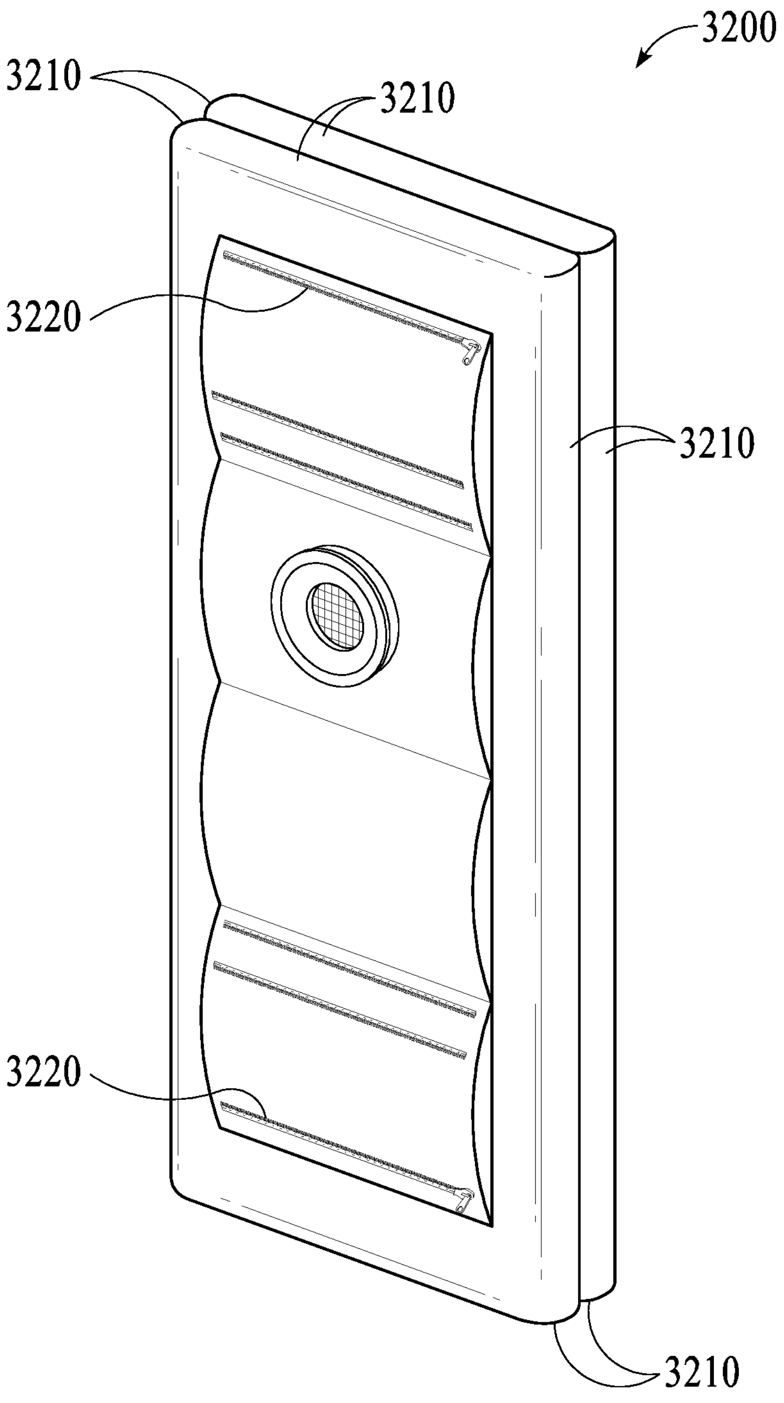
FIG. 32 illustrates a stackable inflatable barrier optimized for use in a window according to an embodiment of the invention.

Similarly, an embodiment may include means to restrict its height, wherein the means to restrict its height may comprise horizontal zippers, vertical straps, flaps with hooks and/or grommets, or any other means known in the art. Such an embodiment is shown in FIGS. 21A-B and FIG. 32, where an inflatable barrier includes horizontal zippers that can be closed to restrict its height. Although FIG. 29 shows inflatable barrier 2900 optimized for a doorway and FIGS. 21A-B show inflatable barriers 2100 optimized for a window, embodiments may be optimized for any application and may restrict height, width, or any other dimension, as useful in an application.

Figure 30:
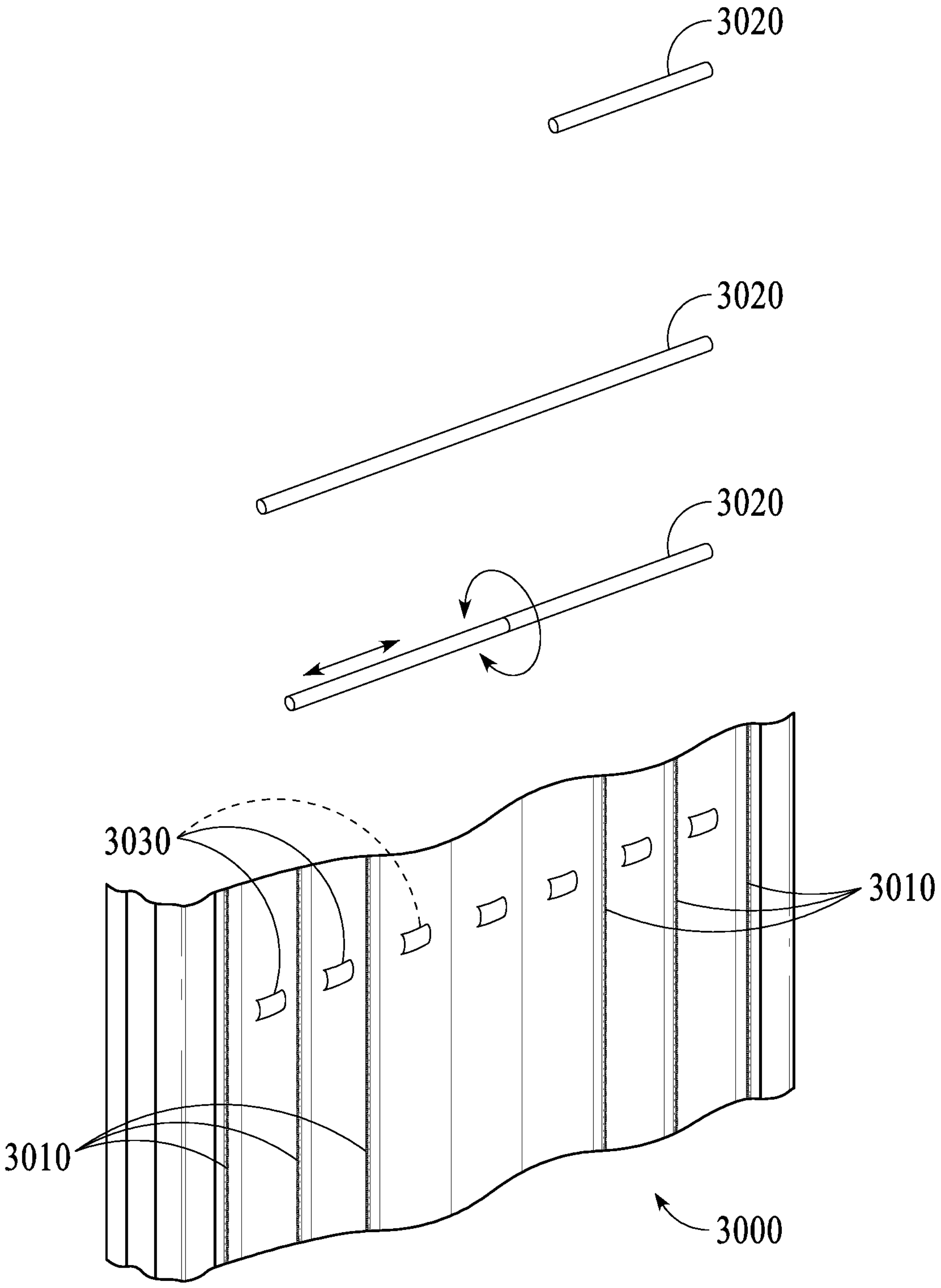
FIG. 30 illustrates an embodiment of the invention that includes both the set of tension rod sleeves of FIG. 24 and the vertical zippers of FIG. 29.

FIG. 30 illustrates an embodiment of the invention that includes both the set of tension rod sleeves of FIG. 24 and the vertical zippers of FIG. 29. The inflatable barrier 3000 includes three vertical zippers 3010 on each the right and the left. This embodiment allows for 6 different widths, as each side could be set to full width, shortened by one zipper distance, or shortened by two zipper distances. A tension rod 3020 may be inserted in those of the sleeves 3030 that are visible when a required number of zippers has been closed. Tension rod 3020 may have a fixed length, which could be shorter than the minimum width of inflatable barrier 3000, i.e. the width when on both sides it is shortened by (in this example embodiment) two zipper distances. Alternatively, an embodiment may come with a set of tension rods of different lengths (two fixed lengths are shown). Yet alternatively, tension rod 3020 could be extendable to allow for different widths.

Figure 31:
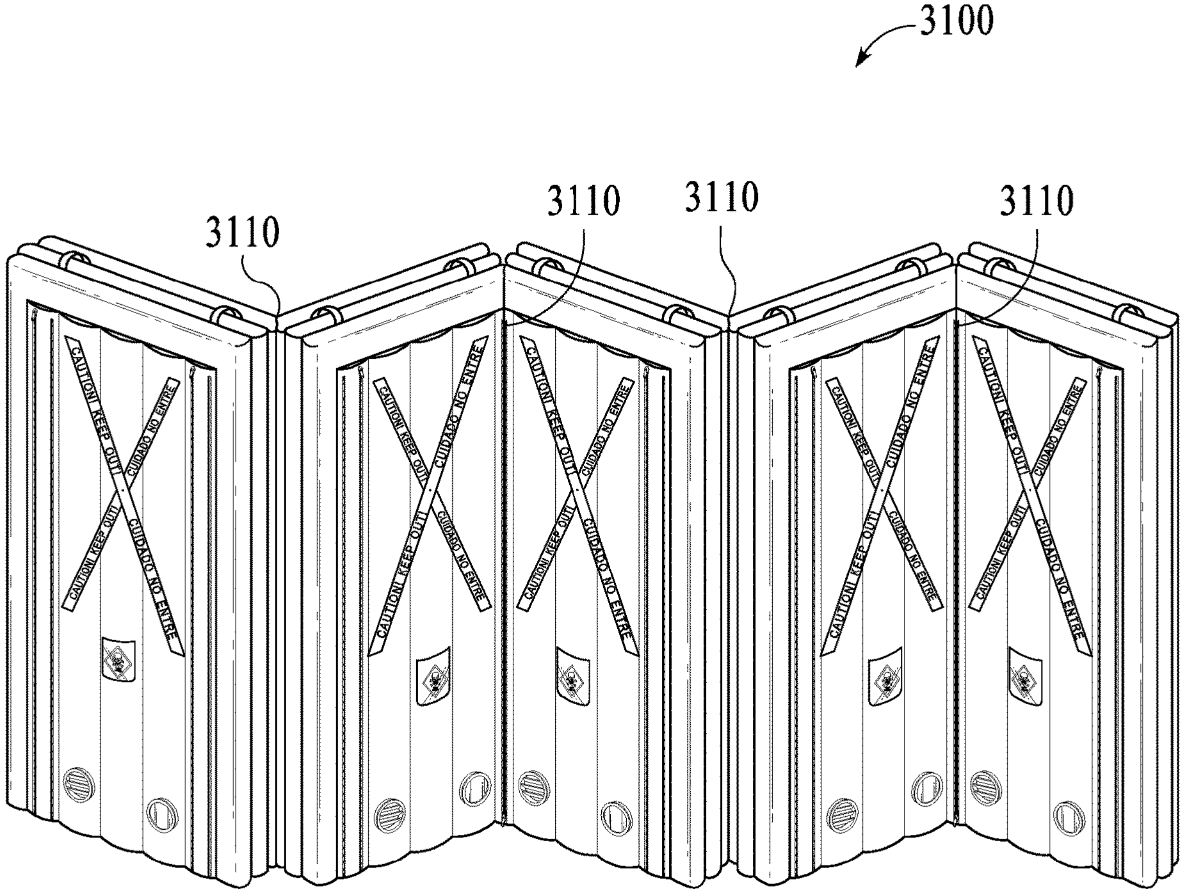
FIG. 31 illustrates an inflatable barrier with horizontal connectors according to an embodiment of the invention.

FIG. 31 illustrates an inflatable barrier 3100 with side-by-side connectors 3110 according to an embodiment of the invention. Side-by-side connectors 3110 are located on the sides of inflatable barrier 3100 and may be both on the front and the back. They may include vertical zippers, as drawn, or any other type of connectors known in the art, including but not limited to snaps, and hook and loop fasteners. Side-by-side connectors 3110 allow for horizontally chaining two or more units of inflatable barrier 3100 in accordion formation, such as shown here, or in straight formation, such as shown in FIG. 22. Some embodiments may use the outer zippers of vertical zippers 2910 in FIG. 29 as the side-by-side connectors 3110, whereas other embodiments may separate those.

FIG. 32 illustrates a stackable inflatable barrier 3200 optimized for use in a window according to an embodiment of the invention. Windows tend to come in multiple standard widths and heights. The use of embodiments that can easily be stacked reduces the number of different inflatable barriers that a services company needs to own, and therefore reduces the cost of its operation. Stackable embodiments may be produced in a few different sizes to facilitate stacking up to any potential height. Stackable inflatable barrier 3200 has edge seals 3210 along both sides. Some embodiments may further have edge seals 3210 on the top and/or bottom (as drawn). Along the top and bottom, stackable inflatable barrier 3200 includes stacking connectors 3220 that allow for chaining vertically. Stacking connectors 3220 may include zippers, as shown, or snaps, hook and loop fasteners, or any other fastener known in the industry. In case of zippers, these may double-function to reduce the height of stackable inflatable barrier 3200 when a window is less tall than stackable inflatable barrier 3200.

Figure 33:
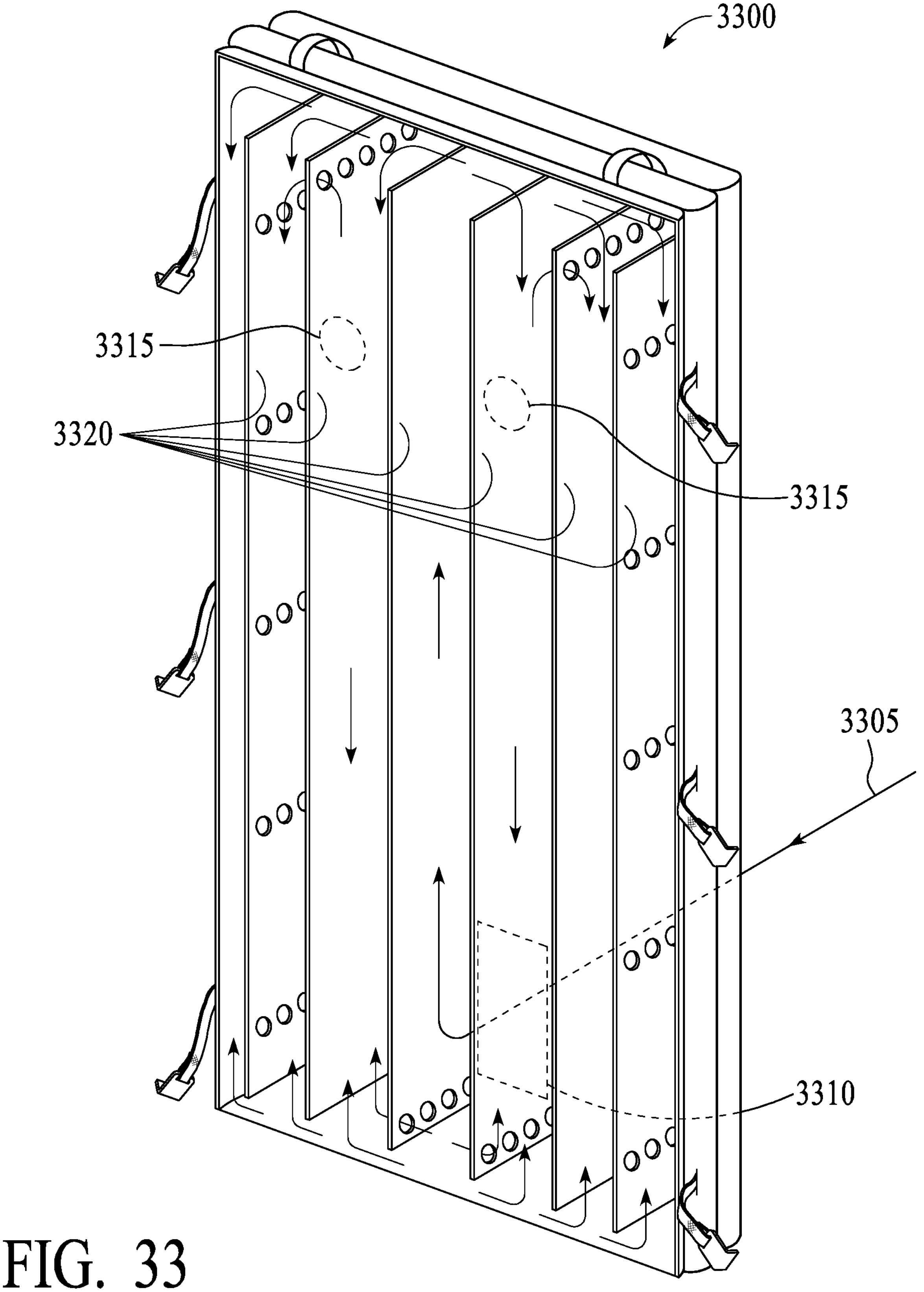
FIG. 33 illustrates air routing through an inflatable barrier according to an embodiment of the invention.

FIG. 33 illustrates air routing through an inflatable barrier 3300 according to an embodiment of the invention. When a vent is located close to an air inflow tube, such as shown in FIG. 28, air flow 3305 may flow directly from the air inflow tube to the vent, if unobstructed, and the inflatable bag will not inflate. Inflatable barrier 3300 shows an inflatable bag with the front removed for an inside view. Air flow 3305 is channeled from the first opening 3310 (drawn with a dashed line) into all parts of the inflatable bag, and cannot reach vent carriers or vents 3315 (also drawn with dashed lines) directly. The air travels through or into the whole inflatable bag. Air channels are created using septa 3320, that may be sewn, radio-frequency (RF) welded, glued, or attached in any other way known in the art, inside the inflatable bag. In some embodiments, air may flow over the tops or below the bottoms of septa 3320, whereas in other embodiments air may only flow through openings in septa 3320. Based on the positions of such openings, including any openings above or below the septa 3320, if any, an embodiment may have any airflow deemed suitable for a certain situation or for any situation. Although FIG. 33 shows vents 3315 at the front of the inflatable bag, an alternative embodiment may have vents 3315 both at the front and at the back of the inflatable bag, or only at the back of the inflatable bag. Embodiments may have the vents 3315 or vent carriers at the top, the bottom, or anywhere between the top and bottom. Flexibility in the positioning of septa 3320 and openings in septa 3320 allows an embodiment to be optimized for whatever location vents 3315 may have.

Figure 34:
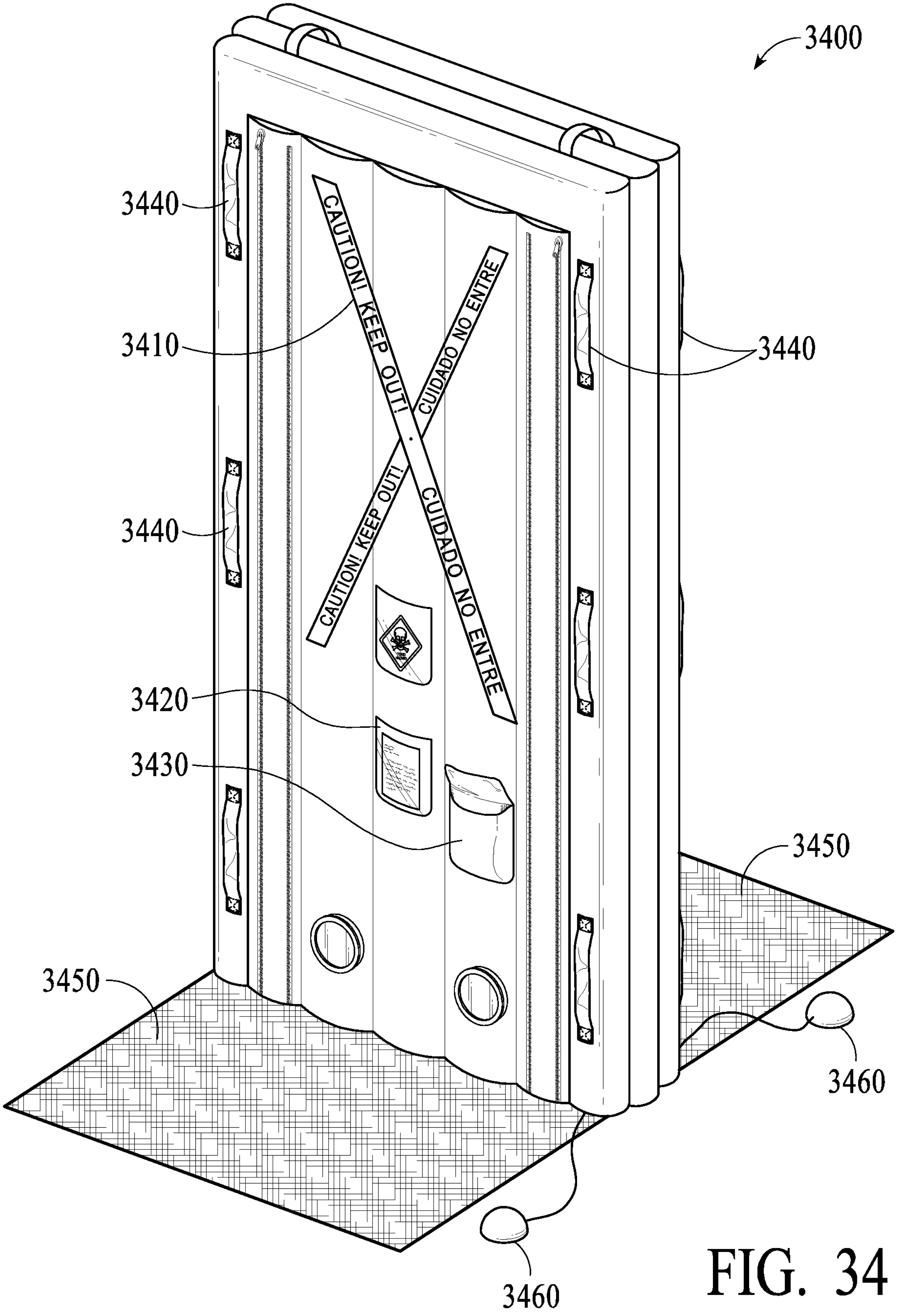
FIG. 34 illustrates an inflatable barrier with an X marking, an information pocket, and a pocket for implements according to an embodiment of the invention.

FIG. 34 illustrates an inflatable barrier 3400 with an X marking 3410, an information pocket 3420, and a pocket for implements 3430 according to an embodiment of the invention. Inflatable barrier 3400 is shown from the front, i.e. a side on which the air is assumed to be dry and uncontaminated, and where people can safely move around. The air at the backside is assumed to be moist and/or contaminated, and under treatment. It may be unsafe to move there, and people need to be warned to stay out. X marking 3410 may warn people in multiple languages, and because of its shape, generally conveys the message to stay out. Information pocket 3420 features a transparent window, which allows showing specific information about the work in progress, including the type of cleaning and or drying that is being performed, the schedule of the work, etc. The pocket for implements 3430 may be used for holding straps, a remote control for an air mover, and other materials.

FIG. 34 further illustrates carrier handles 3440 and pressure sensitive mats 3450 or foot switches 3460. Carrier handles 3440 allow for conveniently positioning inflatable barrier 3400, whether inflated or not. Pressure sensitive mats 3450, or, alternatively, foot switches 3460 or any other external switches known in the art, including but not limited to Bluetooth, apps on handheld devices, etc., allow for temporarily reducing inflation of inflatable barrier 3400, such that a person who needs to pass from one side to another can briefly create an opening between the edge seals and an abutting door frame. The person can then pass through the opening.

Figure 35:
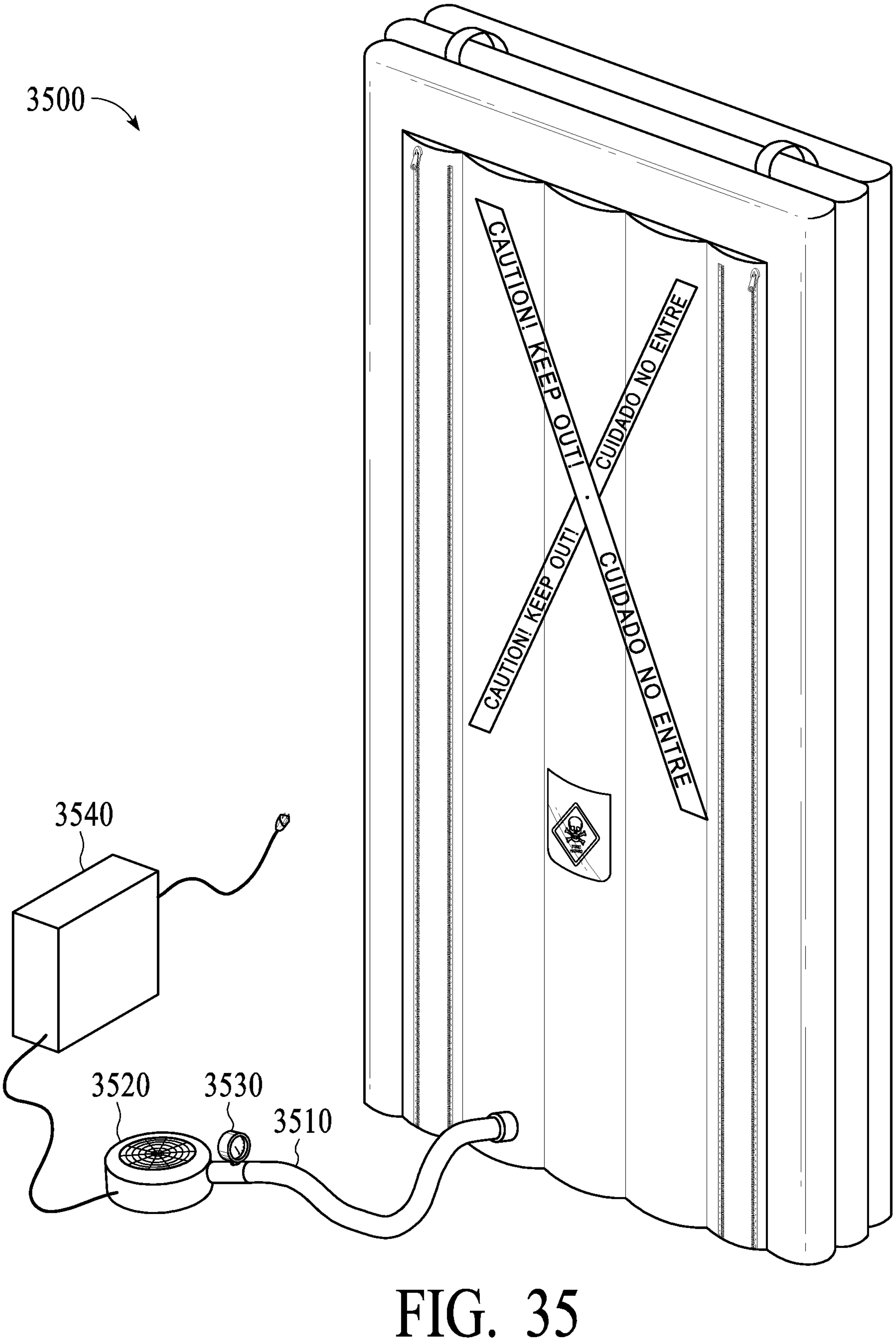
FIG. 35 illustrates a static inflatable barrier according to an embodiment of the invention.

FIG. 35 illustrates a static inflatable barrier 3500 according to an embodiment of the invention. Unlike a regular inflatable barrier, static inflatable barrier 3500 does not need an air inflow hole or tube at the back, and does not have vent carriers or vents. Its purpose is to provide containment, even when there is a power outage. Static inflatable barrier 3500 includes an air inflow tube 3510 at the front, connected to an external pump 3520 (air mover). Pump 3520 may include a pressure sensor 3530, or be coupled to a pressure sensor inside static inflatable barrier 3500, to prevent inflating static inflatable barrier 3500 below its minimum or above its maximum rated pressure. Both air inflow tube 3510 and pump 3520 may be small, as they are mainly used to maintain pressure, rather than to provide a constant air flow emanating from static inflatable barrier 3500. In normal usage, pump 3520 may include a backup battery or may be coupled with an external uninterruptable power supply (UPS 3540), to ensure continued operation during a power outage. Where no permanent electricity is available, a user may install a backup generator, or even use a manual pump. Embodiments in which pump 3520 has a small size may have the additional benefit of relatively low added noise. Embodiments of static inflatable barrier 3500 have edge seals on at least two sides (FIG. 35 shows edge seals on three sides to make it optimal for use in a doorway), loops at the top (or a channel through the inflatable bag) for an expandable tension rod, sleeves for one or more tension rods at the front and/or back to prevent bulging out of shape, X marking to warn people to stay out. They may include stronger bottom material, and other elements described in this patent document.

Figure 36A:
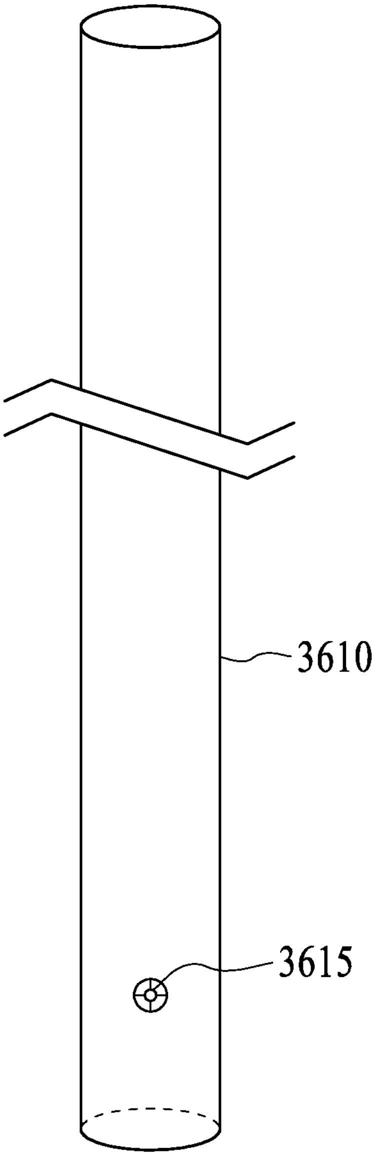
FIGS. 36A-F illustrate further embodiments of a static inflatable barrier.

FIGS. 36A-F illustrate further embodiments of a static inflatable barrier. FIG. 36A illustrates inner chamber 3610, at least two of which are inserted into the outer chambers 3632 inside outer sleeve 3620 depicted in FIG. 36B. Inner chamber 3610 comprises an inflatable vertical tube, bar, or other elongated shape. It features air inlet/outlet 3615. The static inflatable barrier may not have vent carriers or vents. It may be used in situations where an ongoing availability of power, such as electricity, is not guaranteed. Each inner chamber 3610, when inserted in outer sleeve 3620, is individually inflated or deflated via its air inlet/outlet 3615. Once inner chamber 3610 is inflated, it may be left inflated during the inflatable barrier's use, after which it may be deflated for the inflatable barrier's removal and transportation elsewhere. As described with reference to other embodiments, the bottom of inner chamber 3610 may include or be made of a heavy-duty material, stronger than its remainder. Air inlet/outlet 3615 may comprise a first part permanently connected to the inflatable tube, bar, or other elongated shape, and a second part removably inserted into the first part. The second part may hold an air valve for letting air flow into inner chamber 3610, but not out of it. Inner chamber 3610 may be deflated by removing the second part from the first part so that air inside inner chamber 3610 is no longer obstructed and can freely flow out.

Figure 36B:
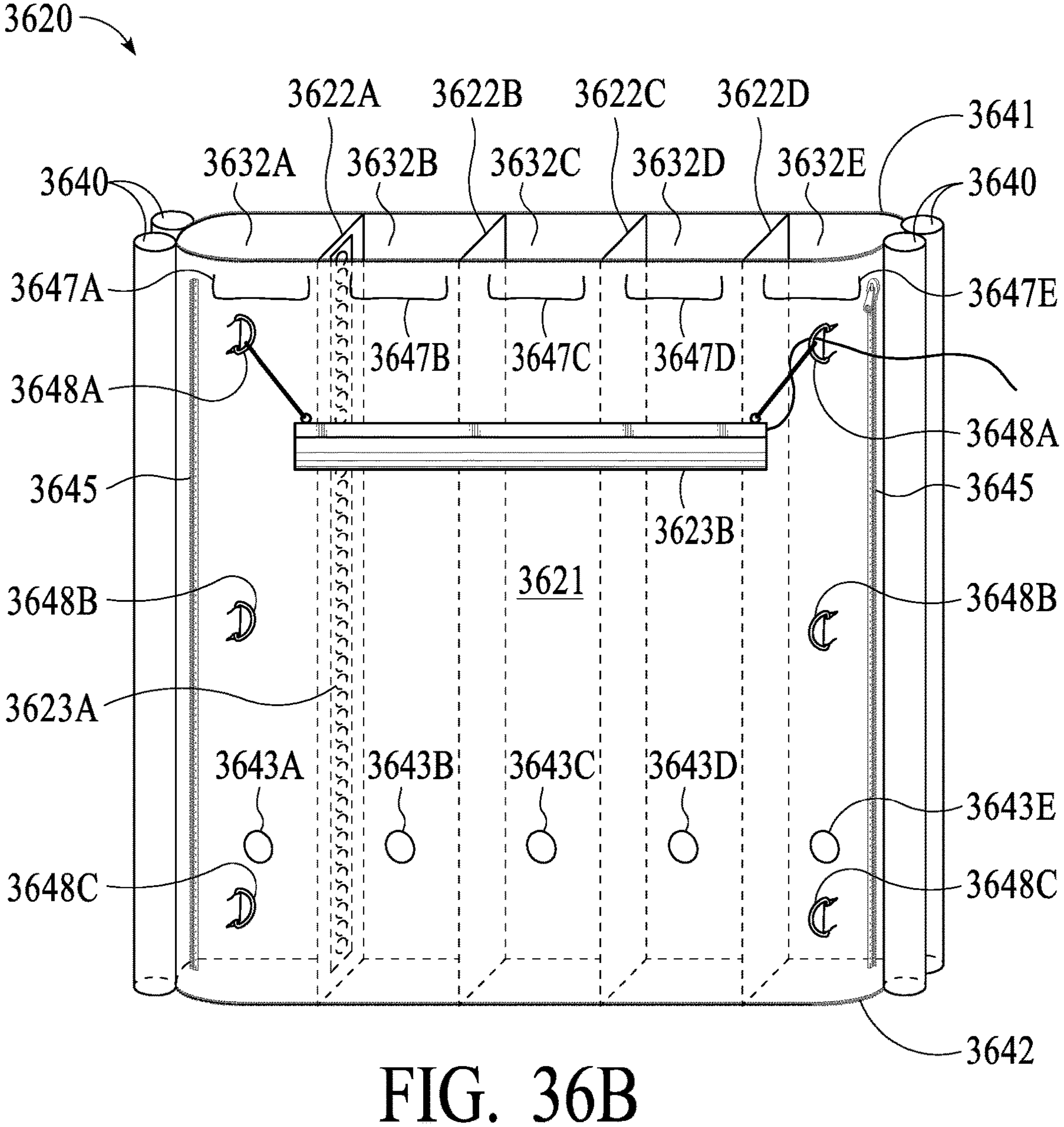

FIG. 36B illustrates the outer sleeve 3620, which comprises main sleeve 3621, dividers 3622 that separate the inside into outer chambers 3632 (four dividers 3622A-D are shown, separating the inside of main sleeve 3621 into five separate outer chambers 3632A-E). Main sleeve 3621 may be open at the top and the bottom, and allows attaching a separate top, bottom, top extension, or bottom extension. Attached to the side of main sleeve 3621 are edge seals 3640. Around the circumference of its top is top zipper half 3641 and around the circumference of its bottom is bottom zipper half 3642. Main sleeve 3621 has a hole 3643 for air inlet/outlet 3615 (FIG. 36A) at each of the outer chambers 3632. It also includes vertical zipper halves 3645 and D-rings 3648A-C.

In the embodiment shown, the static inflatable barrier comprises five outer chambers 3632 to insert five units of inner chamber 3610. However, other embodiments may comprise fewer or more chambers. In one example embodiment, an inner chamber 3610 may be 1 foot wide, 4 inches deep, and 8 feet tall. In another example embodiment, an inner chamber 3610 may be 1 foot wide, 4 inches deep, and 10 feet tall. Both embodiments may be used in an outer sleeve 3620 that is (again, for example) 8 feet tall, 4 inches deep, and 5 feet wide, as will be discussed below. In yet other embodiments, chambers may have any width, any depth and/or any length. In a further embodiment, inner chamber 3610 is made of a clear material, allowing light to pass through more easily.

Outer sleeve 3620 fits tightly around the units of inner chamber 3610 when these are inflated. The position of each hole 3643 on main sleeve 3621 matches the position of air inlet/outlet 3615 on an inner chamber 3610, so that inner chamber 3610 can be inflated or deflated while it is positioned inside outer sleeve 3620.

In some embodiments, outer sleeve 3620 is equally tall as inner chamber 3610. However, in other embodiments, inner chamber 3610 may be taller than outer sleeve 3620. In those other embodiments, inner chamber 3610 may only be fully inflated when no top is attached to main sleeve 3621, and/or when no bottom is attached to main sleeve 3621. When no top or bottom is present, inner chamber 3610 will stick out. However, main sleeve 3621 may be extended with one or two extensions, as will be described hereunder, allowing full coverage and protection of each installed inner chamber 3610.

A combination of two or more units of inner chamber 3610 and outer sleeve 3620 provides an inflatable barrier segment that may be tall and wide enough to cordon off a section of a room, hallway, or other space in a building, and provide containment irrespective of the continuous presence of electricity or other power. Edge seals 3640 provide this containment around the edges, for example in a doorway. Edge seals 3640 may or may not be inflatable. In an embodiment, edge seals 3640 each comprise two parallel tubes that may be filled with foam to provide elasticity. In another embodiment, edge seals 3640 comprises another number of parallel tubes, or the tubes are filled with another material than foam.

In many cases, a single segment of the inflatable barrier is insufficient to achieve containment of a section of a space, and multiple segments are needed. In this case, vertical zipper halves 3645 allow for the capability to concatenate such multiple segments until full containment is achieved. Although not shown in FIG. 36B, vertical zipper halves 3645 are located not only at the front, but also at the back of outer sleeve 3620. Vertical zipper halves 3645 may be situated on main sleeve 3621 directly next to edge seals 3640. Or, in some embodiments, vertical zipper halves 3645 may be on flaps that are connected to the main body. Yet other embodiments do not comprise vertical zipper halves 3645 but other means of connecting sections, including but not limited to snaps, straps, hooks and rings, such as previously shown in FIGS. 6-9.

Also in many use situations, a whole number of segments may be too wide. For example, if one segment is five feet wide, and a part of a room that is 13 feet wide must be contained, then two segments are insufficient for containment, but three segments together are too wide for the room. Three segments minus two inner chambers would be just right, though. Three segments might have a total of fifteen inner chambers, and if two of the fifteen chambers are not inflated then the total width can be made to fit. Outer sleeve 3620 comprises sets of D-rings 3648. Three sets are shown: set D-rings 3648A is horizontally paired at the top of outer sleeve 3620. Set D-rings 3648B is horizontally paired halfway between the top and the bottom, and set D-rings 3648C is horizontally paired at the bottom. While only the front of outer sleeve 3620 is shown, further sets of D-rings 3648 are located at the back. D-rings 3648 allow straps, bungees, ropes, strings, or twines to be tied to outer sleeve 3620, which makes it possible to shorten its width, and match its width to the number of inner chambers that is actually inflated and needed. Straps (etc.) may alternatively be used to curve a segment by tying straps at the front differently than straps at the back of outer sleeve 3620.

While FIG. 36B depicts 3 sets of D-rings 3648, with matching sets at the back that are not shown, other embodiments may have fewer or more than six sets. Yet other embodiments may have no D-rings, but straps directly sewn onto or connected to outer sleeve 3620. And further embodiments may use vertical zippers, such as vertical zippers 2910 illustrated in FIG. 29.

FIG. 36B further shows openings 3647A-E, which as drawn may each be covered by a flap. Should any of the inner chamber 3610 units become deflated, then such a malfunctioning unit may be replaced through its opening, without the need to deinstall the whole combination of outer sleeve 3620 and its inner chamber 3610 units. Thus, an inner chamber 3610 can be replaced with minimum impact on the containment provided by the whole unit. FIG. 36B yet further shows that the dividers 3622 may carry a LED strip 3623A (that is, using light-emitting diodes (LEDs) or any other form of lighting known in the art). When placement of a containment unit impacts the amount of light that may reach a contained space, then a LED strip 3623 may mitigate this. Further, a user may suspend a lighting armature 3623B from D-rings 3648 to help keep the contained space sufficiently illuminated.

In an embodiment slightly different than shown in FIG. 36B, edge seals 3640 are not permanently attached to main sleeve 3621, but they include vertical zipper halves, allowing them to be attached to and detached from vertical zipper halves 3645.

Figure 36C:
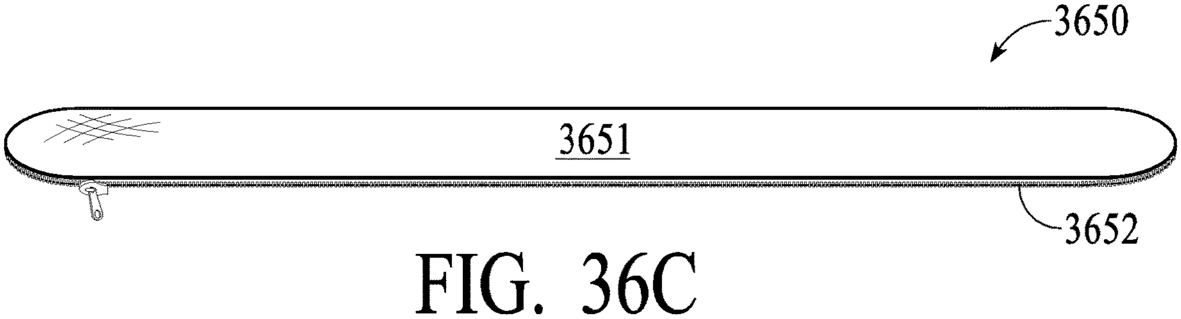

FIG. 36C depicts top 3650, which may comprise simply a sheet 3651 of fabric or canvas whose shape matches the open top of main sleeve 3621, and whose circumference matches the circumference of main sleeve 3621. Top 3650 has a zipper around sheet 3651 to match top zipper half 3641 and/or bottom zipper half 3642. Embodiments may use top 3650 also as a bottom element (not separately drawn). In some embodiments, a bottom element is made of heavy-duty fabric or canvas to provide extra ruggedness.

Figure 36D:

FIG. 36D illustrates an alternative top 3660, with edge seals 3661. This embodiment makes the static inflatable barrier especially suitable for doorways. It also allows it to match to similar irregular/changeable surfaces.

Figure 36E:
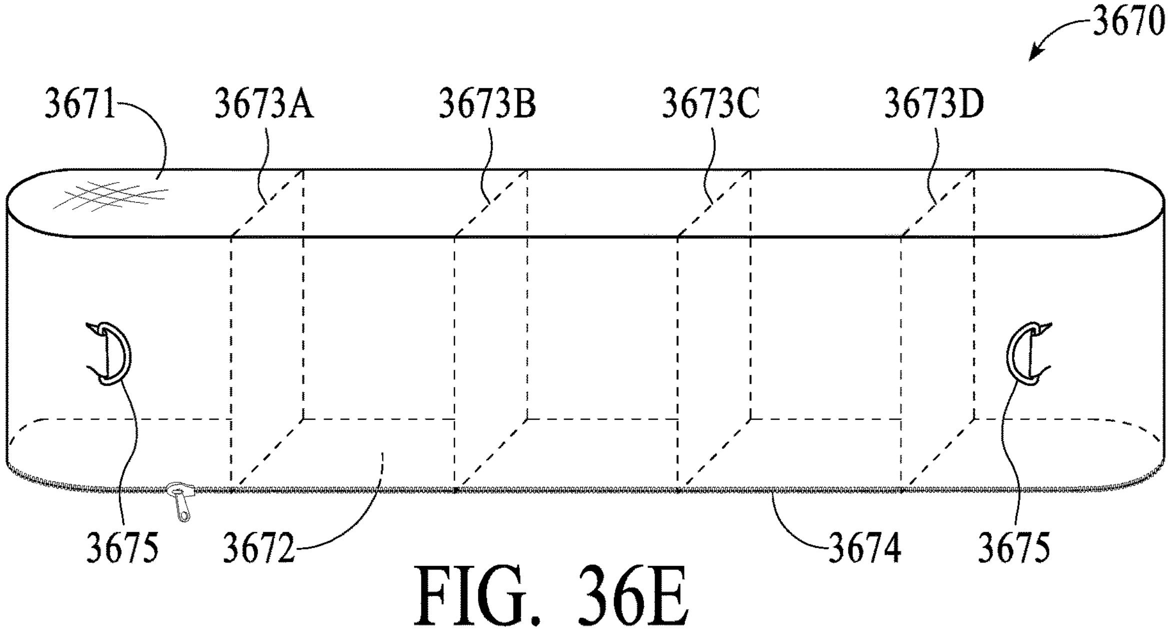

FIG. 36E illustrates extension outer sleeve 3670. Its zipper 3674 matches top zipper half 3641, and/or bottom zipper half 3642, such that extension outer sleeve 3670 can be connected to outer sleeve main sleeve 3621 at its top or bottom when outer sleeve 3620 is not tall enough. In some embodiments, inner chamber 3610 is tall enough to fill both outer sleeve 3620 and one or more units of extension outer sleeve 3670. In other embodiments, a separate short version of inner chamber 3610 is added to fill the space inside extension outer sleeve 3670. Extension outer sleeve 3670 is divided into separate outer chambers 3671 by dividers 3673. Extension outer sleeve 3670 may further include D-rings 3675, which serve the same function as D-rings 3648 on outer sleeve 3620.

Figure 36F:
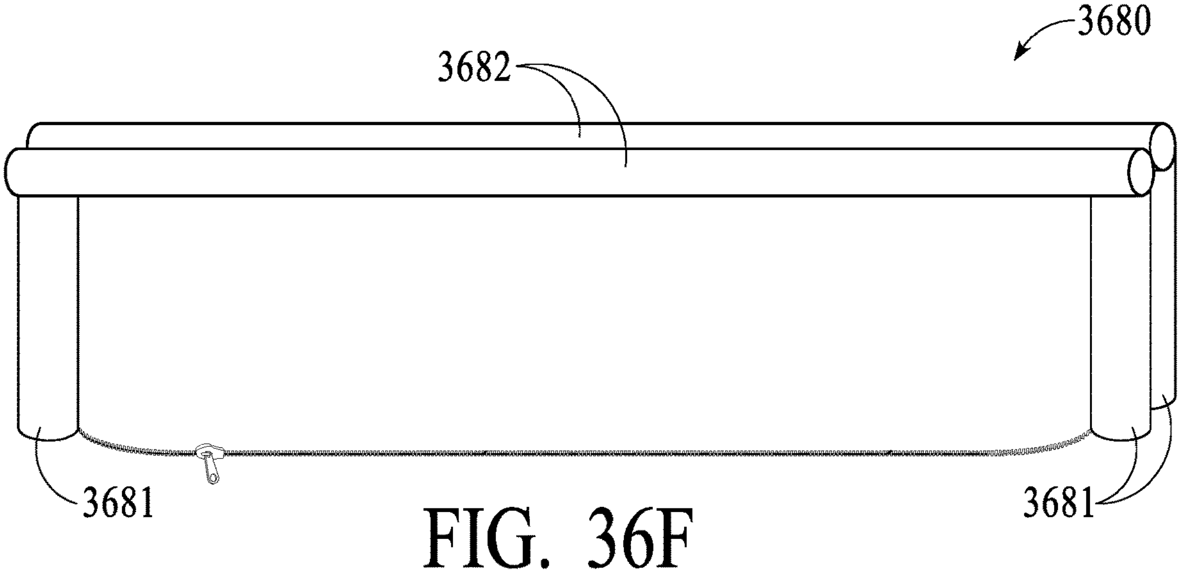

FIG. 36F illustrates extension outer sleeve 3680, which is similar as extension outer sleeve 3670, but with the addition of edge seals 3681 at its sides, and/or edge seal 3682 at its top. In some embodiments, a continuous edge seal may run from one side over the top to the other side.

Embodiments of the inflatable barrier are made of fabric or canvas that is airtight, especially inner chamber 3610, and that provides protection against puncturing and excessive wear, which might jeopardize a product's durability. Ruggedness is important for all parts of the invention depicted in FIGS. 36B-F. Therefore, these parts are made of fabrics or canvas that is durable, and that withstands puncturing and wear. In some embodiments, a fabric or canvas is also machine washable.

FIGS. 37A-B illustrate views of a stackable inflatable barrier 3700 according to an embodiment of the invention.

FIG. 37A provides a view from the top outside, and FIG. 37B provides a view from the bottom inside. However, the embodiment may be symmetrical, and its positioning may be reversible. Stackable inflatable barrier 3700 may be used, for example, in a tall doorway, below inflatable barrier 2300. Both its top 3710 and its bottom 3720 may be made with a stronger material than the remainder of the inflatable bag, for example they may be made of vinyl, coated vinyl, synthetic fiber, or any other material that is resistant to abrasion and puncture. The embodiment may have connector straps 3730 which may feature snaps, as drawn, or any other means of connecting known in the art. Snaps may be male, female, or bi-gender. Connector straps 3730 allow stacking regular inflatable barriers such as shown in FIG. 27 to stackable inflatable barrier 3700. Stackable inflatable barrier 3700 may further have vent carrier 3740 and vent carrier 3750, to one of which a user may attach an external air inflow tube, and into the other a user might insert a closed lid or a vent. It may also have a permanent air inflow tube that attaches to a vent carrier of, for example, the inflatable barrier 2000 (FIG. 20). Stackable inflatable barrier 3700 may further have means to restrict its height or width as discussed with reference to FIGS. 21A-B and 29.

Figure 38:
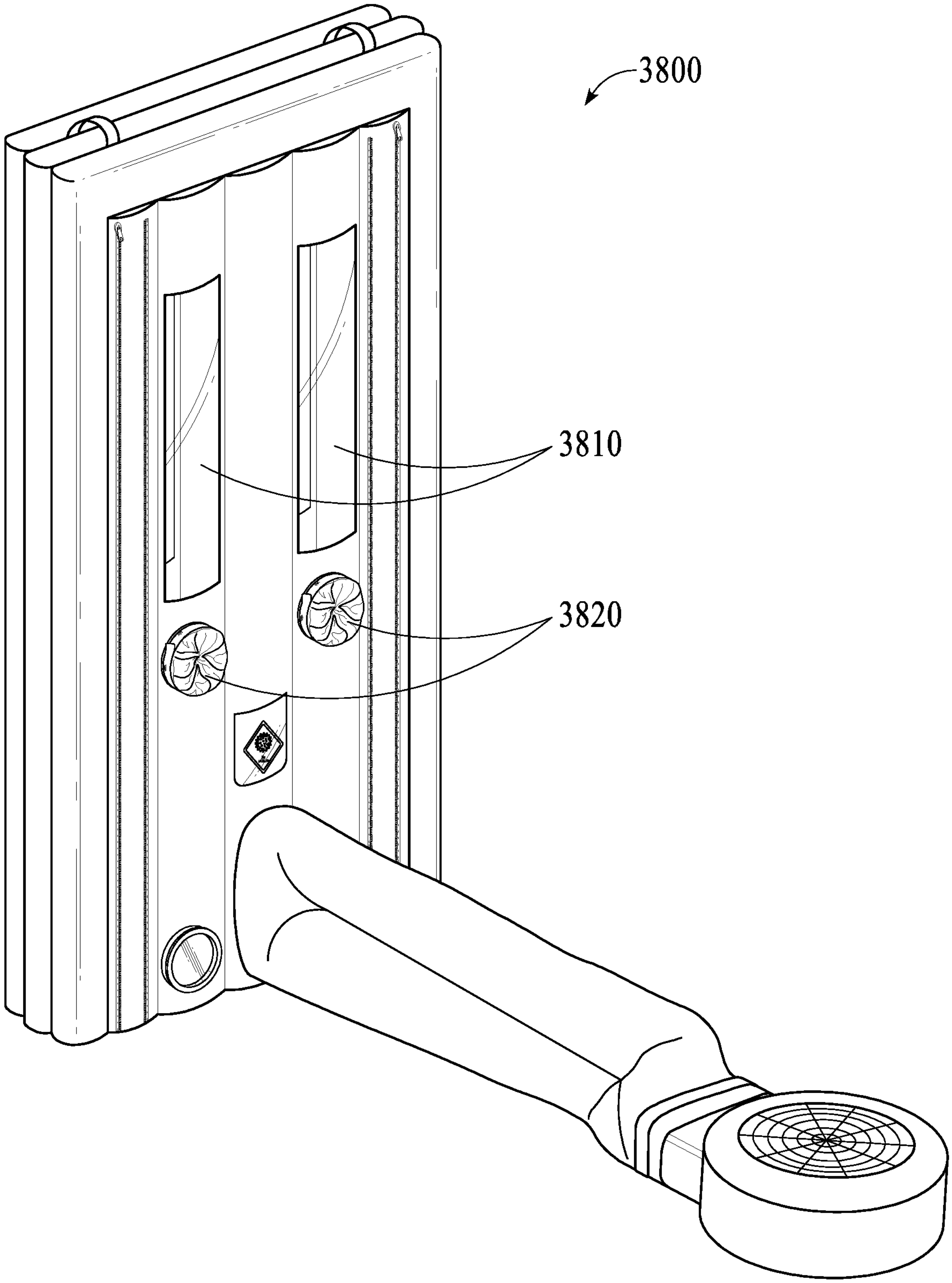
FIG. 38 illustrates an inflatable barrier for temporary medical isolation according to an embodiment of the invention.

FIG. 38 illustrates an inflatable barrier 3800 for temporary medical isolation according to an embodiment of the invention. Inflatable barrier 3800 includes one or more transparent windows 3810 and one or more air gates 3820. Inflatable barrier 3800 may be used in, for example, a doorway of a room where temporarily a sick person is isolated from other inhabitants of a house. The room may be kept at negative pressure to prevent bacteria and viruses entering the remainder of the house via air flow. Visual communication between the sick person and other people in the house can take place through the transparent windows 3810. Caretakers may pass food, medicine, and other items to the sick person via the one or more air gates 3820. In some embodiments, the air gates 3820 may be constructed as tunnels with a flexible circumference, and the tunnels may collapse from air pressure on the inside of inflatable barrier 3800, which is kept inflated. When nothing is passed through the air gates 3820, the tunnels are collapsed and no air flows through them from the house into the room (or vice versa in case the negative pressure is not maintained). When a caretaker passes something to the sick person via one of the air gates 3820, the flexible circumference gives way, but leaves minimal room around the object or objects. In other embodiments, the air gates 3820 may be constructed as tunnels with a rigid circumference, and the tunnels may be closed at one or both sides with a small door or a cap. [0163] If the room is maintained at negative pressure, it is important that clean air can flow into it. Users of inflatable barrier 3800 may insert a filtering object into one or more of the air gates 3820 to enable the inflow of clean air. If the air gates 3820 have a rigid circumference, then their doors or caps may include such filters. In embodiments, the filters are replaceable. In further embodiments, the filters may be located in dedicated air gates.

Figure 39:
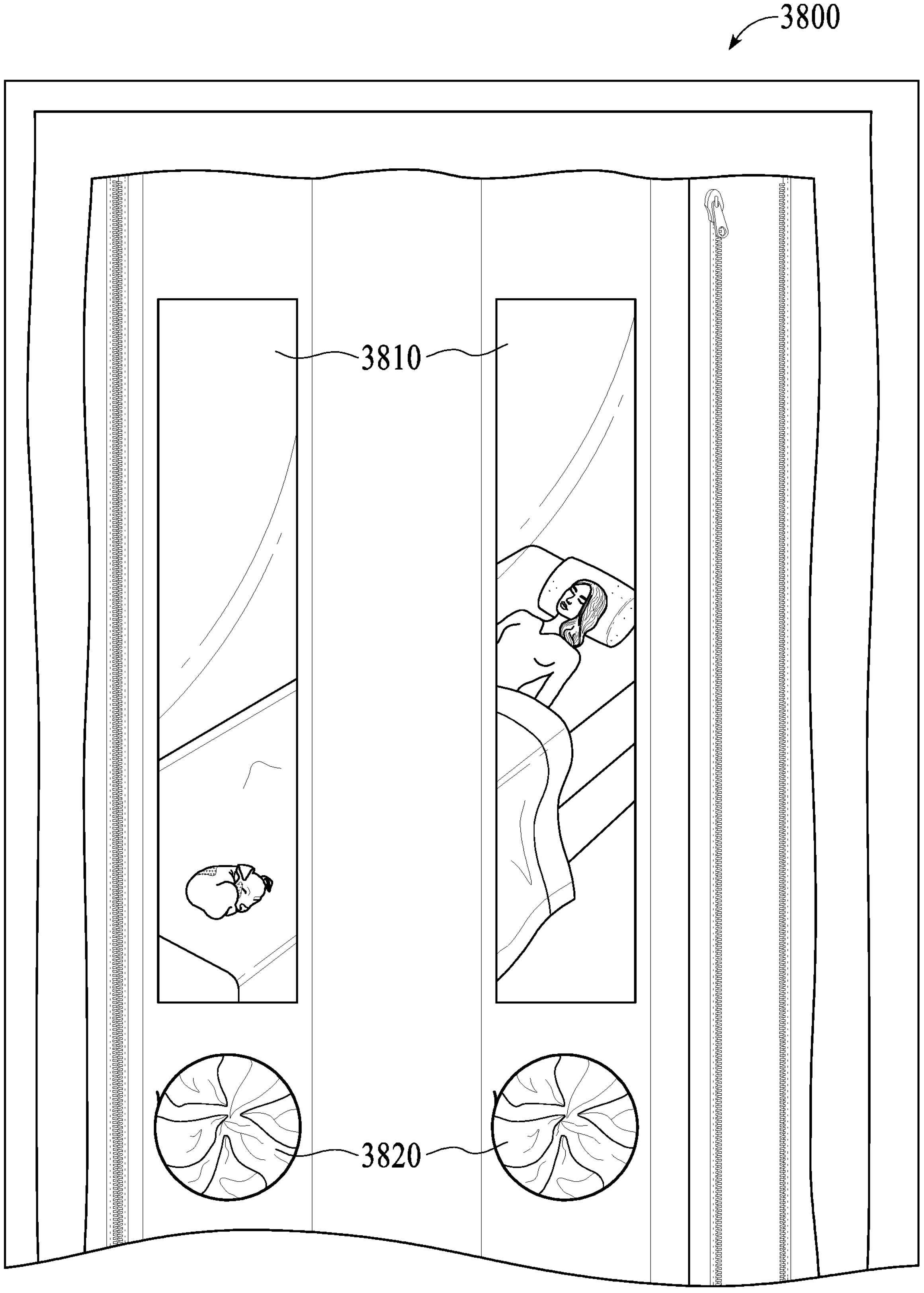
FIG. 39 shows details of the inflatable barrier of FIG. 38.

FIG. 39 shows details of the inflatable barrier 3800 of FIG. 38. The transparent windows 3810 allow visual contact with the sick person in the isolation room. Some embodiments may provide for privacy curtains on either side of inflatable barrier 3800, to allow the sick person or a caregiver to block visual contact when unwanted. FIG. 39 also shows a front view of air gates 3820, whose flexible walls are collapsed.

Figure 40:
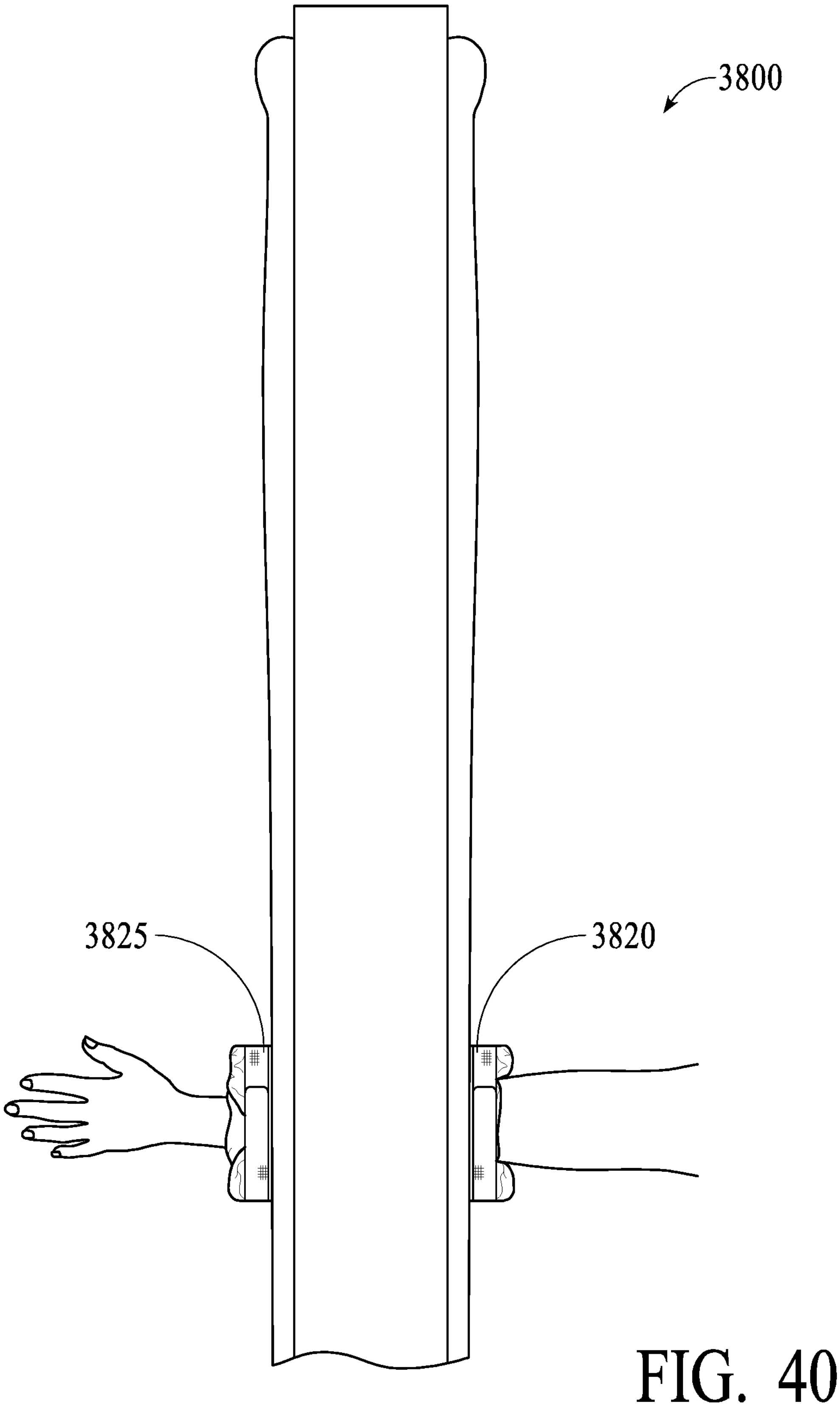
FIG. 40 shows a side view of the inflatable barrier of FIG. 38.

FIG. 40 shows a side view of the inflatable barrier 3800 of FIG. 38. In this view, a person who may not be knowledgeable of medical isolation procedures demonstrates that the air gates 3820 may be passed through from the front to the backside 3825. In the case of flexible walls, the flexible walls would retract sufficiently to let the person's arm pass through, but would still collapse enough around the arm to not let air flow from one side to the other.

Figure 41A:
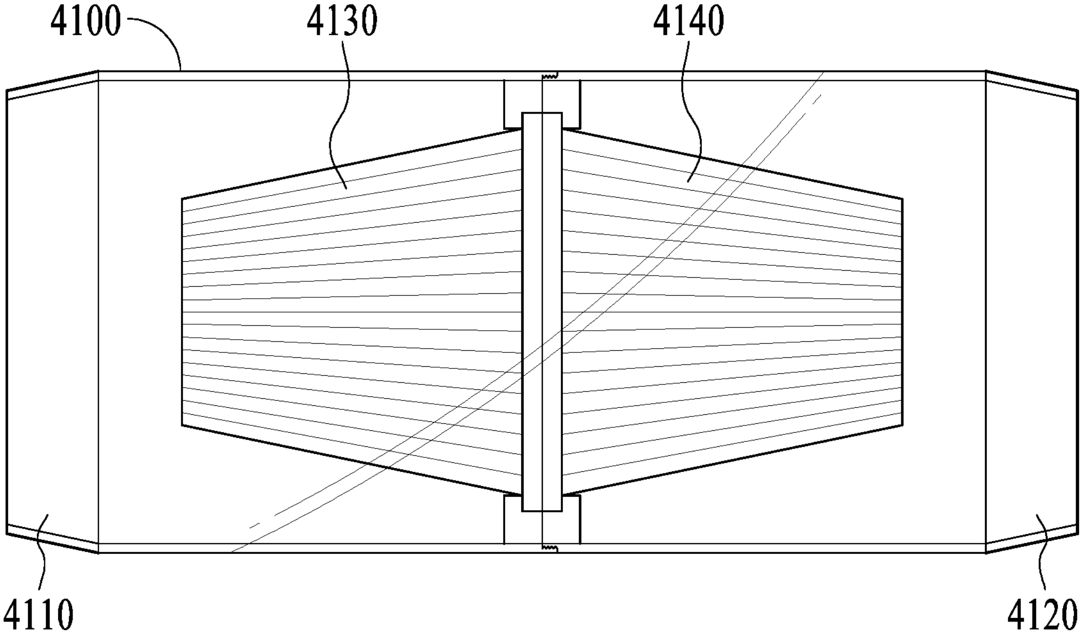
FIGS. 41A-B show examples of filtering objects for air gates according to embodiments of the invention.
Figure 41B:
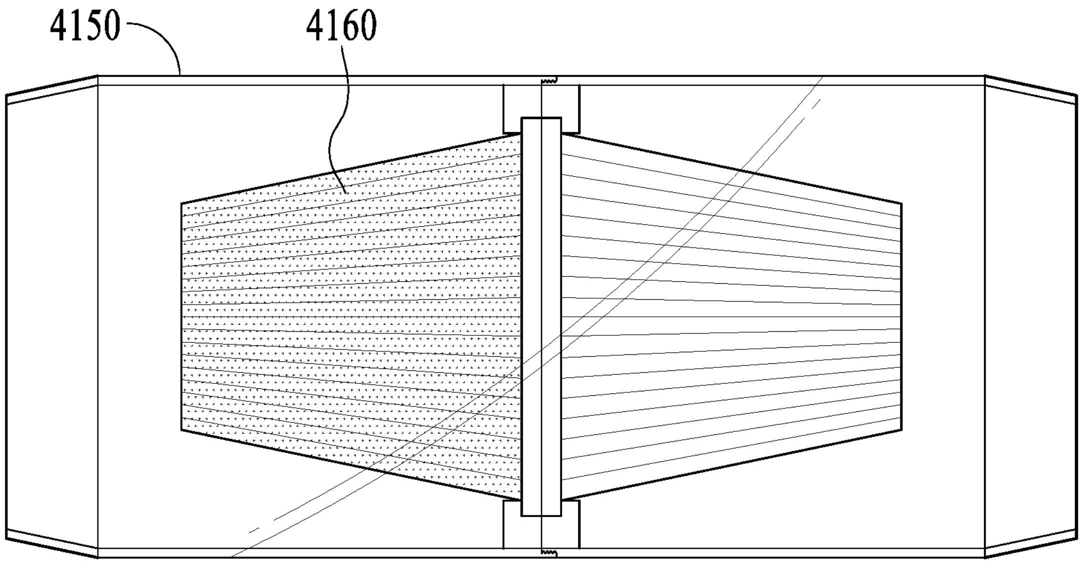

FIGS. 41A-B show examples of filtering objects for the air gates 3820 according to embodiments of the invention. FIG. 41A shows filtering object 4100 in a side view. For clarity, filtering object 4100 is drawn as having a transparent outer vessel with a first opening 4110 on one side and a second opening 4120 on the other side. Inside are mounted a first filter 4130 and a second filter 4140. In this embodiment, first filter 4130 and second filter 4140 have conical shapes, and are mounted in opposite directions. They are mounted in the outer vessel in such a way that no airflow is possible around the filters. Some embodiments may have only one filter, or more than two filters. In other embodiments, the filter or filters may be in another shape than conical. The filters include a material that allows air to flow through, but not contaminants such as viruses, bacteria, mold, and other unhealthy vectors. The filter may be or include a high-efficiency particulate air (HEPA) filter. Although the outer vessel is shown as transparent, in embodiments the outer vessel may be non-transparent, or partially transparent. In further embodiments, the outer vessel may comprise multiple sections that can be temporarily connected to each other, for example with screw connections, allowing removal and replacement of filters.

FIG. 41B shows filtering object 4150, which includes microbiological filter 4160. In general, filtering object 4150 may include any combination of filters, for example with at least one HEPA filter and at least one microbiological filter.

Although the description has been described with respect to particular embodiments thereof, these particular embodiments are merely illustrative, and not restrictive. For example, figures show application of the respective inflatable barriers in various crawlspaces. However, inflatable barriers can also be effectively used to dry out spaces that are not limited in height. Part of a kitchen or bathroom might have water damage in the lowest couple of feet, whereas a ceiling might be many feet away. One or more inflatable barriers can cordon off the circumference of the section to be dried, and a tarp could close the top of the cordoned off section. With similar variations, inflatable barriers can effectively be used to dry out many types of space that needs to be dried out.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An inflatable barrier comprising an inflatable bag, wherein:

the inflatable bag is generally in a shape that allows separating air in a first section of space in a building from air in a second section of space and that provides containment of the air in the first section, protecting the air in the second section;

the first section and the second section are outside the inflatable barrier;

the inflatable bag is configured to keep the air in the first section at a different pressure than the air in the second section;

the shape has a front, a back, two sides, a top, and a bottom;

the inflatable bag comprises at least one edge seal that includes two or more parallel inflatable tubes along at least one of a length of a side or a length of the top or a length of the bottom;

on the back, the inflatable bag has a first opening;

the first opening is configured to receive air inflow from an air mover in the first section; and a first vent carrier is located on the front, wherein the first vent carrier is configured to hold and connect to a removable and replaceable vent, and wherein the vent is configured to release air from inside the inflatable bag to the second section of space, while the inflatable bag stays inflated.

2. The inflatable barrier of claim 1, further comprising a second vent carrier located on the back.

3. The inflatable barrier of claim 1, wherein the inflatable bag includes at least one sleeve on the front and/or the back, wherein the sleeve is configured for holding a tension rod that prevents the inflatable barrier from bulging out of shape.

4. The inflatable barrier of claim 1, wherein the inflatable bag has means for suspending the inflatable bag from an expandable rod.

5. The inflatable barrier of claim 1, wherein the inflatable bag includes an air inflow tube at the back, wherein one end of the air inflow tube is coupled with the first opening and another end of the air inflow tube is configured to receive the air inflow from the air mover.

6. The inflatable barrier of claim 1, wherein the inflatable bag includes means for restricting its width, and the means for restricting its width comprises one or more of vertical zippers, horizontal straps, and flaps with hooks and/or grommets.

7. The inflatable barrier of claim 1, wherein the inflatable bag includes means for restricting its height, and the means for restricting its height comprises one or more of horizontal zippers, vertical straps, and flaps with hooks and/or grommets.

8. The inflatable barrier of claim 1, wherein the inflatable bag includes:

a side-by-side connector on a side, wherein the side-by-side connector is configured for horizontally chaining the inflatable barrier with another inflatable barrier; and/or a stacking connector along the bottom, configured for vertically chaining the inflatable barrier with another barrier; and/or a stacking connector along the top, configured for vertically chaining the inflatable barrier with another barrier.

9. The inflatable barrier of claim 1, wherein the inflatable bag includes a channel for routing air through the inflatable bag from the first opening to the first vent carrier, and wherein the air travels through the whole inflatable bag.

10. The inflatable barrier of claim 1, wherein the inflatable bag includes a permanent tunnel between the front and the back, wherein the tunnel is configured to hold one or more air filters.

11. The inflatable barrier of claim 1, further comprising:

a foot switch external to the inflatable bag configured to at least temporarily reduce air pressure inside the inflatable bag; and an air gate that comprises a tunnel between the front and the back;

and wherein:

the tunnel has a flexible circumference that allows the tunnel to fully collapse when no object is passed through and to partially collapse when an object is passed through or inserted, while hugging the object to stop airflow around the object;

the inflatable bag includes an air inflow tube at the back, wherein one end of the air inflow tube is coupled with the first opening and another end of the air inflow tube is configured to receive the air inflow from the air mover;

the first opening is reinforced with a mesh fabric and wherein the air inflow tube is restricted from bulging in one or more directions;

the inflatable bag includes a clear window on the front to hold and display information;

the inflatable bag includes a transparent window that allows visual contact from one side of the inflatable bag to the other side;

the inflatable bag includes a ballast container configured to minimize air gaps at the bottom; and the inflatable bag includes edge hooks configured to minimize air gaps in case the inflatable bag deflates.

12. An inflatable barrier comprising:

an outer sleeve comprising a main sleeve; and two or more inflatable inner chambers, not permanently attached to the main sleeve;

wherein:

at least two of the two or more inflatable inner chambers include an air inlet/outlet;

the outer sleeve further comprises holes in the main sleeve for at least two air inlet/outlets, wherein locations of the holes in the main sleeve correspond to locations of the at least two air inlet/outlets;

the inflatable barrier is generally in a shape that allows separating air in a first section of space in a building from air in a second section of space in the building and that allows providing containment of the air in the first section of space;

the first section of space and the second section of space are outside the inflatable barrier; and the inflatable barrier is configured to keep the air in the first section of space at a different pressure than the air in the second section of space.

13. The inflatable barrier of claim 12, wherein the outer sleeve further comprises:

vertical connector halves on sides of a front and sides of a back of the main sleeve, wherein the vertical connector halves are configured to couple the inflatable barrier with another inflatable barrier; and/or horizontal connector halves at a top and at a bottom of the main sleeve, wherein the horizontal connector halves are configured to couple the main sleeve with at least one of a top, a bottom, or an extension.

14. The inflatable barrier of claim 12, wherein the outer sleeve further comprises edge seals.

15. The inflatable barrier of claim 14, wherein the edge seals are detachable, and may be attached to and detached from vertical connector halves on sides of a front and sides of a back of the main sleeve.

16. The inflatable barrier of claim 12, wherein the two or more inflatable inner chambers have a height greater than a height of the outer sleeve.

17. The inflatable barrier of claim 12, wherein the outer sleeve further comprises horizontally paired sets of D-rings on both a front and a back, wherein the sets of b-rings are configured to receive straps that allow shortening and/or curving the inflatable barrier.

18. The inflatable barrier of claim 13, wherein the top comprises edge seals.

19. The inflatable barrier of claim 12, wherein the inflatable barrier includes a divider that carries lighting.

20. The inflatable barrier of claim 14, wherein:

the edge seals comprise one or more parallel tubes filled with foam;

the outer sleeve further comprises horizontally paired straps on a front and a back, wherein the straps allow shortening and/or curving a width of the inflatable barrier; and the outer sleeve further comprises:

vertical connector halves on sides of a front and sides of a back of the main sleeve, wherein the vertical connector halves are configured to couple the inflatable barrier with another inflatable barrier; and/or horizontal connector halves at a top and at a bottom of the main sleeve, wherein the horizontal connector halves are configured to couple the main sleeve with at least one of a top, a bottom, or an extension; and the vertical connector halves include zipper halves and/or the horizontal connector halves include zipper halves.

* * * * *